(12) United States Patent
Rubin et al.

(10) Patent No.: US 6,300,457 B1
(45) Date of Patent: Oct. 9, 2001

(54) POLYESTER/POLYURETHANE VINYL DIOXOLANE BASED COATING COMPOSITIONS

(75) Inventors: Leslie S. Rubin, Newton; Robert F. Kovar, Wrentham; Nese Orbey, Acton; Nelson Landrau, Marlborough; Paul Osenar, Belmont, all of MA (US)

(73) Assignee: Foster Miller, Inc., Waltham, MA (US)

( * ) Notice: Subject to any disclaimer, the term of this patent is extended or adjusted under 35 U.S.C. 154(b) by 0 days.

(21) Appl. No.: 09/432,445

(22) Filed: Nov. 2, 1999

Related U.S. Application Data

(63) Continuation-in-part of application No. 08/961,110, filed on Oct. 30, 1997, now Pat. No. 5,977,269, and a continuation-in-part of application No. 08/717,792, filed on Sep. 23, 1996, now abandoned.

(51) Int. Cl.[7] .................................................. C08G 18/10
(52) U.S. Cl. .............................. 528/66; 528/73; 528/56; 528/55; 528/50
(58) Field of Search ............................... 528/66, 59, 73, 528/56, 55, 50

(56) References Cited

U.S. PATENT DOCUMENTS

| | | | |
|---|---|---|---|
| 3,010,918 | 11/1961 | Ikeda | 260/17 |
| 3,010,923 | 11/1961 | Ikeda | 260/23 |
| 3,010,945 | 11/1961 | Ikeda | 260/78.3 |
| 3,043,851 | 7/1962 | Fischer et al. | 260/340.9 |
| 3,055,766 | 9/1962 | Reinhardt | 106/287 |
| 3,058,933 | 10/1962 | Ikeda | 260/17 |
| 3,086,025 | 4/1963 | Tinsley, Jr. et al. | 260/340.9 |
| 3,245,927 | 4/1966 | Ikeda | 260/23 |
| 3,849,445 | 11/1974 | Papa et al. | 260/340.9 |
| 4,009,129 | 2/1977 | Papa et al. | 260/2.5 |
| 4,182,848 | 1/1980 | Schmidle et al. | 528/376 |
| 4,206,099 | 6/1980 | Bentley et al. | 260/22 |
| 4,358,476 | 11/1982 | Zimmer et al. | 427/44 |
| 4,413,073 | 11/1983 | Gibson et al. | 523/511 |

Primary Examiner—Rachel Gorr
Assistant Examiner—Melanie D. Bagwell
(74) Attorney, Agent, or Firm—Linda M. Buckley; Lisa Swiszcz Hazzard; Dike, Bronstein, Roberts & Cushman, IP Group

(57) ABSTRACT

The present invention provides polyester/polyurethane/vinyl dioxolane based coating compositions containing no or essentially no volatile organic components. Oligomers for forming the coating compositions of the present invention are vinyl dioxolane end-capped polyesters and polyurethane oligomers.

46 Claims, 29 Drawing Sheets

| Absorption Peak (ppm) | Theoretical Peak Intensity Ratio | Assignment |
| --- | --- | --- |
| 5.95-5.75 | 2 | H on $C_b$ of vinyl group |
| 5.60-5.29 | 4 | Hs on $C_a$ of vinyl group |
| 5.28-5.23 | 2 | Hs on $C_c$ |
| 5.04-4.98 | - | - |
| 4.95-4.85 | - | - |
| 4.63 | - | - |
| 4.41-3.40 [1] | - | - |
| 2.70-1.30 | 10 | Hs on $C_l$ of cyclohexyl group |

[1] Methoxy group impurity should appear at about 3.7 ppm

FIG. 25

POLYESTER/POLYURETHANE VINYL DIOXOLANE BASED COATING COMPOSITIONS

This invention is a continuation in part of U.S. Ser. No. 08/717,192, filed Sep. 23, 1996, now abandoned and Ser. No. 08/961,110, filed Oct. 30, 1997, issued as U.S. Pat. No. 5,977,269.

STATEMENT OF GOVERNMENT INTEREST

Funding for the present invention was obtained from the Government of the United States by virtue of Contract No. 68D70049 from the U.S. Environmental Protection Agency. Thus, the Government of the United States has certain rights in and to the invention claimed herein.

FIELD OF THE INVENTION

This invention relates to polyester/polyurethane vinyl dioxolane based coating compositions containing no or essentially no volatile organic components (VOCs) and coatings formed therefrom.

BACKGROUND OF THE INVENTION

There is much interest in reducing, preferably eliminating VOCs, such as organic solvents, particularly in sprayable coating compositions. One factor which has promoted this interest is the need to reduce atmospheric pollution caused by the evaporation of these solvents during application and cure of coating compositions containing them. Such organic solvents are used in sprayable coating compositions to achieve the desired viscosity for coating applications.

Coating compositions for use in coating transportation vehicles, such as, trucks and automobiles, currently release substantial amounts of VOCs to the atmosphere during application and cure. Since VOCs are typically toxic, smog-producing and noxious, their continued release can cause a detrimental impact on worker safety and the environment. New methods for greatly reducing or eliminating VOCs during the application of such coatings are urgently needed to prevent worker injury and comply with current and pending environmental regulations. Of equal importance is the cost, performance and durability of such coating formulations.

Coating formulations that are used on the surfaces of all types of commercial automobiles and transportation vehicles to protect against the elements and provide an attractive, distinctive appearance include the two-component aliphatic polyurethane systems which provide excellent performance as automotive coatings after drying and cure.

Polyurethanes are of particular interest in high performance coatings because of their combination of useful properties, including flexibility, excellent adhesion to most substrates, abrasion-resistance, UV-resistance, weather-resistance, variable hardness from elastomer to tough plastic, moderate cost, availability as two-component, moisture-cured and aqueous-based, dispersion systems, and low temperature flexibility.

Polyurethanes consist of urethane linkages formed by the reaction of isocyanates with molecules containing hydroxyl groups or other groups with active hydrogens in the presence of catalyst, usually organic tin compounds, such as stannous octoate and dibutyltin dilaurate or tertiary amines, such as 1,4-diazabicyclo(2.2.2)octane (DABCO). The bulk of the polyurethanes used worldwide are based on two aromatic isocyanates: toluene diisocyanate (TDI) and diphenylmethane diisocyanate (MDI). These base materials are occasionally derivatized under controlled conditions to form carbodiimide isocyanates, or reacted with low-molecular-weight glycols to form specialty prepolymers. Such derivatives can simplify materials handling, ease processing and improve foam properties. Other isocyanates such as hexamethylene diisocyanate, isophorone diisocyanate or naphthalene diisocyanate may also be used in some cases for more specialized applications. Compounds with active hydrogens which make up the other half of the polyurethane reaction system, typically consist of poly-oxypropylene glycols (polyether polyols), sometimes supplemented with small amounts of low-molecular-weight glycols such as ethylene glycol or butanediol. In specific microcellular foam applications such as reaction injection molding, a diamine such as diethylene toluenediamine may be used in place of the glycols. In some cases, polyester polyols based on adipic acid and ethylene glycol or butanediol may be used instead of polyether polyols. See, e.g., *Modern Plastics, Mid-November,* 1993, page 79.

However, polyurethane coating systems currently use large quantities of flammable, toxic and environmentally hazardous organic solvents as diluents to lower the viscosity and make spraying operations possible. In addition, the polyurethane coating systems utilize pure aliphatic diisocyanage as one of the reactive components. The vapors of this volatile material that evolve during coating application and cure are toxic and irritating to workers, and hazardous to the environment. New automotive protective coating systems are required that provide excellent processing and performance without the need for volatile organic components (VOCs) that threaten worker safety and the environment.

A number of coating manufacturers are currently developing low/no VOC coating formulations including, high solids, blocked isocyanate polyurethanes and aqueous-based polyurethane dispersions. However, each of these newly emerging coating formulations possesses certain attributes but not without specific drawbacks. High solids formulations use low VOCs, provide equivalent performance to low solids urethanes, but cannot be applied using spraying techniques. Blocked isocyanate polyurethanes also use low VOCs, have low toxicity levels and good properties. These materials however, must be cured at elevated temperatures (150 to 200° C.) which are not practical when coating automobiles. Aqueous based polyurethanes use no VOCs, are nontoxic and easy to apply via spraying, but to date, have not provided the properties required to meet military specifications, such as adhesion and moisture-resistance. Presently there is no cost-competitive, high performance low/no VOC substitute for current solvent-based polyurethane automotive coating systems.

Polyesters are polymers formed by the reaction of aliphatic or aromatic polyol monomers with aromatic or aliphatic diacids in the presence of catalyst, usually, metallic acetates, such as calcium acetate. These materials have emerged as promising candidates for inclusion as components in advanced aircraft coatings because of their combination of useful properties including: clarity, transparency, absence of color, flexibility, excellent adhesion to most substrates, abrasion-resistance, water-resistance, fuel and oil-resistance, UV-resistance, weather-resistance, variable hardness—from elastomer to tough plastic, moderate cost, low temperature flexibility and availability as variable molecular weight, ester-endcapped, difunctional prepolymers.

Polyester polymers cannot be used as coatings themselves since their functionality as produced is not conducive to the formation of hard, cross-linked coatings. To be used to advantage as advanced coatings, polymers are first functionalized with reactive groups, such as hydroxyl groups, and then cured by chemical reaction with other comonomers, such as polyurethane diisocyanate monomers, into hard, tough polymer resins that can be used as protective coatings. Hydroxy-functional, polyester-based reactive prepolymers are frequently selected for use as components in polyurethane coatings over polyether and other type, polymers since they impart superior solvent-resistance, mechanical toughness and clarity to the coating and do not yellow upon exposure to intense UV light.

The major problems associated with the use of polyester-derived polyurethanes have involved the requirement for addition of substantial quantities of flammable, toxic solvents to polyurethane coating formulations to lower viscosity sufficiently for spray-painting operations. Another problem involved the use of toxic, irritating and volatile diisocyanate monomer components as major components in the polyurethane coating. The vapors that evolved from polyurethane coating operations could cause serious injury to workers breathing the fumes if they were not wearing protective equipment.

A number of coating manufacturers have been actively pursuing the development of high-performance low VOC and no VOC coating formulations. To date however, none of these coatings has exhibited the required processibility or properties for use in e.g., automotive coatings.

Accordingly, sprayable polyester/polyurethane based coating compositions which contain no volatile organic components yet provide coatings having useful properties are desired.

DESCRIPTION OF THE DRAWINGS

FIG. 25 shows the HNMR spectrum of purified PEVD prepolymer.

SUMMARY OF THE INVENTION

Figure 1:
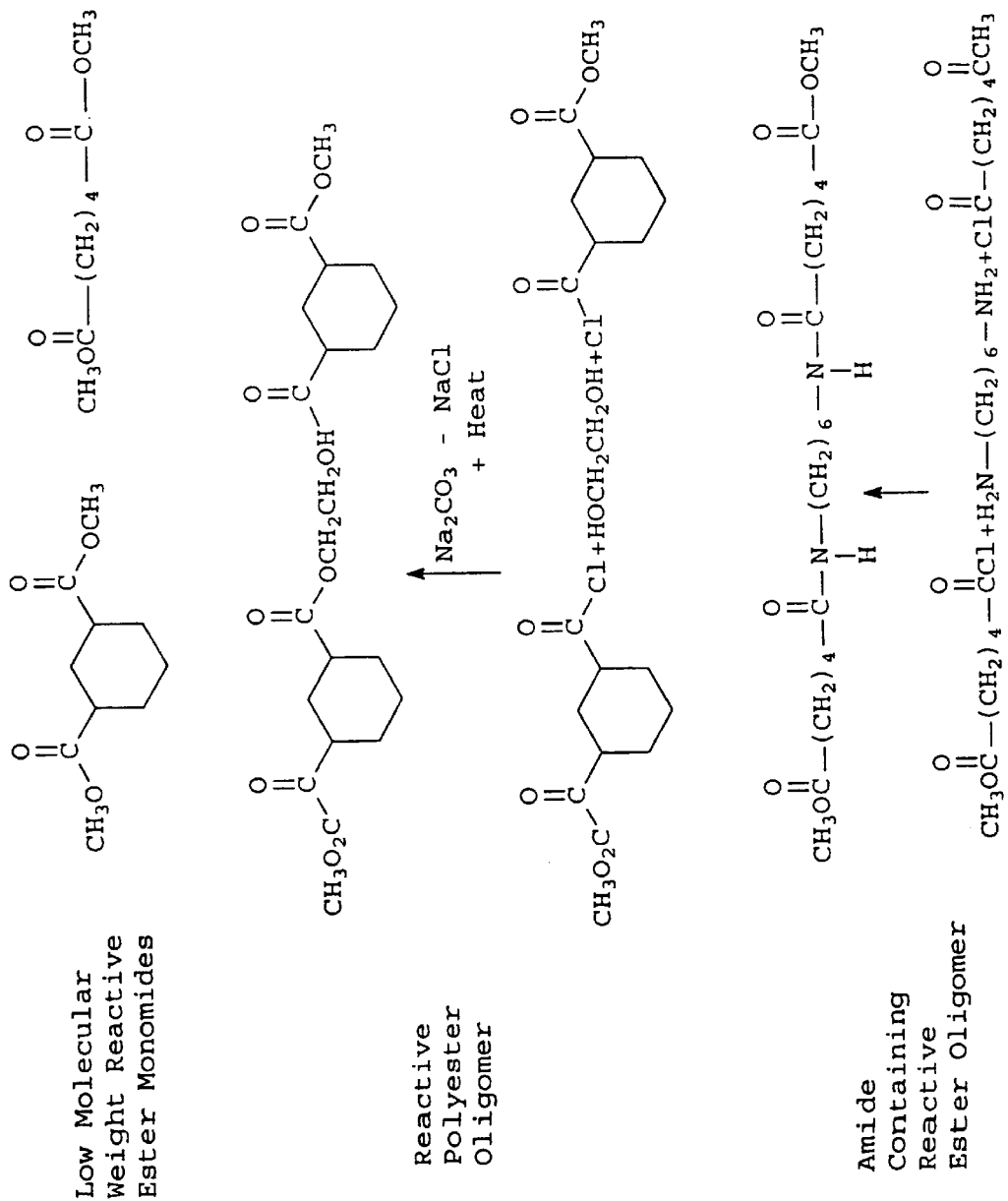
FIG. 1 shows exemplary carbomethoxy-functional reactive polyesters and chemical reactions leading thereto.

The present invention provides a new class of no or essentially no VOC, environmentally-compliant, high performance polyester/polyurethane vinyl dioxolane based coating compositions (sometimes referred to hereinafter as "PEVD/PUVD") that are economical and easily-applied, without hazard to workers or the environment.

The coating compositions of the present invention comprise one or more polyester vinyl dioxolane prepolymers and one or more polyurethane vinyl dioxolane prepolymers, which are formed into a coating by the action of a catalyst system.

In one preferred embodiment, these no VOC coating compositions comprise:

A polyester/polyurethane coating composition containing essentially no volatile organic components, the composition comprising:

(a) at least one prepolymer which comprises the reaction product of
  (i) at least one substituted vinyl dioxolane monomer having the formula

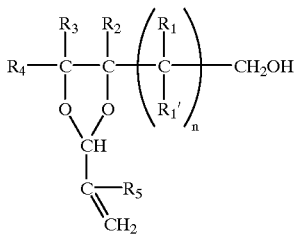

wherein $R_1$ and $R_1'$ are independently hydrogen or an alkyl group having from 1 to 10 carbon atoms, n is a number from 0 to about 10, and $R_2$, $R_3$, $R_4$, and $R_5$ are independently hydrogen or an alkyl group having from 1 to about 10 carbon atoms; and
  (ii) at least one ester of a polycarboxylic acid; and
(b) at least one polyurethane prepolymer which comprises the reaction product of
  (i) at least one substituted vinyl dioxolane monomer having the formula

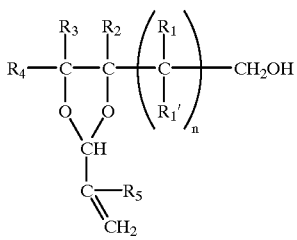

wherein $R_1$ $R_1'$, $R_2$, $R_3$, $R_4$, $R_5$ and n are as defined above; and
  (ii) at least one isocyanate or polyisocyanate having the formula

$R_6(NCO)_p$ wherein $R_6$ is an aliphatic or cycloaliphatic alkyl group having from 1 to about 10 carbon atoms or an aromatic group and p is at least 1, or
  at least one isocyanate-endcapped aliphatic urethane prepolymer having the formula

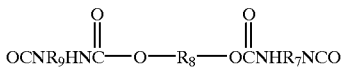

wherein $R_7$, $R_8$ and $R_9$ are independently an aliphatic or cycloaliphatic alkyl group having from 1 to about 10 carbons; and
(c) at least one catalyst to initiate polymerization of the polyester and polyurethane prepolymers to form a coating.

In some embodiments, the coating compositions further comprise at least one of a peroxide initiator and/or at least one solubility enhancer.

In preferred embodiments, in forming the polyester prepolymer, the ester of the polycarboxylic acid has the formula:

Formula II $R_8OOCR_6COOR_7$ with $R_9$ on $R_6$ wherein $R_6$ is a branched or unbranched, saturated or unsaturated, alkyl or alkoxy group having from 1 to about 20 carbon atoms or a cyclic alkyl or alkoxy group having from about 1 to about 20 carbon atoms: and $R_7$ and $R_8$ are the same or independently selected from —$CH_3$ or an alkyl group having up to about 10 carbon atoms; and $R_9$ is —H or a branched or unbranched alkyl or alkoxy group having from 1 to about 20 carbon atoms or a cyclic alkyl or alkoxy group having from 1 to about 10 carbon atoms. In some embodiments, $R_6$ further comprises at least one amide linkage.

Catalysts useful in initiating polymerization of the prepolymers to form the coatings of the present invention may preferably comprise at least one of cobalt, aluminum, or peroxide initiator.

One preferred catalyst system comprises a combination of cobalt, aluminum and zinc. In this system, cobalt is present at up to about 1.0 weight %, zinc at up to about 0.5 weight %, and aluminum at up to about 0.6 weight %. It is preferred, in one embodiment cobalt is present as cobalt octoate at from about 0.01 to about 0.5 weight %; zinc is present at from about 0.01 to about 0.5 weight %; and aluminum is present at from about 0.01 to about 0.6 weight %. The total weight % of the cobalt/zinc/aluminum catalyst system is less than about 1.5 weight %, preferably less than about 1.0 weight %. As used herein weight % means the % of the total weight of the metal catalyst, through drier, cobalt activity mediator, combined catalyst organic components, and PEVD prepolymer and any other components. In one especially preferred catalyst system, cobalt is present as cobalt octoate, zinc as zinc octoate and aluminum as an aluminum organic complex.

Another preferred catalyst system comprises aluminum and cobalt excluding zinc. Preferably, in this catalyst system, cobalt is present up to 1.0 weight % and aluminum is present up to about 0.6 weight %. More preferably, in this catalyst system, cobalt is present at from about 0.01–0.5 weight % and aluminum is present at from about 0.01 to about 0.6 weight %. Preferably, the cobalt is present as cobalt octoate and the aluminum is an aluminum organic complex.

In some preferred embodiments, the catalyst system further comprises at least one of a peroxide initiator and/or a solubility enhancer. Preferred peroxide initiators comprise dibenzoyl peroxide, methyl ethyl ketone peroxide, 2-butano peroxide, tert-butyl peroxy benzoate (TBPB) and 2,5 Dimethyl 2,5 di(t-butylperoxy) hexane (Lupersol 101). Preferred solubility enhancers comprise N,N'-dimethylaniline and dimethyl analine (DMA). The peroxide initiator is preferably present at from about 0.1 to about 5.0 weight % and solubility enhancers are present at from about 0.1 to about 1.0 weight %.

Esters of polycarboxylic acids are useful in the practice of the present invention. Preferred difunctional, trifunctional and polyfunctional esters, include hydroxy functional, saturated and unsaturated, alkyl esters, such as, adipate phthalate, and malonate esters; cyclohexane dicarboxylic acid esters; and various alkyl ployols, such as ethylene glycol based polyesters. Polyester prepolymers useful in the practice of the present invention also include those having cyclohexane groups along the backbone, as well as amide containing oligomers.

Difunctional saturated polyester oligomers are preferred components of the coating compositions of the present invention. Saturated esters are especially preferred for colorless coatings, because they are less light-sensitive and, thus, less prone to yellow. Particularly preferred saturated esters include adipate and cyclohexane diesters.

In forming the polyurethane prepolymer, aliphatic polyisocyanates useful in the practice of the present invention include hexamethylene diisocyanate, 4,4-bis(cyclohexyl)methane diisocyanate, bis(4-isocyanato-cyclohexyl)methane, isophorone diisocyanate, 1-methylcyclohexane-2,4-diisocyanate and 4,4',4"-tricyclohexylmethane triisocyanate. A preferred aliphatic polyisocyanate is a 1,6-hexamethylene diisocyanate based polyisocyanate. One such particularly preferred 1,6-hexamethylene diisocyanate based polyisocyanate has a viscosity at 23° C. of from about 90 to about 250 mPa·s, such as commercially available DESMODUR N3400. Another preferred 1,6-hexamethylene diisocyanate based polyisocyanate has a viscosity at 25° C. of from about 1,300 to about 2,200 mPa·s, such as commercially available DESMODUR N3200.

Preferred isocyanate end-capped aliphatic urethane prepolymers for use in the coating compositions of the present invention include such prepolymers prepared from at least one hexamethylene diisocyanate aliphatic polyester polyol or polyether polyol.

A particularly preferred isocyanate used in preparing the polyurethane prepolymer is an aromatic isocyanate: tetramethyl xylene diisocyanate (TMXDI).

In one preferred coating composition according to the present invention, the substituted vinyl dioxolane monomer is 2-vinyl-4-hydroxymethyl- 1,3-dioxolane (HMVD) or 2-vinyl-4-hydroxybutyl- 1,3-dioxolane (HBVD) or a blend thereof. The ester of a polycarboxyl acid is dimethyl-1,4-cyclohexanedicarboxylate (DMCDC), and the polyurethane is tetramethyl xylene diisocyanate. Further, it is preferred to use a catalyst blend comprising aluminum and cobalt and excluding zinc. To this composition preferably tert-butyl peroxy benizoate peroxide initiator and a dimethyl analine solubility enhancer is added.

Preferred coating compositions according to the present invention are sprayable. Such coating compositions have a viscosity from about 10 to about 150 mPa·s, more preferably from about 20 to about 150 mPa·s.

Coating compositions according to the present invention may further comprise at least one reactive diluent to adjust the viscosity or other properties as desired. Such reactive diluents when used are present at from about 1 to about 50 weight %. Preferred reactive diluents include vinyl group containing compositions such as trimethylol propane triacrylate and diethylene glycol diacrylate. Another preferred vinyl containing reactive diluent comprises at least one substituted vinyl dioxolane monomer having the formula:

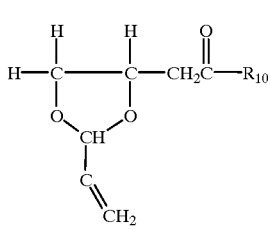

Formula III wherein $R_{10}$ is a branched or unbranched, saturated or unsaturated, alkyl or alkoxy aliphatic group having from 1 to about 10 carbon atoms. In some embodiments, $R_{10}$ may further comprise one or more urethane, ester, or amide linkages. The coating compositions of the present invention may also include as the reactive diluent HMVD or HBVD or a blend thereof.

Other preferred reactive diluents include mono-functional esters.

In the high performance PEVD/PUVD coating compositions of the present invention, the polyester components contribute the following important properties: strong adhesion, UV-stability, moisture-resistance, fuel, oil and hydraulic fluid-resistance, high rain erosion-resistance, low temperature flexibility, hardness, absence of color, transparency and capability to vary properties over wide range. These PEVD coating compositions also eliminate the following deficiencies that are usually found in the solvent-based polyurethane coating system: requirement of high VOC content for spraying, evolution of toxic, irritating isocyanate and requirement for high temperature cure. The polyurethane components contribute the following important properties: including flexibility, excellent adhesion to most substrates, abrasion-resistance, UV-resistance, weather-resistance, variable hardness from elastomer to tough plastic, moderate cost, availability as two-component, moisture-cured and aqueous-based, dispersion systems, and low temperature flexibility.

The relative percentages of PUVD and PEVD prepolymers used in the blend will depend upon the desired properties of the coating as can readily be determined in light of the teachings of this application. Each of the polyester and polyurethane prepolymers provide different attributes to the coating formulations of the present invention. It is thus possible to tailor the coating formulation to take advantage of the properties offered by polyester and polyurethane based resins.

The PEVD oligomer is inherently less viscous than the PUVD oligomer. PUVD, on the other hand, has stronger adhesion and higher abrasion resistance. Table 1 lists advantages and disadvantages of these two types of prepolymers. In the present invention, blending the two formulations (PEVD and PUVD) in different proportions produce coating formulations with enhanced properties, exhibiting the best of both systems.

TABLE 1

Comparison of PEVD Monomer and PUVD Monomer Properties.

| PEVD | PUVD |
|---|---|
| Advantages | Advantages |
| Lower viscosity | Improved toughness |
| Lighter color | Improved adhesion |
| Higher clarity | |
| Better gloss | |
| Disadvantages | Disadvantages |
| Poorer adhesion | Low clarity |
| Prone to hydrolysis | High viscosity |
| Less reactivity | |

The PEVD/PUVD prepolymers were shown to cure under conventional cure time/temperature cycles used in industry to provide a hard, durable coating with excellent properties. In some embodiments, these coatings match/exceed the existing automotive coatings in the market. Thus, the present invention teaches that PEVD and PUVD are compatible and the combination provides excellent coatings.

All blends studied formed homogeneous solutions and cure times depended at least in part on the catalyst formulation used. One catalyst for use in the present invention comprising TBPB, aluminum and cobalt was found to provide excellent cure times. DMA can also be included in this catalyst if desired. The catalyst formulation comprising 1% TBPB, 0.5% Al, 0.05 % Co, 0.01 % DMA was found to provide particularly excellent cure times with the blends of the present invention. The coatings catalyzed with this formulation typically cured within 18 minutes at 124° C. (typical cure cycle used in automotive industry) to form tough, hardened, high gloss protective coatings.

The vinyl dioxane component of the PEVD compositions of the present invention contributes to the following positive attributes of the coating: low viscosity for spraying, no VOC coating system, air-drying at room temperature, lower cost than polyurethane, no toxic fumes evolved, increases coating hardness against rain erosion and UV-resistance. Further substantial cost reductions are achieved by eliminating the need for complex, expensive pollution control and solvent-recovery systems, since the PEVD coating invention evolve essentially no VOCs. The unseen cost of polluting the environment is also eliminated.

The coating compositions of the present invention were applied via hand-coating techniques to either steel panels or steel/zinc phosphated/electrocoated/primed panels and cured to various temperatures. Unlike conventional VOC containing coating systems, the innovative coating compositions of the present invention released no volatile, toxic or flammable components to the environment during application or cure via air-drying at room temperature. This feature, combined with excellent performance as a protective coating results in a highly desirable coating composition.

DETAILED DESCRIPTION OF THE INVENTION

In preparing the coating compositions of the present invention, simple vinyl dioxolanes, fluid and low in viscosity, are reacted with polyester based oligomers and polyurethane based oligomers to form vinyl dioxolane end-capped polyester and polyurethane prepolymers that have the desired properties, e.g., the appropriate viscosity, sheeting and surface-wetting capability, for use as coating compositions to form protective coatings.

The term "polyurethane" as used herein also includes polymers which are not made up fully of polyurethane linkages. For example, ureas, allophonates, cyanurates and other linkages, may also be present in a vinyl dioxolane end-capped polyurethane oligomer of the present invention, depending upon ingredients used and reaction conditions. Additionally, isocyanates may be reacted with themselves to form polymeric forms of isocyanate linked together by isocyanurate and/or carboniimide bridges. By polyisocyanate is meant an isocyanate having at least two —NCO groups per molecule.

Selection of the appropriate catalyst system is key to obtaining coatings having the desired characteristics. The catalyst system can be added to the PEVD and PUVD prepolymer before or during application of the coating composition to the surface to be coated.

It has been found a catalyst system comprising (cobalt, aluminum and zinc) cures the PEVD and PUVD prepolymers to form coatings having desirable characteristics. It has further been found that catalyst systems comprising cobalt and aluminum excluding zinc cure the PEVD/PUVD preoligomers to form coatings having desirable characteristics. Cobalt acts as an oxidation polymerization catalyst that generates free-radicals from a peroxide source (oxygen) to polymerize molecules containing an unsaturated group (the pendant vinyl groups of PEVD). During PEVD polymerization, peroxides are generated by the interaction of the dioxolane ring with catalyst, oxygen and heat, yielding hydroxyl groups as a byproduct. Aluminum acts as a through dryer. It is believed to form chemical or coordinative bonds with functional groups such as amine, hydroxyl (produced during PEVD polymerization) and ester (present in PEVD) groups, thus linking together adjacent molecules into a network structure.

Cobalt, manganese, vanadium and cerium based oxidation polymerization catalysts were evaluated. See Table 5 and the Examples, below. Cobalt was selected as the oxidative polymerization catalyst, because of its desirable properties, e.g., it does not cause particle formation during coating formulation to the extent of manganese, vanadium and cerium catalysts and it has high activity. However, cobalt's high activity caused coating skinning, i.e., the formation of a skin over a fluid coating layer and particle formation within the coating.

"Skinning" was the result of the high cobalt activity causing rapid PEVD polymerization at the coating/air interface. Skin formation prevents migration of oxygen into the bulk of the coating, causing a decreased rate of prepolymer cross-linking due to a lack of peroxide source, resulting in a liquid (uncured) layer between the substrate and coating skin. Coating curing may therefore require extremely long times or elevated temperatures to go to completion, or may never fully cure at all.

The approach usually applied to eliminate skinning and wrinkling defects from a cobalt-catalyzed coating is either to decrease the amount of cobalt catalyst or to use small amounts of a co-catalyst, called a "through drier", that inhibits surface curing and catalyzes cure throughout the coating. Through drier catalysts include metal soaps prepared from the following elements:

Aluminum (Al)
Zinc (Zn)
Zirconium (Zr)
Lanthanum (La)
Vanadium (V)
Cerium (Ce)
Neodymium (Nd)

Application of the appropriate amounts of "surface" driers and "through-driers" produces cured coatings that are free from wrinkling and other surface-curing defects.

In order to minimize skinning with cobalt, zinc was evaluated as a cobalt activity mediator in one preferred catalyst system comprising cobalt/aluminum/zinc for use in the coating compositions of the present invention and was found to reduce skinning and particle formation to an acceptable level, i.e., to achieve coatings having desirable characteristics. Aluminum was also evaluated as a cobalt activity mediator in a second preferable catalyst system comprising cobalt and aluminum and excluding zinc and was also found to reduce skinning and particle formation to an acceptable level.

Particle formation could be due in part to insolubility of the catalyst in PEVD, rapid gelation around the catalyst droplet (high localized concentration) before it has time to disperse and dissolve the metal complex into the prepolymer, or rapid gelation due to high catalyst activity. Catalyst was added to the prepolymer liquid in the form of drops of catalyst solution (metal complex dissolved in organic carrier) and mixed into the prepolymer by mechanical agitation. In most cases, catalysts initially dissolved into PEVD/PUVD forming solutions in which particles precipitated, suggesting catalyst insolubility was not the cause. Gelation could be caused by either vinyl group polymerization or the formation of chemical/coordinative bonds forming cross-links between PEVD/PUVD prepolymer molecules. The extent of particle formation was controlled to an acceptable level by adjusting the cobalt concentration, adjusting the cobalt activity level, removing any dissolved oxygen from the prepolymer prior to cobalt addition, and adding cobalt to the prepolymer under an oxygen-free environment.

Aluminum acts as a through drier in systems containing hydroxyl or carboxyl groups and used to increase coating cure at ambient temperatures (OM Group, Inc., hereinafter "OMG"). Hydroxyl is produced during PEVD polymerization and carboxyl is found in the —C=O group in the ester of PEVD. It was found that Aluminum is a preferred through drier for use in the coating compositions of the present invention.

Various combinations of cobalt/aluminum/zinc and various combinations of cobalt/aluminum excluding zinc with PEVD/PUVD were investigated for their combined effect on particle formation, coating cure at near ambient temperatures and final coating properties. One preferred catalyst system for use in the coating composition of the present invention comprises cobalt at up to about 1.0% by weight, aluminum at up to about 0.5% by weight and zinc at up to about 0.5% by weight. A particularly preferred catalyst system for use in the present invention comprises cobalt present at from about 0.001 to about 0.5% weight %, aluminum present at from about 0.01 to about 0.1 weight %, and zinc present at from about 0.01 to about 0.1 weight %. A second preferred catalyst system found with the present invention comprises cobalt at up to about 1.0% by weight and aluminum at up to about 0.6% by weight. A particularly preferred catalyst system comprises cobalt present at about 0.01 to 0.5% by weight and aluminum present at about 0.01 to 0.6% by weight.

Other preferred catalyst systems for use in the present invention include those containing at least one of a peroxide initiator and a solubility enhancer. Preferred peroxide initiators comprise dibenzoyl peroxide and methylethyl ketone peroxide and tert-butyl peroxy benzoate (TBPB). Preferred solubility enhancers comprise dimethylaniline and N, N', N", N'''-tetramethylethylenediamine (TMEDA) and dimethyl analine (DMA). The amount of TMEDA selected is preferably equal to about twice the weight % of cobalt to provide about equivalent molar quantities. Peroxide initiators are present at from about 0.1 to about 5.0 weight % and solubility enhancers are present at from about 0.01 to about 1.0 weight %. The initiator depends upon the cobalt concentration and the concentration of the solubility enhancer is selected based upon the concentration of the cobalt, aluminum and zinc.

In preferred coating compositions, the catalyst system of cobalt/aluminum/zinc comprises no more than about 1.5% by weight.

PEVD coating catalysis and coatings are described more fully below in connection with Tables 5 to 8 and Examples 4 to 7.

Vinyl dioxolanes are low-viscosity liquids that are readily synthesized by the reaction of low-cost starting materials that convert from the liquid state to hard, tough tenacious, flexible films that adhere strongly to metal substrates when exposed to air at room temperature and in the presence of a catalyst, such as cobalt. The mechanism of cure involves a ring-opening reaction in the presence of air and catalyst, forming pendant hydroxyl groups (contribute strong adhesive properties) and polymerizing the vinyl group into a highly cross-linked, hard coating. Since the vinyl dioxolanes are a low viscosity liquid, they require no solvents or unreactive diluents for their application as spray-coatings and are therefore completely free of VOCs.

Vinyl dioxolane reactive monomers can be made by condensing an unsaturated aldehyde, such as acrolein, with an appropriate 1,2-diol or triol, such as glycerol, in the presence of an acidic catalyst, such as p-toluenesulfonic acid.

Although the simple vinyl dioxolanes undergo cure in air at room temperature to form hard coatings, they are very fluid and too low in viscosity for application alone (coatings would be too runny). In the coating compositions of the present invention, they are reacted with viscosity-building components, such as phthalate, adipate, malonate and other polyfunctional, saturated or unsaturated polycarboxylic acid esters and polyurethanes via transesterification to form vinyl dioxolane-endcapped polyester/polyurethane monomers that are of sufficient viscosity for use as protective coatings. These air-dried, room temperature cured systems of the present invention can be used as clear coatings or they can be formulated with pigment into a variety of colors. A few pigments might retard the drying process at room temperature, but this can be overcome by low temperature baking of the coating.

In accordance with the present invention, one or more substituted vinyl dioxolane monomers, one or more polyester prepolymers and one or more polyurethane prepolymers are copolymerized with a catalyst system in a reaction medium comprising the vinyl dioxolanes polyester prepolymers and polyurethane prepolymers to form vinyl dioxolane end-capped polyester/polyurethane prepolymers.

The selection of the substituted vinyl dioxolane component(s), the ester component(s) the urethane component and the catalysts for use in the coatings of the present invention is discussed below.

In preferred coating compositions, the viscosity of the vinyl dioxolane end-capped polyester/polyurethane prepolymers of the present invention is controlled to render them sprayable by selection of the appropriate combination of vinyl dioxolane monomer or blends thereof, alkyl ester, or blends thereof, and catalyst system. The viscosity may also be modified by including reactive diluents in the coating compositions of the present invention.

Vinyl dioxolanes suitable for use in the present invention are described for example, in U.S. Pat. No. 3,010,923 (the '923 patent) the teachings of which are incorporated by reference, which disclosed substituted vinyl dioxolane compounds for coating applications which contain a plurality of 2-vinyl-1,3-dioxolane groups. Although the '923 patent taught that the coating compositions disclosed therein can be applied in aqueous media, the '923 patent taught that spraying of the disclosed compositions is achieved by diluting with a volatile organic solvent such as toluene. See, e.g., column 15, lines 26–29 and lines 40–49. Furthermore, it appears that the only coating composition reported to be free of solvent suggested in the '923 patent can be found in Example 68. See also related U.S. Pat. Nos. 3,010,918; 3,055,766; 3,058,933; and 3,245,927.

Preferred substituted vinyl dioxolane monomers for use in forming vinyl dioxolane end-capped polyester and polyurethane prepolymers for use in the coating compositions of the present invention have a rapid rate of reaction with the alkyl ester and isocyanate components; are low in volatility and toxicity; and provide coatings having transparency and appropriate color which cure in air at room temperature in presence of a catalyst.

Preferred substituted vinyl dioxolane monomers for use in the present invention are shown in Formula I, above.

Substituted vinyl dioxolane monomers for use in the present invention are readily made by known methods, e.g., by condensing an unsaturated aldehyde, such as acrolein, with an appropriate 1,2-diol or triol, such as glycerol, in the presence of an acidic catalyst, such as p-toluenesulfonic acid. Such substituted vinyl dioxolane monomers are autooxidizable, that is, on exposure to the air the monomer under goes a cross-linking reaction. The mechanism of cure is thought to and has been reported to involve a ring-opening reaction in the presence of air and catalyst, forming pendant hydroxyl groups (which contribute strong adhesive properties) and polymerizing the vinyl group into a highly cross-linked, hard coating. Accordingly, in forming substituted vinyl dioxolane end-capped polyester and polyurethane prepolymers for use in the present invention, care must be taken to avoid the use of reactants which cause premature opening of ring. For example, the substituted vinyl dioxolane monomers should be stable to selected reaction catalysts for formation of the vinyl dioxolane end-capped polyester prepolymers. Preferred vinyl dioxolane monomers are stable in the presence of the catalyst systems of the present invention.

2-vinyl-4-hydroxymethyl-1,3-dioxolane (HMVD) and 2-vinyl-4-hydroxybutyl- 1,3-dioxolane (HBVD) as shown below are particularly preferred substituted vinyl dioxolanes for use in preparing the coating compositions of the present invention.

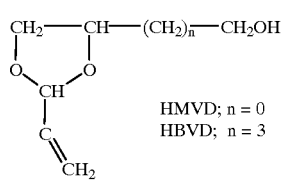

Formula IV

HMVD and HBVD are conveniently synthesized from two starting materials, namely, acrolein and glycerin in the case of HMVD, and 1,3-hexanetriol in the case of HBVD, using standard chemical equipment as illustrated below:

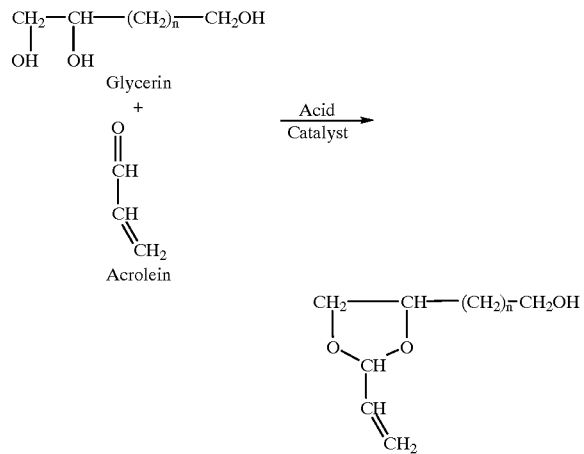

Particularly preferred coating compositions of the present invention can be applied by spray coating. In formulating such spray coatable compositions, the viscosity of vinyl dioxolane monomer is taken into consideration, as well as the degree of cross-linking that the particular vinyl dioxolane monomer is likely to provide.

The viscosity of vinyl dioxolane end-capped polyester prepolymers can be adjusted to be made suitable for spraying by, e.g., adding reactive diluents. The reactive diluent reacts with the components of the coating compositions, and provides no volatile organic components once reacted. Particularly preferred reactive diluent monomers include substituted vinyl dioxolanes as shown in Formula III above.

Vinyl dioxolane monomers as shown in Formula I above, including HMVD and HBVD, can also be used as reactive diluents. In such a case, an excess of the vinyl dioxolane monomer of Formula I over that required to react with ester groups of the polyester prepolymer and the —NCO groups of the isocyanate or polyisocyante of the polyurethane prepolymer is used.

Although preferred reactive diluents have the vinyl dioxolane group, other low viscosity vinyl containing monomers such as trimethylol propane triacrylate (TMPTA) and diethylene glycol diacrylate (DGD) can also be used as reactive diluents. Further, esters can also be used as diluents.

The viscosity of the various PEVD/PUVD prepolymers synthesized was determined visually by comparison to common liquids. Any evidence of gelation or particulates was initially noted and prepolymer appearance was monitored with time. This was deemed to be sufficient to allow judgement as to the suitability for spray application of the prepolymer.

The coating compositions of the present invention comprising HMVD end-capped polyester and polyurethane prepolymers exhibited desirable property and processing advantages, including very low viscosity, rapid reaction with polyester and diisocyanate comonomers and formation of tough, adherent, colorless coatings that cured in air at room temperature. For these reasons, HMVD is an especially preferred substituted vinyl dioxolane for use in the coating compositions of the present invention.

Esters of polycarboxylic acids suitable for use in the practice of the present invention are disclosed, e.g., in the '923 patent, supra. Preferred difunctional, trifunctional and polyfunctional esters, include hydroxy functional saturated and unsaturated alkyl esters such as adipate phthalate, and malonate esters; cyclohexane dicarboxylic acid esters; and various alkyl ployols, such as ethylene glycol based polyesters.

The term "polyester" as used herein also includes polymers which are not made up fully of polyester linkages. For example, other linkages which may also be present in a vinyl dioxolane end-capped polyester prepolymer of the present invention, depending upon ingredients used and reaction conditions, include those having cyclohexane linkages along the backbone, as well as amide linkages.

Exemplary chemical reactions leading to carbomethoxy-functional reactive polyester oligomers are illustrated in FIG. 1.

Aliphatic polyesters are preferred over aromatic polyesters in preparing the reactive oligomers or prepolymers of the present invention, particularly in forming colorless coatings, even though aromatic polyester groups are considerably more reactive than the aliphatic polyester groups for a number of reasons. Coating products made from aromatic polyesters suffer the disadvantage that they degrade more easily than do those prepared from aliphatic polyesters, especially when exposed to UV light. The higher resistance of products prepared from aliphatic polyesters to UV light-induced degradation means that coatings based on them have better yellowing and chalk resistance than those based on aromatic polyesters.

As used herein, the term "aliphatic" includes "cycloaliphatic" and saturated and unsaturated groups. Preferred aliphatic polyesters for use in forming vinyl dioxolane end-capped polyester prepolymers for use in the coating compositions of the present invention have a rapid rate of reaction with the substituted vinyl dioxolane monomer; are low in volatility and toxicity; provide coatings having transparency and appropriate color which cure at room temperature in presence of a catalyst; and, in particularly preferred embodiments, react to form spray-coatable vinyl dioxolane end-capped polyester prepolymers.

Preferred polyesters for use in the coating compositions of the present invention have Formula II, supra. Dimethyl 1,4-cyclohexane dicarboxylate is one preferred polyester prepolymer for use in the coatings of the present invention and can be prepared by reacting HMVD and dimethyl 1,4-cyclohexane dicarboxyate as illustrated below:

hazy appearance and clarified, possibly due to melting of polyester/polyurethane vinyl dioxolane crystallites. It is anticipated that adding small amounts of comonomer to the HBVD end-capped polyurethane oligomers, e.g., HMVD monomer, to prevent crystallization of the coating composition prior to cure may avoid the problem. If successful, blending of HBVD vinyl dioxolane with traces of HMVD will facilitate the production of clear, colorless, HBVD-based polyester/polyurethane vinyl dioxolane coatings.

Aromatic isocyanates are preferred over aliphatic isocyanates in preparing the reactive oligomers of the present invention. Aromatic isocyanate groups are considerably more reactive than the aliphatic isocyanate groups, resulting in coatings that dry faster and develop cure properties faster than comparable systems based on aliphatic isocyanates for a number of reasons. While urethane products made from aromatic diisocyanate monomers suffer the disadvantage that they degrade more easily than do those prepared from aliphatic diisocyanate monomers, especially when exposed to UV light by blending the urethane and esters to form a coating, this disadvantage is overcome.

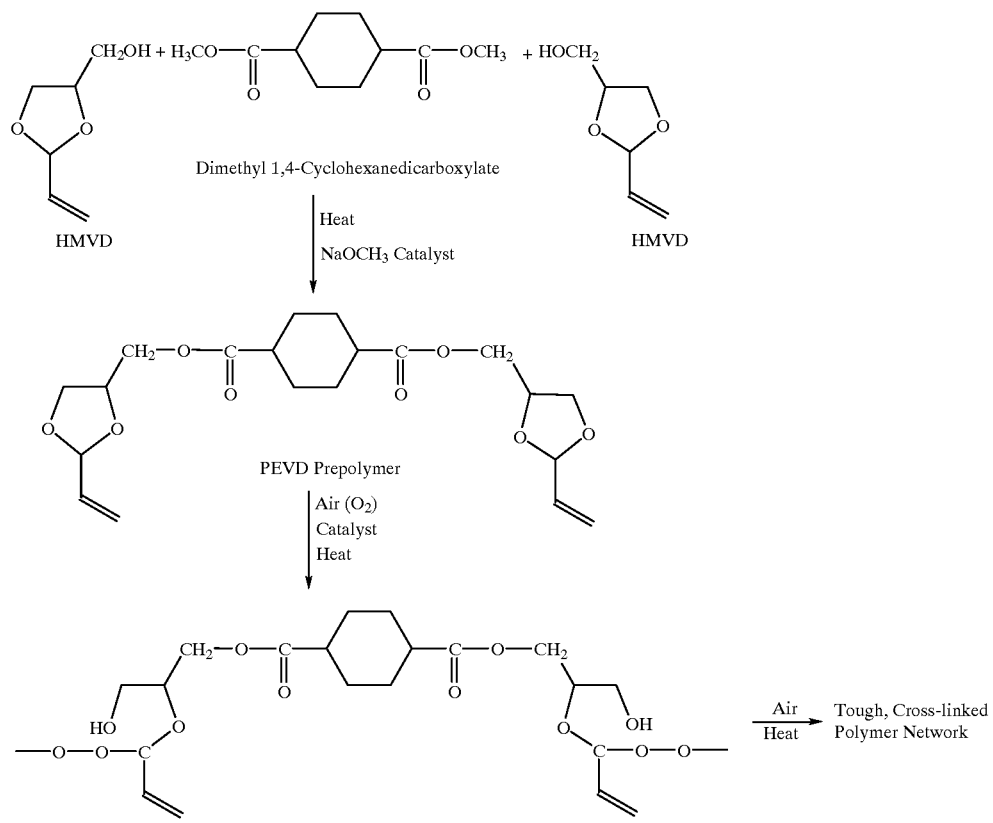

It should be noted that in forming the coating compositions of the present invention mixtures of substituted vinyl dioxolane monomers may be used. Mixtures of aliphatic polyesters may also be used.

Some coatings prepared from coating compositions including HBVD end-capped polyurethane oligomers became hazy upon curing at room temperature. This effect was attributed to a crystallization phenomenon, which occurred prior to cross-linking and cure, causing the coating to crystallize and become hazy in appearance. The problem was solved by postcuring the hazy HBVD-based polyester/polyurethane vinyl dioxolane coatings at 50° C. for several hours. Immediately upon heating, the coatings lost their As used herein, the term "aliphatic" includes "cycloaliphatic." Preferred aliphatic isocyanates for use in forming vinyl dioxolane end-capped urethane polyurethane oligomers for use in the coating compositions of the present invention have a rapid rate of reaction with the substituted vinyl dioxolane monomer; are low in volatility and toxicity (e.g., no isocyanate vapors); provide coatings having transparency and appropriate color which cure at room temperature in presence of a catalyst; and, in particularly preferred embodiments, react to form spray-coatable vinyl dioxolane end-capped polyurethane oligomers.

Isocyanates having the formula $$R_6(NCO)_n \quad \text{Formula II}$$

wherein $R_6$ is aliphatic or cycloaliphatic and n is at least one, and isocyanate end-capped prepolymers having the formula $$\text{OCNR}_9\text{HNC}\overset{O}{\overset{\|}{-}}\text{O}-\text{R}_8-\overset{O}{\overset{\|}{\text{OCNHR}_7}}\text{NCO} \quad \text{Formula III}$$

wherein $R_7$, $R_8$ and $R_9$ are each selected from an aliphatic or cycloaliphatic group having from about 6 to 10 carbons, are useful in preparing the coating compositions of the present invention.

Suitable aliphatic, including cycloaliphatic, isocyanates for use in preparing the reactive oligomers of the present invention include mono, di, tri, and other polyisocyanates. A preferred monomeric diisocyanate is bis(4-isocyanato-cyclohexyl)methane, commercially available from Bayer Corporation as DESMODUR W. Other preferred aliphatic diisocyanates include:

hexamethylene diisocyanate
4,4-bis(cyclohexyl)methane diisocyanate
isophorone diisocyanate
1-methylcyclohexame-2,4-diisocyanate
4,4',4"-tricyclohexylmethane triisocyanate Preferred polyisocyanates for use in the sprayable coating compositions of this invention include polymeric isocyanates derived from various aliphatic diisocyanates, such as hexamethylene diisocyanate. 1,6-hexamethylene diisocyanate-based polyisocyanates are preferred. A particularly preferred 1,6-hexamethylene diisocyanate-based polyisocyanate has a viscosity of from about 90 to 250 mPa·s at 25° C. and an NCO content of about 20 to 30%. These polyisocyanates are made by methods known to the skilled artisan. Such polyisocyanates are also commercially available from Bayer as DESMODUR N100, DESMODUR N3200 and DESMODUR N3400.

An aliphatic 1,6-hexamethylene diisocyanate based polyisocyanate having a viscosity @ 23° C. of about 90–250 mPa·s, such as DESMODUR N3400, is an especially preferred polyisocyanate for preparing vinyl dioxolane end-capped polyurethane oligomers of the present invention because it exhibited the following advantageous properties:

Rapid reaction with vinyl dioxolane monomer
Extremely low volatility and toxicity (no isocyanate vapors)
Produced low viscosity spray-coatable vinyl dioxolane end-capped polyurethane oligomer formulations
Produced a transparent, colorless polyurethane/vinyl dioxolane based coating that cured at room temperature in the presence of catalyst.

A particularly preferred aromatic diisocyanate for use in forming the PUVD in the present PEVD/PUVD blend is cytectmxdi, which is tetramethyl xylene diisocyanate.

Isocyanate-endcapped aliphatic and aromatic urethane prepolymers are known to the skilled artisan and many are commercially available. Such prepolymers for use in forming the vinyl dioxolane end-capped polyurethane oligomers for use in the present invention include, for example, the prepolymer prepared from hexamethylene diisocyanate aliphatic polyester and polyether polyols, such as polycaprolactam and polyethylene adipate derived polyester polyols, and polytertramethylene polyether polyols.

It should be noted that in forming the coating compositions of the present invention mixtures of substituted vinyl dioxolane monomers may be used. Mixtures of aliphatic isocyanates and polyisocyanates, as well as mixtures of isocyanate-endcapped aliphatic urethane prepolymers, may also be used.

Illustrative of such combinations are mixtures of hexamethylene diisocyanate with polymeric isocyanates derived from hexamethylene diisocyanate and mixtures of hexamethylene diisocyanate with 4,4',4"-tricyclohexylmethane triisocyanate.

The coating composition blends of the present invention will be illustrated by the formula of a polyester prepolymer prepared by the rxn of HMVD or HBVD with dimethyl 1,4-cyclohexanedicarboxylate and the formation of a polyurethane prepolymer prepared by the reaction of either DESMODUR N3400 or TMXDI in the presence of at least one catalyst. However, it is not intended to limit the scope of the coating compositions of the present invention to these components.

Reaction conditions were adjusted to maximize the formation of the PEVD and PUVD prepolymers while minimizing unwanted and undesirable side-reactions. The most deterious side-reaction is the opening of the dioxolane ring system at elevated temperatures, resulting in the formation of free radicals which can induce cross-lining via the pendant vinyl groups and cause gelation of the prepolymers. Introduction of color into the prepolymer by thermal degradation of the reactants or the PEVD and PUVD prepolymer is an undesirable side-reaction because of the intended use of the PEVD/PUVD coating compositions of the present invention as a clear and colorless topcoat. Thus, the length of time the reaction is carried out at elevated temperatures as well as the maximum reaction temperature is kept to a minimum.

Most chemical reactions involve an equilibrium situation where the reaction combining reactants to form products (i) is in competition with the decomposition reaction of the product into reactants (ii). with product formation being slightly favored. One way to assist the formation of PEVD and PUVD is to generate a reaction byproduct which can be removed from the reactoin environment and shift this equilibrium situation to favor product formation (i).

$$A+B \rightarrow C \quad (i)$$

$$A+B \leftarrow C \quad (ii)$$

When the PEVD prepolymer produced by an ester interchange reaction involving replacing, for example, the methoxy groups of dimethyl 1,4-cyclohexanedicarboxylate with methoxy vinyl dioxolane groups, methanol is evolved as a reaction byproduct. Methanol can be distilled from the reaction apparatus as its toluene azeotrope at the elevated reaction temperatures used.

The coating compositions of the present invention can be used as clear, unpigmented coating compositions, or they can be pigmented, using proportions well known in the art, with pigments commonly used in the coating industry, such as metal oxides, sulfides, sulfates, silicates, chromates, iron blues, organic colors, and metal flake pigments. Since some pigments retard drying, it is preferable to avoid them since the coating compositions of the present invention are air-drying materials. However, the retarding effects can be minimized as known in the art by force-drying or incorporating suitable additives.

The coating compositions can be blended with other well known film-formers such as vegetable oils, oil-modified alkyd resins, oleoresinous varnishes, alkylated urea aldehyde resins, alkylated melamine aldehyde resins, polyepoxy-polyhydroxy resins, phenol aldehyde resins, cellulose acetate, cellulose acetate butyrate, polymers, and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; and silicones.

Other common ingredients of organic film-forming compositions can be used in the manner and in proportions well known in the art. These include plasticizers, catalysts, hardeners, anti-skinning agents and surface active agents.

The clear unpigmented compositions of this invention can be made by simply mixing the ingredients as taught in the present specification. When pigmentation is involved, a conventional pigment grinding or dispersing step is required. The coating compositions of this invention are useful for protecting and/or decorating articles made of such materials as wood, metal, ceramic, leather and fabric. The coatings of the present invention are applied by spraying followed by normal air-drying via simple exposure to air at ordinary room or atmospheric temperature or by force-drying at a convenient temperature above ambient temperature but below a temperature which decomposition or some other objectionable results occur or a combination of both.

The coating compositions of the present invention are applied by spraying, including airless and electrostatic spraying.

The coating compositions and coatings of the present invention will be further illustrated with reference to the following Examples which are intended to aid in the understanding of the present invention, but which are not to be construed as a limitation thereof.

EXAMPLES

Materials

The following metal carboxylates were obtained as samples from OM Group, Inc., Cleveland, Ohio and used as received (Table 1 below).

Dimethyl 1,4-cyclohexanedicarboxylate (97% purity, mixture of cis and trans isomers) was obtained from the Aldrich Chemical Co. (No. 20, 643-1) and used as received.

4-(Hydroxymethyl)-2-vinyl-1,3-dioxolane (hydroxymethyl vinyl dioxolane, HMVD) was obtained as a sample from Degussa Corporation, Chemicals Division, Ridgefield Park, N.J., and used as received.

Sodium methoxide ($NaOCH_3$), toluene (anhydrous), dichloromethane, hexanes, activated neutral aluminum oxide (60 to 50 mesh), hydroquinone, methyl ethyl ketone peroxide, dimethylaniline, dicumylperoxide were obtained from commercial sources and used as received.

2-vinyl-4-hydroxybutyl-1,3-dioxolane (HBVD) was obtained from Union Carbide Corporation, North Carolina. Two samples of this material were received, one of 94% purity and the other of 83% purity.

DESMODUR W, DESMODUR N100, DESMODUR N3200 and DESMODUR N3400 were received from Bayer Corporation, Pennsylvania.

1,4-diazabicyclo (2.2.2) octane (DABCO), (98% purity) and dibutyltin dilaurate (95% purity) were obtained from Aldrich Chemical Company, Wisconsin.

Cobalt naphthenate (6% Cobalt NAP-ALL), contains 6% cobalt) and cobalt octoate (Catalyst 510, contains 12% cobalt) were obtained from OM Group, Inc., Ohio and used as received.

TMXDI (tetramethyl xylene diisocyanate was received from Cytex.

Metal substrates were either 3 in.×5 in. steel (low carbon, cold-rolled, SAE 1010) or 4 in.×6 in. aluminum ("yellow chromated" 2024-T3 alloy) panels from Q-Panel Lab Products, Cleveland, Ohio.

TABLE 2

Metal carboxylate catalysts for the PEVD cross-linking reaction

| Trade Name | Active Agent | Function |
| --- | --- | --- |
| Catalyst 510 | 12% Cobalt octoate | Oxidative polymerization catalyst which aids peroxide decomposition, generating radicals that initiate additional polymerization of alkenes. Through drier. |
| AOC 1020X | 8% Aluminum organic complex | Through drier which forms cross-links between adjacent polymer chains. |
| Zinc Hex-Chem | 18% Zinc octoate | Decreases cobalt activity level and reduces coating wrinkling or skinning problems. |
| Cobalt Nap-All | 6% Cobalt naphthenate | Oxidative polymerization catalyst and through drier. |
| Manganese Chem-All LC | 12% Manganese mixed carboxylates | Oxidative polymerization catalyst and through drier. |
| Cerium Hex-Chem | 12% Cerium octoate | Oxidative polymerization catalyst and through drier. |
| Cur-Rx | 4% Vanadium octoate | Oxidative polymerization catalyst. |
| Dri-Rx LC | 30% 2,2'-bipyridine | Chelating agent/accelerator for transition metals that increase their drying activity. |

Example 1

PEVD Synthesis and Purification

Figure 2:
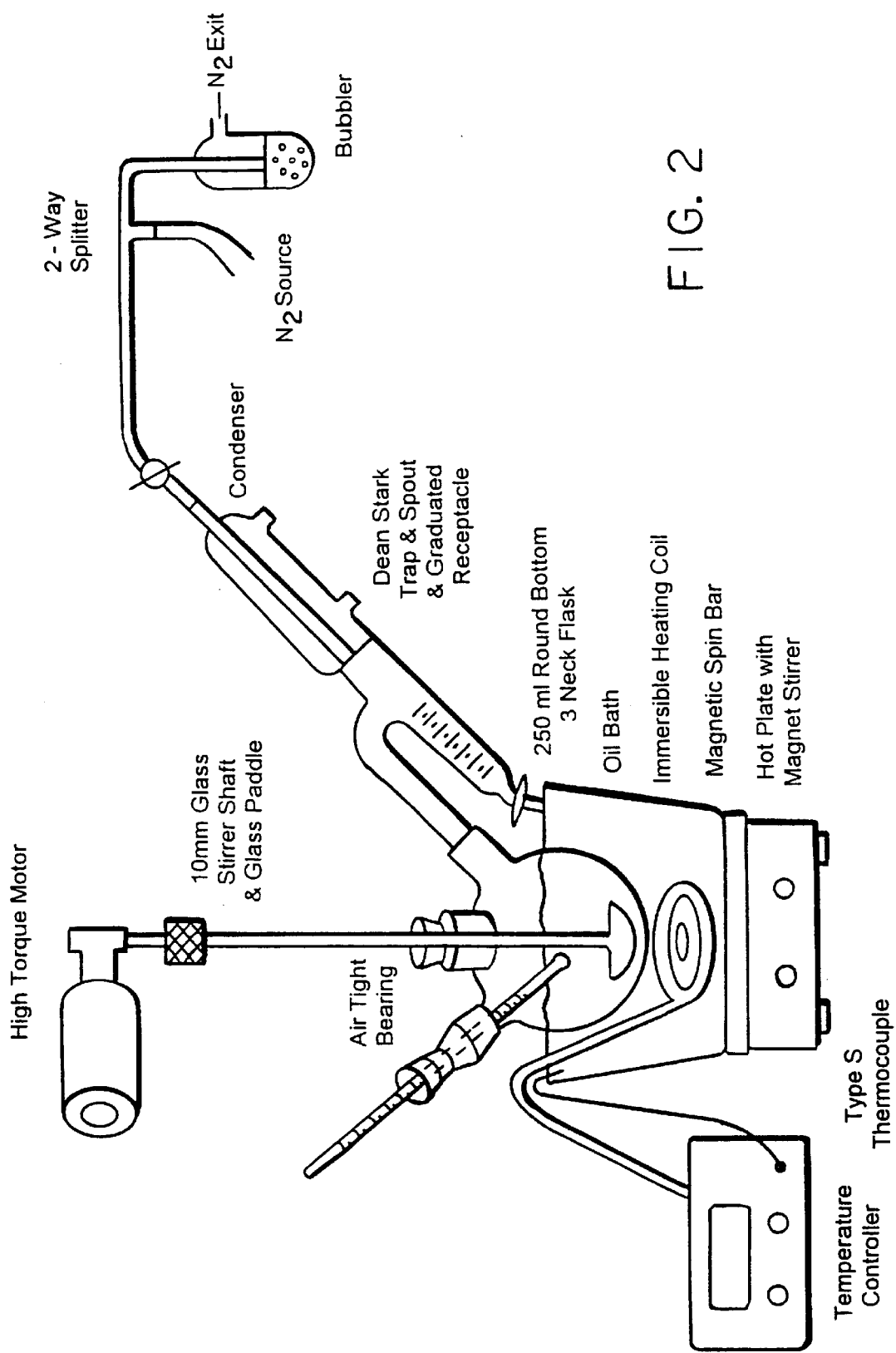
FIG. 2 shows an apparatus for the synthesis of the bis(methyl vinyl dioxolane)- 1,4-cyclohexanedicarboxylate prepolymer (PEVD).

The HMVD polyester prepolymer synthesis involves replacing the methoxy group of dimethyl 1,4-cyclohexanedicarboxylate with methoxyvinyl dioxolane using sodium methoxide as a catalyst at elevated temperatures. Several reactions were carried out with each subsequent reaction undergoing modifications based on previous results and experiences before the final preparation procedure was developed. HMVD (505.09 g. 2.522 moles), dimethyl 1,4-cyclohexanedicarboxylate (656.66 g. 5.045 moles) and anhydrous toluene (656 g, as solvent) were weighed and added under an inert gas atmosphere in a glovebag to a three-necked round bottom flask equipped with a thermometer, mechanical overhead stirrer and Dean-Stark trap fitted with a condenser/nitrogen inlet (FIG. 2).

The reaction apparatus was removed from the glovebag and the mixture was stirred at ambient temperature under a positive nitrogen atmosphere until a solution resulted.

It is essential to establish anhydrous conditions prior to prepolymer formation to avoid reversal of the ester interchange reaction at the elevated reaction temperatures. Any residual water was removed from the reaction solution before catalyst addition by distillation of first the water/toluene axeotrope (85° C. boiling point). Toluene was then distilled into the Dean-Stark trap at 145° C. to remove any residual water from the reaction solution as a toluene/water azeotrope, with the azeotrope being removed via the stopcock at the bottom of the trap. After cooling to ambient temperature, sodium methoxide (7.56 g. 0.140 mole) was then added to the colorless water-free solution and the resulting orangish colored dispersion heated to reflux to initiate formation of the prepolymer product.

The prepolymer was produced by heating the reaction dispersion at 110 to 155° C. for approximately 7 hours. The progress of the reaction was monitored by the evolution of methanol, infrared spectroscopy and thin layer chromatography as discussed in more detail in Example 4 below. The evolved methanol was collected and measured in the Dean-Stark trap as its methanol/toluene azeotrope, with the azeotrope again being removed via the stopcock. The dark orangish colored dispersion was cooled to ambient temperatures after it was determined that the reaction had gone to completion.

The disappearance of the hydroxyl group of HMVD as the dioxolane was incorporated into the ester product was monitored by infrared (IR) spectroscopy. Organic functional groups such as hydroxyl (—OH), ester [—C(O)O—] and vinyl ($H_2C=CH$—) absorb light in the IR region of the electromagnetic spectrum. The locations of these absorption peaks are very characteristic of the types of organic functional groups in the material and their presence, absence or changes in intensity can be related to the material chemical structure or changes that it is undergoing due to chemical reactions. Samples of the reaction dispersion were withdrawn at various times after addition of the sodium methoxide catalyst. Several drops of the dispersion were placed on a sodium chloride IR disk and allowed to evaporate to dryness. The IR spectrum of the dispersion residue was obtained and analyzed for the absence of hydroxyl groups (the —OH stretch of HMVD appears at 3433 $cm^{-1}$) and retention of ester (the C=O stretch of aliphatic esters appear at 1750 to 1735 $cm^{-1}$), vinyl (the $=CH_2$ $\delta_{ip}$ appears at 1438 $cm^{-1}$) and dioxolane (—C—O—C— ring stretch appear at 984 and 943 $cm^{-1}$) groups (Fresenius, W., supra). IR spectroscopy was used to not only monitor the reaction progress but also confirm the presence of desired functional groups in the material upon exposure to reactive environments.

Thin layer chromatography (TLC) was used to detect the appearance of the product and the disappearance of the dioxolane and dimethyl cyclohexanedicarboxylate. Solubility and TLC experiments were initially carried out and the results used to select a 4/1 volume mixture of $CH_2Cl_2$/hexane as the elutent. Solutions containing the material(s) of interest were "spotted" approximately 0.5 in. from the bottom of an alumnia TLC plate, the "spots" allowed to air dry, the "spotted"plate was then placed into a sealed glass jar such that the plate bottom was immersed in the elutent and the elutent permitted to migrate up the plate to within 0.5 to 1 in. from the top of the plate. As the elutent travels up the TLC plate, it first dissolves the material(s) forming a solution, the compound(s) absorb/desorb on the aluminum oxide as the solution migration continues, with the individual compound migration rate being determined by the strength of this absorption/desorption, and the migration allowed to continue until the elutent reaches the plate top. An appropriate elutent would allow all compounds to migrate from their initial "spot", with one of the materials migrating to near the top of the plate, and sufficient separation in distance between the other compound "spots" to allow good resolution. Visualization of the compound(s) migration was accomplished by using either a UV source or an iodine vapor staining procedure. Individual solutions containing each of the reactants were eluted along with the reaction solution for comparison purposes. In this manner, the appearance of a new spot (reaction product) and the disappearance of reactant spots can be monitored with time. These methods are further discussed in Example 4 below.

Two different PEVD purification methods were investigated. One involved washing a dichloromethane solution of the resin with water to extract residual sodium methoxide and any sodium hydroxide which may have formed in the reaction into the aqueous phase. The dichloromethane solution was treated with anhydrous magnesium sulfate to remove residual water, filtered to remove the drying agent, and then the clear pale yellow filtrate was concentrated at 70° C. under reduced pressure. IR spectroscopy was used to confirm the absence of solvent and presence of PEVD prepolymer. However, this procedure required numerous steps, required a substantial amount of time and was thus judged unsatisfactory compared to the following purification procedure.

The crude HMVD/dimethyl cyclohexanedicarboxylate PEVD prepolymer was purified by first dissolving it into an equal volume of $CH_2Cl_2$ and filtering the orangish colored solution through a buchner fritted funnel to remove the sodium emthoxide catalyst and any gels that had formed. The filtrate was eluted through a column of neutral aluminum oxide to remove residual colored impurities, and concentrated at 50 to 100° C. under vacuum (76 cm Hg). The purified prepolymer was clear, yellow in color and exhibited a syrup-like viscosity. Typical yields of the purified PEVD prepolymer ranged from 89 to 77 weight %. The PEVD prepolymer is very stable at ambient temperatures when stored under an inert atmosphere, with its color and viscosity remaining unchanged over several months.

Example 2

PEVD Characterization

IR spectroscopy and TLC were used to characterize the PEVD prepolymer. TLC indicated the presence of reactants in the prepolymer as well as its purity, considered purified if only one spot appeared on the TLC plate upon exposure. A Boemem Michaelson FTIR spectrometer operating from 4000 to 600 $cm^{-1}$ was used to monitor the progress of the PEVD prepolymer synthesis and determine its chemical structure. IR spectra were obtained using a sodium chloride IR disk coated with either the reaction dispersion residue or PEVD. $^1$H- and $^{13}$C- nuclear magnetic resonance (NMR) spectroscopy was performed on sample of PEVD prepolymer dissolved in deuterated chloroform using a 300 MHz Varian FT-NMR located at Brandeis University, Waltham, Mass. The chemical structural determination of PEVD from its IR and NMR spectra is discussed below.

Figure 3:
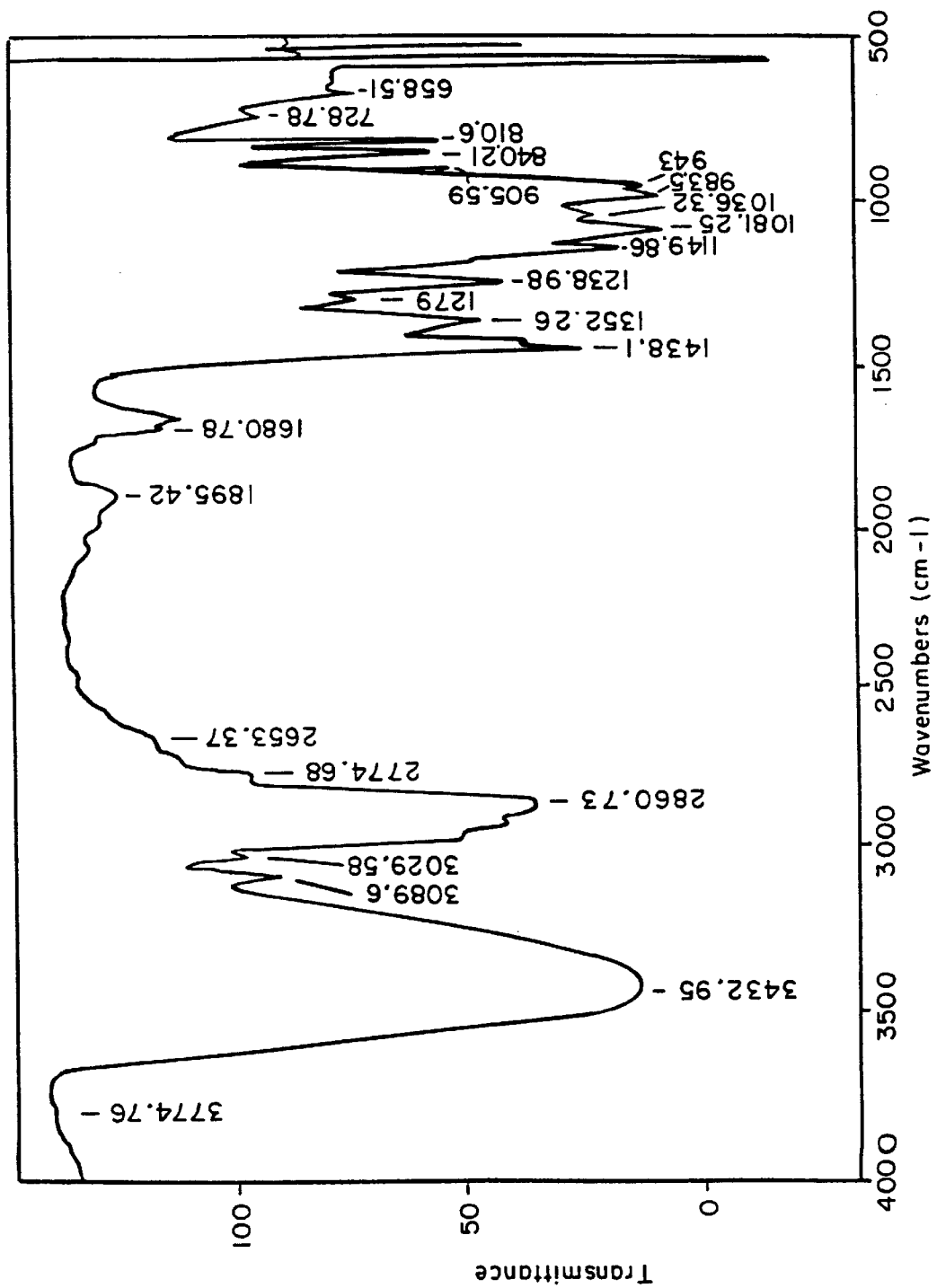
FIG. 3 shows the IR spectra of 2-vinyl-4-hydroxymethyl-1,3-dioxolane (HMVD).
Figure 4:
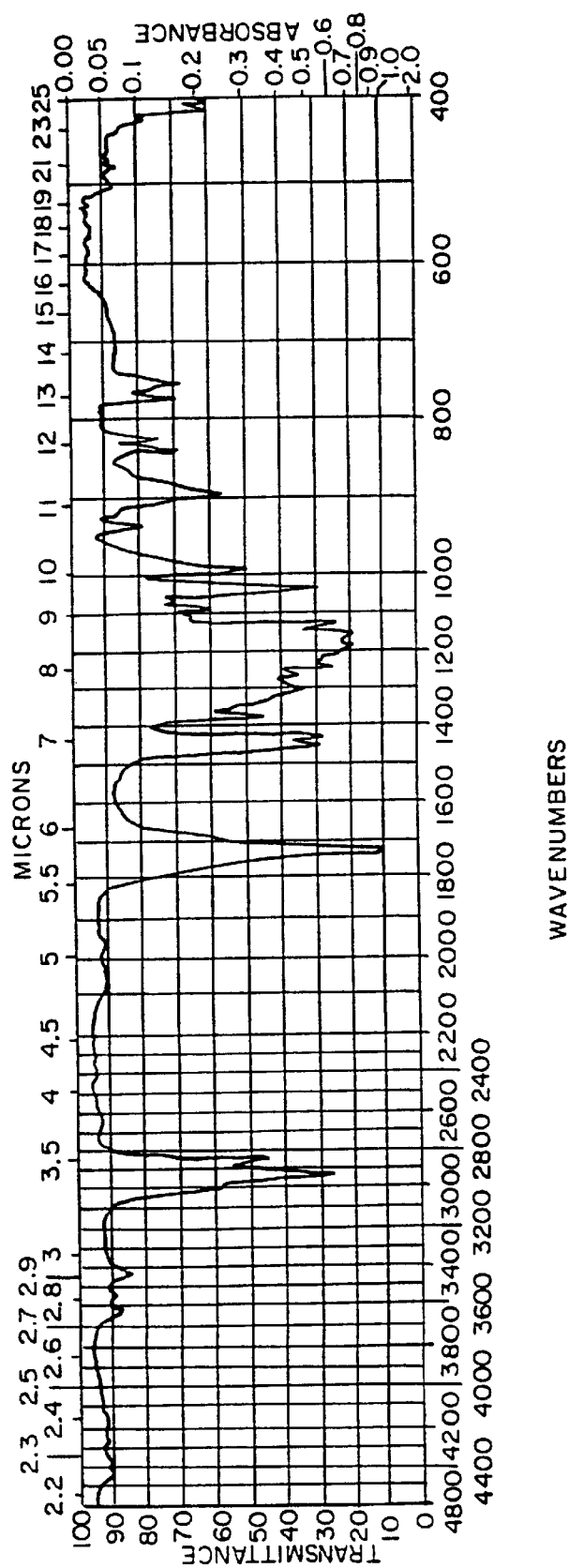
FIG. 4 shows the IR spectra of dimethyl 1,4-cyclohexanedicarboxylate.

The progress of the synthesis reaction was monitored by observing changes in the IR spectrum of HMVD, while verifying other portions of the HMVD and cyclohexanedicarboxylate spectra remained unchanged. The absorption peaks of interest consisted of the cyclohexanedicarboxylate ester [—C(O)O—] and HMVD hydroxyl (—OH), vinyl ($H_2C=CH$—) and dioxolane ring (—C—O —C—). Absorption peak assignments were made based on the IR spectra of similar known compounds and spectral data tables. The absorption attributed to the —OH stretch of HMVD appears at 3433 $cm^{-1}$ while absorptions typical for dioxolane ring (—C—O —C—) stretch appear at 984 and 943 $cm^{-1}$ (FIG. 3) (Fresenius, W.; Huber, J. F. K.; Pungor, E.; Rechnitx, G. A.; Simon, W.; West, Ths. S., *Tables of Spectral Data for Structure Determination of Organic Compounds*, 2nd edition, Springer-Verlag, NY, 1989). Absorptions assigned to the C=O stretch of aliphatic esters appear at 1750 to 1735 $cm^{-1}$ (Fresenius, W. et al., supra). with dimethyl 1,4-cyclohoexanedicarboxylate having an absorption at 1734 $cm^{-1}$ (FIG. 4) (Pouchert, C. J., *The Aldrich Library of FT-IR Spectra*, edition 1, Aldrich Chemical Company, Inc., WI, 1985). This is sufficient spectral data to allow the monitoring of the progression of PEVD formation.

It is the disappearance of the pronounced absorption of HMVD at 3433 cm$^{-1}$ as HMVD becomes attached to the 1,4-cyclohexanedicarboxylate unit, forming the ester linkage, that was used to monitor the progress of the reaction. The displaced methoxy groups are converted into methanol under the reaction conditions, are distilled as a methanol/toluene azeotrope out of the reaction solution into the Dean-Stark trap, removed via the stopcock at the trap bottom, and the azeotrope volume measured using a graduated cylinder. Azeotrope distillation was confirmed by IR spectroscopy and boiling point, occurring at 63.7° C. rather than 64.7° C. (methanol) or 110.6° C. (toluene) (Weast, R. C., *Handbook of Chemistry and Physics*, 49th edition, The Chemical Rubber Co., Cleveland, Ohio, 1968). The amount of evolved methanol can be calculated from the azeotrope volume and its reported composition (Weast, R. C., supra). IR spectroscopy was also used to confirm the retention of other functional groups in PEVD initially present in HMVD, the dioxolane ring (—C—O—C— absorptions at 984 and 943 cm$^{-1}$) and vinyl (=CH$_2$ $\delta_{ip}$ absorption at 1438 cm$^{-1}$). Reformation of the ester linkage [—C(O)O—] was confirmed by the observation of an absorption at 1732 cm$^{-1}$, attributed to the C=O stretch.

Figure 5:
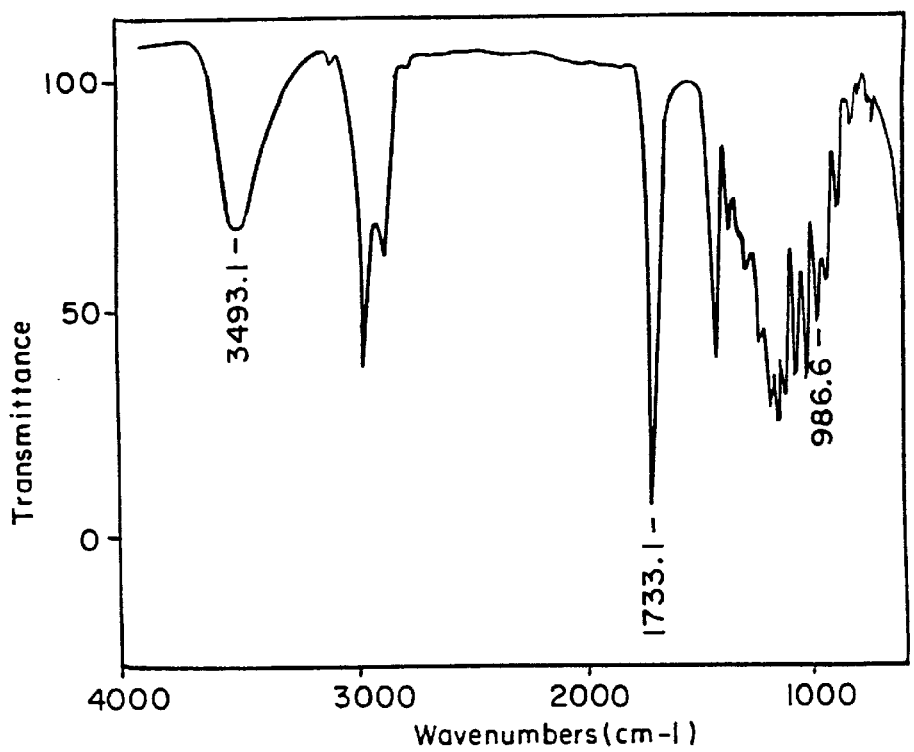
FIG. 5 shows the IR spectra of the reaction dispersion prior to any prepolymer formation.
Figure 6:
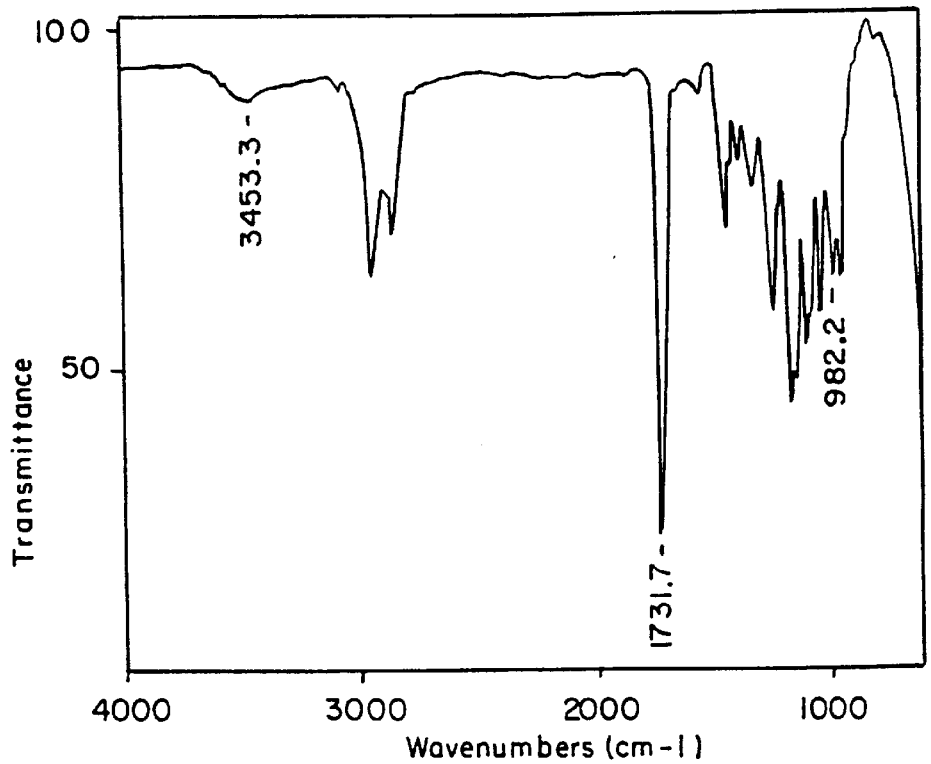
FIG. 6 shows the IR spectra of the reaction dispersion AFTER appreciable amounts of PEVD prepolymer has formedation.

The IR spectrum of the reaction dispersion prior to any prepolymer formation (FIG. 5) showed absorptions at 3493 (—OH). 1733 (C=O), 987 (—C—O—C—) and 940 (—C—O—C—) cm$^{-1}$, indicating that both reactants are present. The catalyst was then added and the reaction temperature gradually increased until methanol/toluene azeotrope distillation began. The reaction temperature was maintained at 100 to 125° C. for approximately 5 hours until azeotrope distillation ceased. After allowing the reaction to proceed almost to completion, the IR spectrum of the reaction dispersion had lost the —OH absorption at 3490 cm$^{-1}$ while maintaining an ester C=O absorption at 1732 cm$^{-1}$ and vinyl dioxolane absorptions at 1483, 982 and 940 cm$^{-1}$, indicating the dioxolane ring and pendant vinyl groups are still intact at the end of the reaction (FIG. 6). The reaction temperature was increased to 140 to 155° C. for approximately 2 hours to ensure the reaction had gone to completion and then cooled to ambient temperatures. The time the reactants and PEVD prepolymer are exposed to elevated temperatures must be minimized in order to avoid undesirable side-reactions that generate color and cross-links which result in gelation. The completeness of the reaction was confirmed by thin layer chromatography (TLC) and IR spectroscopy.

Figure 7:
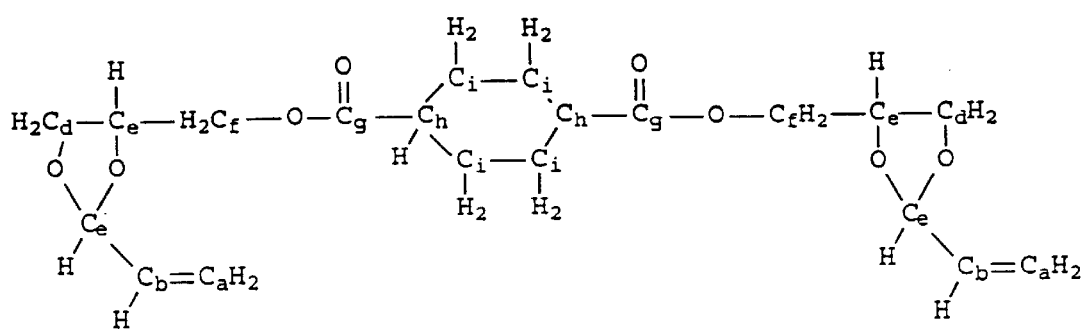
FIG. 7 shows the chemical structure of PEVD prepolymer labeled for NMR analysis.
Figure 8:
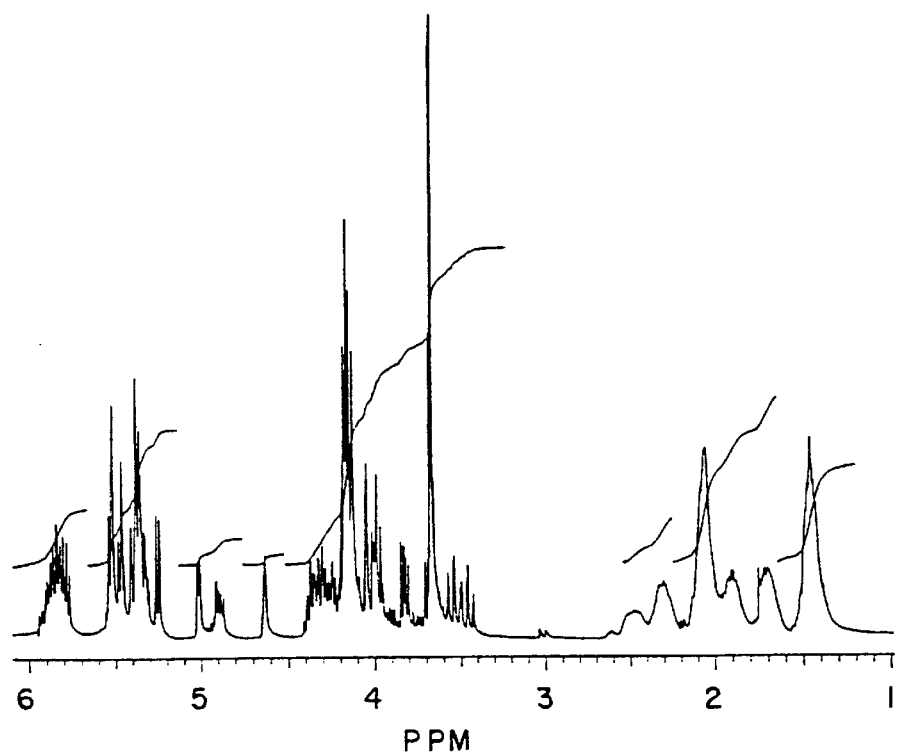
FIG. 8 shows the HNMR spectrum of purified PEVD prepolymer.
Figure 9:
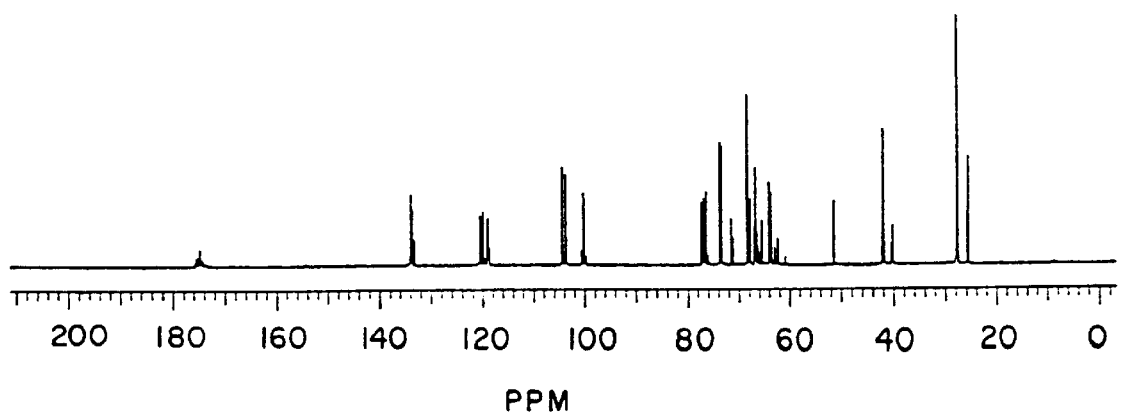
FIG. 9 shows the CNMR spectrum of purified PEVD prepolymer.

$^{1}$H- and $^{13}$C- nuclear magnetic resonance (NMR) spectroscopy were performed on a sample of the HMVD/cyclohexanedicarboxylate PEVD prepolymer dissolved in deuterated chloroform using a 300 MHz Varian FT-NMR. The spectra are complicated due to the presence of impurities and isomers in both HMVD and dimethyl 1,4-cyclohexanedicarboxylate. Assignment of each absorption peak to a structural unit in the PEVD prepolymer (FIG. 7) was not done. The IHNMR spectrum (FIG. 8) contains numerous absorption peaks which have been separated into regions as listed in Table 2. Comparison of the intensity of the 5.95–5.75 and 5.60–5.29 ppm vinyl group regions (1.5+ 3.1=4.6 intensity) to that of the 2.70–1.30 ppm C$_1$ region of the cyclohexyl group (eight intensity) suggests not every methoxy group of dimethyl 1,4-cyclohexanedicarboxylate has been replaced by hydroxymethyl vinyl dioxolane groups. This conclusion is supported by the $^{13}$CNMR spectrum of PEVD (FIG. 9) which shows an absorption at 51.4 ppm, a value typical for methoxy esters (Fresenius, W. et al., supra). The presence of ester linkages [—C(O)O—], vinyl groups (H$_2$C=CH—), dioxolane and cyclohexyl ring systems in PEVD is indicated based on the $^{13}$CNMR spectrum as listed in Table 3 (Fresenius, W., et al., supra)). NMR data generally support the proposed chemical structure of PEVD, but also indicate complete replacement of methoxy groups by hydroxymethyl vinyl dioxolane groups has not occurred.

Prepolymer synthesis conditions can be modified, if desired, to obtain more complete conversion to the PEVD prepolymer by altering the reaction conditions, e.g., to increase the activity of the polymer, by removing by-products, and other alterations that will be apparent to the skilled artisan.

TABLE 3

$^{1}$HNMR spectral data and assignment

| Absorption Peak (ppm) | Experimental Peak Intensity Ratio | Theoretical Peak Intensity Ratio | Assignment |
| --- | --- | --- | --- |
| 5.95–5.75 | 1.5 | 2 | H on C$_b$ of vinyl group |
| 5.60–5.29 | 3.1 | 4 | Hs on C$_a$ of vinyl group |
| 5.28–5.23 | 0.5 | — | — |
| 5.04–4.98 | 0.4 | — | — |
| 4.95–4.85 | 0.4 | — | — |
| 4.63 | 0.4 | — | — |
| 4.41–3.40 | 8.1 | — | — |
| 2.70–1.30 | 8.0 | 8 | Hs on C$_i$ of cyclohexyl group |

TABLE 4

$^{13}$CNMR spectral data and assignment

| Absorption Peak (ppm) | Assignment |
| --- | --- |
| 175.6–174.5 | C$_g$: carbonyl group |
| 134.0–133.5 | C$_b$: carbon of vinyl group |
| 120.7–119.1 | C$_a$: carbon of vinyl group |
| 140.4–99.9 | C$_c$: dioxolane ring carbon |
| 76.1–61.6 | C$_{d,e,f}$: dioxolane ring carbons |
| 51.4 | Carbon of methoxy group |
| 42.3–40.5 | C$_h$: carbons of cyclohexyl group |
| 28.0–25.9 | C$_i$: carbons of cyclohexyl group |

Example 3

PEVD Coating Catalysis Experiments

The PEVD prepolymer must undergo a free-radical cross-linking reaction involving the pendant vinyl groups of neighboring prepolymer molecules in order to form good quality coatings.

Figure 10:
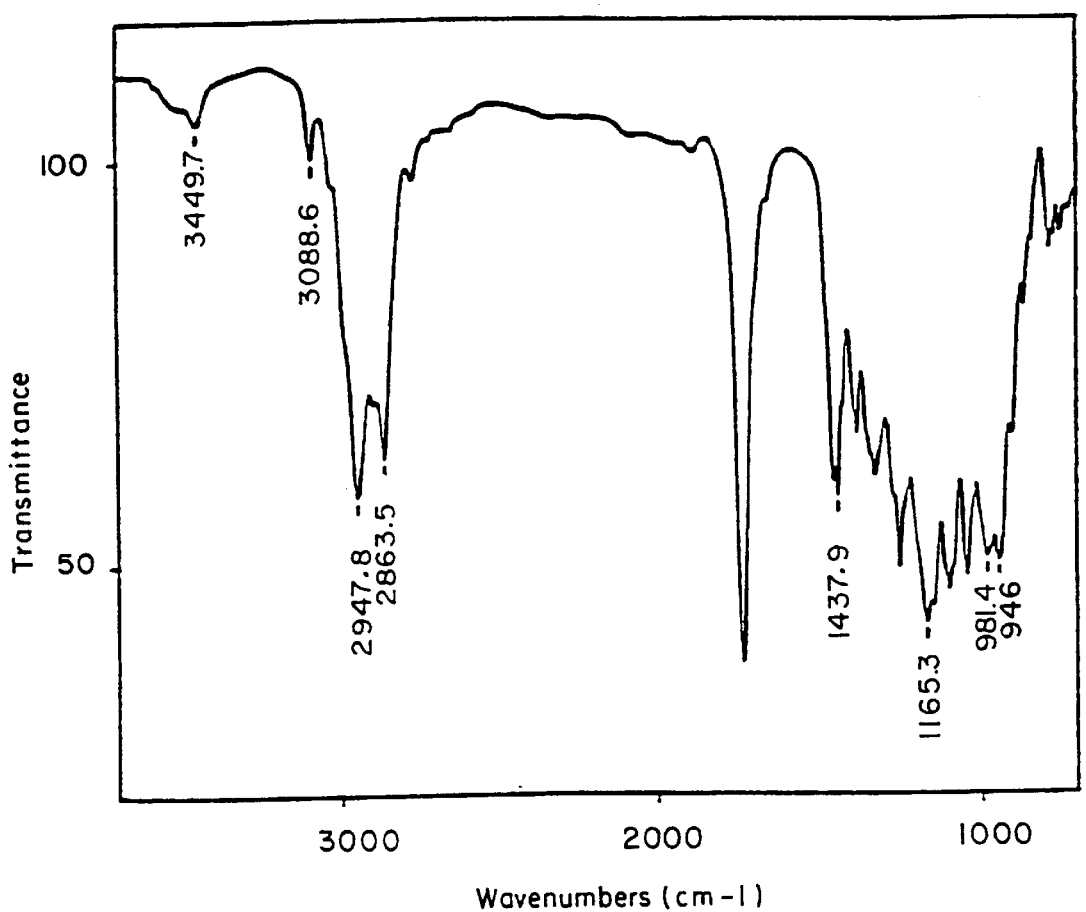
FIG. 10 shows the IR spectrum of PEVD prepolymer.
Figure 11:
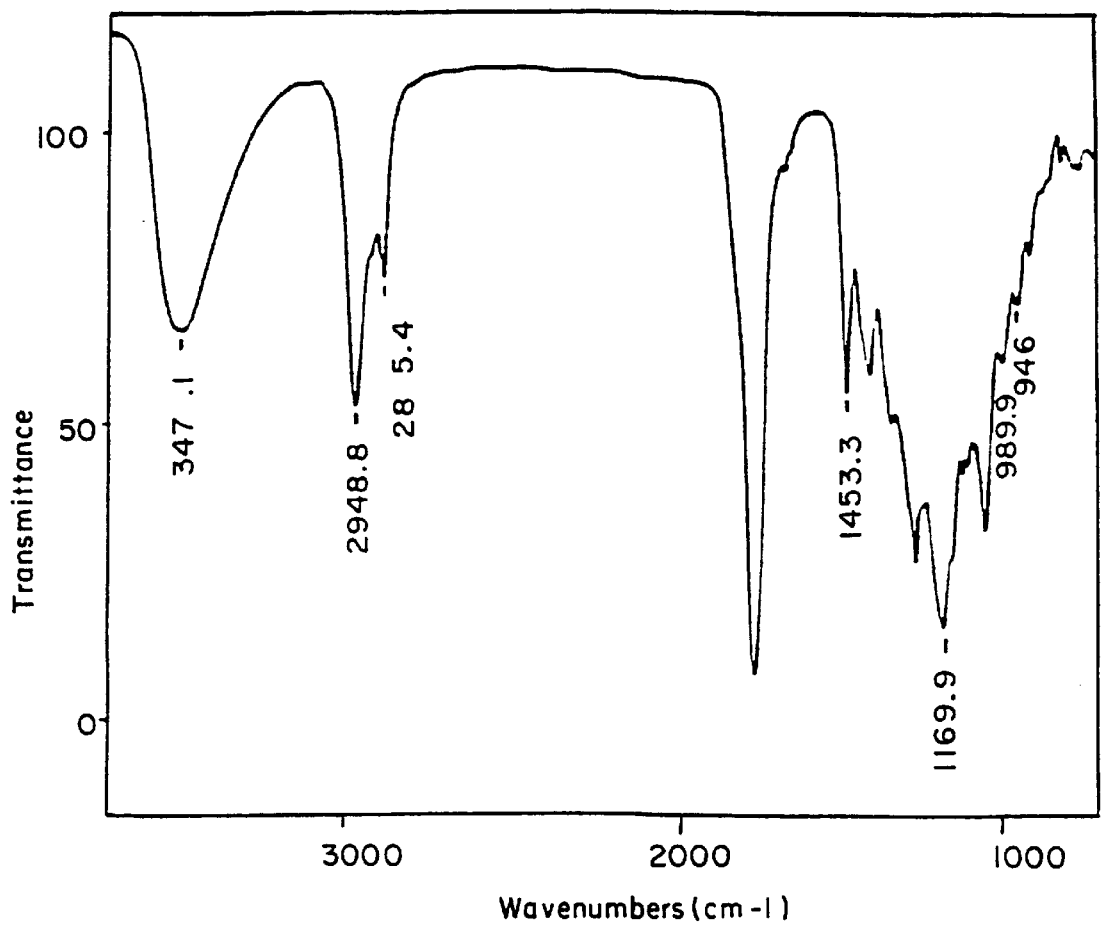
FIG. 11 shows the IR spectra of PEVD prepolymer 9 (no catalyst) after 24 hours at ambient temperature, 50 and 100° C.

Peroxide radicals are generated from the dioxolane group by a ring-opening process due to its interaction with air (O$_2$), catalyst and elevated temperatures. This reaction occurs in the presence of air and without the aid of any catalyst only upon heating coatings at 100° C. for 24 hours. In the PEVD system of the present invention, peroxide generation is accompanied by formation of hydroxyl (—OH) functional groups with the corresponding disappearance of dioxolane rings (—C—O—C—) and the progress of this reaction can be monitored using IR spectroscopy by the appearance of an absorption at approximately 3450 cm$^{-1}$ and decrease in absorptions at 980 and 940 cm$^{-1}$ (Fresenius, W. et al., supra)). Spectral changes that occurred upon heating the PEVD prepolymer at elevated temperatures are shown in FIGS. 10 and 11, with the values and tentative assignments listed in Table 4.

PEVD polymers are formed by the reaction of dioxolane produced peroxide radicals with the pendant vinyl groups, which create cross-links between adjacent prepolymer molecules composed of saturated C—C bonds, allowing the progress of the coating curing (cross-linking) reaction to be monitored using IR spectroscopy by the disappearance of the vinyl ($=CH_2\delta_{ip}$) absorption at 1438 $cm^{-1}$. IR spectroscopy as well as coating appearance was used to monitor the effectiveness of the catalyst on inducing PEVD curing.

Investigations were initially carried out on cobalt, manganese, vanadium and cerium based oxidative polymerization catalysts to determine the effectiveness of each metal based catalyst with respect to curing the PEVD coating compositions of the present invention, as well as their ability to form particle-free coating solutions. The compositions of tested PEVD coating compositions Numbers 1 through 22 and appearance at various stages of formation is set forth in Tables 5 to 8 below.

Manganese, vanadium and cerium at concentrations of 1.0, 0.1 and 0.1 weight % (Formulation Nos. 6, 12 and 14) caused substantial particle formation in the resin (Table 5). Vanadium octoate reportedly has the ability to catalyze the decomposition of peroxides and has been used to accelerate the curing of some unsaturated polyester resins at $\leq 0°$ C. (OMG). However, coatings containing vanadium and dicumylperoxide at concentrations of 0.2 and 1.0 weight % did not fully cure until heated at 100° C. for 24 hours (Formulation No. 13). Manganese at a weight % concentration of 0.5 did not fully cure the PEVD prepolymers tested after 24 hours each at ambient temperatures

TABLE 5

IR spectral changes occurring upon PEVD prepolymer curing at elevated temperatures

| IR Frequency ($cm^{-1}$) | Absorption Peak Intensity | Tentative Assignment of Absorption Peak |
| --- | --- | --- |
| 3476 | Increasing | Formation of hydroxyl (—OH) groups due to dioxolane ring opening |
| 3089 | Decreasing | — |
| 2864 | Decreasing | Relative intensity decreases compared to absorption at 2948 $cm^{-1}$ |
| 1438 | Decreasing | $=CH_2\ \delta_{ip}$ of pendant vinyl group |
| 1165 | Increasing | — |
| 1097 | Decreasing | — |
| 981 | Decreasing | C—O—C stretch of dioxolane ring system |
| 946 | Decreasing | C—O—C stretch of dioxolane ring system | and 50° C., becoming fully cured only upon heating at 100° C. for 24 hours (Tables 6, 7, and 8). A similar effect was observed for PEVD prepolymers containing no catalyst at all, indicating manganese has an insignificant effect on PEVD curing at this concentration level.

In marked contrast, it was determined that concentrations of cobalt between 0.12 and 1.0 weight % should result in a coating solution capable of being cured upon exposure to temperatures of 50 to 100° C. for 24 hours (Formulation Nos. 3 and 4). Therefore, cobalt, in particular cobalt octoate, is the preferred oxidative polymerization catalyst for the PEVD coating compositions of the present invention.

Investigations were carried out to determine whether reflectance/absorbance IR spectroscopy (RAIR) with a Foster-Miller designed remote probe could effectively be used to monitor coating curing, yielding a simple and quick method to determine catalyst performance without marring coating appearance. Unfortunately, spectral regions below 1000 $cm^{-1}$ cannot be viewed due to the type of optical cable used in the probe and thus any changes in the dioxolane ring system (appearing at 980 and 940 $cm^{-1}$) could not be monitored.

Coating formulations (No. 3 and No. 13) were spread at a thickness of 2 to 3 mils onto chromated aluminum and steel panels in a clean room environment. The panel surface was cleaned with acetone, wiped with a cloth and dried at 100° C. for an hour prior to coating. Coated panels were immediately placed in a low humidity chamber and allowed to dry at ambient temperature for 24 hours with both coatings being incompletely cured at this point. The panels were placed in a preheated static air oven at 50° C. for 24 hours with coating No. 3 curing to a hard surface while coating No. 13 having a thick skin over a fluid resin layer.

Figure 12:
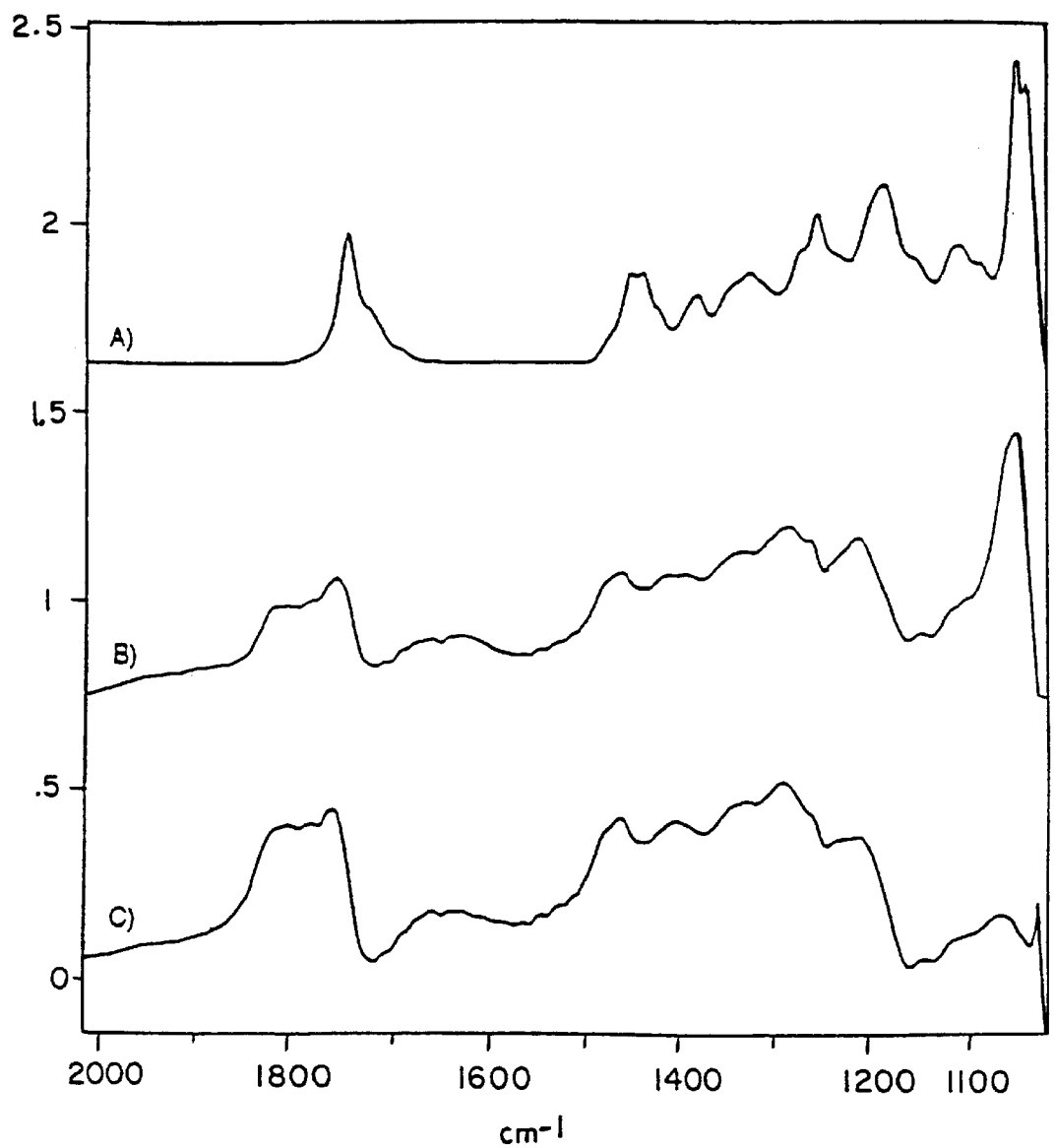
FIG. 12 shows the RAIR spectra of the prepolymer (a) and formulation No. 3 upon heating at 50° C. (b) and 100° C.

RAIR spectra for these coatings after the 50° C. cure (Table 9, FIG. 12, Spectrum B and 13, Spectrum B show significant changes have occurred upon heating (Spectrum B) compared to an unheated PEVD control (Spectrum A). The IR spectrum of coating No. 13 was very similar to that of the control PEVD, except for low intensity absorptions appearing at 1700 and 1635 $cm^{-1}$] in the region normally associated with —C=O stretches. More changes were observed in the spectrum of coating No 3 upon heating; with significant differences occurring at 1830, 1755, 1630, 1252 and 1209 and 1103 $cm^{-1}$.

The ester [—C(O)O—] group concentration is decreasing based on the reduced intensity of the absorption at 1755 $cm^{-1}$, indicating it is being transformed into another type of group. The disappearance of the absorption at 1252 $cm^{-1}$ may also be linked to the ester decrease because it appears in a spectral region normally associated with the —C—O stretch of esters (1330 to 1050 $cm^{-1}$). Absorptions appear at 1830 and 1630 $cm^{-1}$, indicating new groups are being created, but their identity is unknown due to insufficient data. The absorption at 1463 $cm^{-1}$ was only slightly less intense upon heating, suggesting limited cross-linking of the pendant vinyl groups had occurred, but the coating had cured to a hard surface. A possible explanation for coating cure may be involvement of the transformed ester groups in cross-linking together PEVD molecules.

TABLE 6

Appearance of coating formulation upon mixing of components

| Coating Formulation Number | Coating Formulation Composition (weight %) | Observations |
| --- | --- | --- |
| 1 | 0.024 Cobalt[1] | — |
| 2 | 0.048 Cobalt[2] | — |
| 3 | 0.12 Cobalt[2] | Dark blue solution resulted. |
| 4 | 1.0 Cobalt[2] | Particles precipitated out of initial purplish colored solution after 1 hr. |
| 5 | 0.5 Manganese[3] | Tannish colored solution formed. |
| 6 | 1.0 Manganese[3] | Manganese catalyst agglomerated in resin. |
| 7 | 0.12 Cobalt[2], 1.0 Methylethyl ketone peroxide | Colorless PEVD/peroxide solution developed a brown color, outgassed, and a brown precipitate formed upon addition of cobalt catalyst. |
| 8 | 0.12 Cobalt[2], 0.50 Dimethylaniline | Particles precipitated out of initial purplish colored solution after 1 hr. |
| 9 | 1.0 Cobalt[2], 0.5 Dimethylaniline | Dark blue solution resulted. |
| 10 | 0.12 Cobalt[2], 0.30 2,2'-Bipyridine | Dark tan colored solution containing a small amount of precipitate resulted. |

TABLE 6-continued

Appearance of coating formulation upon mixing of components

| Coating Formulation Number | Coating Formulation Composition (weight %) | Observations |
|---|---|---|
| 11 | 0.5 Cobalt[2], 0.5 Manganese[3] | Cobalt catalyst formed a solution but agglomeration occurred upon addition of manganese catalyst. |
| 12 | 0.1 Vanadium[4] | Particles precipitated from a solution after 10 min. |
| 13 | 0.02 Vanadium[4], 1.0 Dicumylperoxide | Very light tan colored solution resulted. |
| 14 | 0.1 Cerium[5] | Particles precipitated from a solution after 45 min. |
| 15 | 0.05 Cobalt[2], 0.6 Aluminum[6] | Light reddish colored solution. |
| 16 | 0.063 Cobalt[2], 0.6 Aluminum[6] | Light reddish colored solution. |
| 17 | 0.25 Cobalt[2], 0.5 Aluminum[6] | Very small amount of precipitate in a deep blue solution. |
| 18 | 0.5 Cobalt[2], 0.5 Aluminum[6] | Particles precipitated out of initial purplish colored solution after 1 hr. |
| 19 | 0.063 Cobalt[1], 0.6 Aluminum[6], 0.225 Zinc[7] | Light reddish colored solution. |
| 20 | 0.25 Cobalt[2], 0.5 Aluminum[6], 0.1 Zinc[7] | Deep blue colored solution. |
| 21 | 0.25 Cobalt[1], 0.5 Aluminum[6], 0.3 Zinc[7] | Deep blue colored solution. |
| 22 | 0.5 Cobalt[2], 0.5 Aluminum[6], 0.3 Zinc[7] | Very small amount of precipitate in deep purple colored solution. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 7

Appearance of coating upon curing at ambient temperatures for 24 hours

| Coating Formulation Number | Coating Formulation Composition (weight %) | Observations |
|---|---|---|
| Control | — | Resin was fluid. No cure indicated even after 5 days. |
| 1 | 0.024 Cobalt[1] | Resin was fluid. No cure indicated even after 5 days. |
| 2 | 0.048 Cobalt[2] | Resin was fluid. No cure indicated even after 5 days. |
| 3 | 0.12 Cobalt[2] | Coating was fluid. Some areas have skinned over. There is some precipitate present in the coating around which "fisheyes" have formed. |
| 4 | 1.0 Cobalt[2] | Thick skin developed over uncured resin layer. Significant resin curing had occurred. |
| 5 | 0.5 Manganese[3] | Resin was fluid. No cure indicated. |
| 7 | 0.12 Cobalt[2], 1.0 Methylethyl ketone peroxide | Results were similar to formulation No. 3 except there is a greater number of "fisheyes" due to a greater amount of precipitate in the resin. |
| 8 | 0.12 Cobalt[2], 0.50 Dimethylaniline | Resin had thickened and remained evenly coated on substrate surface. No "fisheyes" were observed. Coating was very good in appearance. |
| 9 | 1.0 Cobalt[2], 0.5 Dimethylaniline | Thick skin developed over uncured resin layer. Significant resin curing had occurred. |
| 10 | 0.12 Cobalt[2], 0.30 2,2'-Bipyridine | Resin had thickened and remained evenly coated on substrate surface. No "fisheyes" were observed. Coating was very good in appearance. |
| 13 | 0.02 Vanadium[4], 1.0 Dicumylperoxide | Resin had thickened and remained evenly coated on substrate surface. No "fisheyes" were observed. Coating was very good in appearance. |
| 15 | 0.05 Cobalt[2], 0.6 Aluminum[6] | Coating was smooth, shiny and tacky to the touch. |
| 16 | 0.063 Cobalt[2], 0.6 Aluminum[6] | Coating was smooth, shiny and tacky to the touch. |
| 17 | 0.25 Cobalt[2], 0.5 Aluminum[6] | Coating was smooth, shiny and glossy. |
| 18 | 0.5 Cobalt[2], 0.5 Aluminum[6] | Thick skin developed over gelatinous resin layer. Coating was very wrinkled. Significant resin curing had occurred. |
| 19 | 0.063 Cobalt[1], 0.6 Aluminum[6], 0.225 Zinc[7] | Coating was smooth, shiny and tacky to the touch. |
| 20 | 0.25 Cobalt[2], 0.5 Aluminum[6], 0.1 Zinc[7] | Coating was smooth, shiny, glossy but tacky to the touch. |
| 21 | 0.25 Cobalt[1,] 0.5 Aluminum[6], 0.3 Zinc[7] | Coating had a satin finish, was discolored and opaque. |
| 22 | 0.5 Cobalt[2], 0.5 Aluminum[6], 0.3 Zinc[7] | Coating had a satin finish, was tacky to the touch, opaque and discolored. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 8

Appearance of coating upon additional curing at 50° C. for 24 hours

| Coating Formulation Number | Coating Formulation Composition (weight %) | Observations |
|---|---|---|
| Control | — | Resin was fluid. No cure indicated. |
| 1 | 0.024 Cobalt[1] | Resin was fluid. No cure indicated. |
| 2 | 0.048 Cobalt[2] | Resin was fluid. No cure indicated. |
| 3 | 0.12 Cobalt[2] | Resin had cured to a hard, slightly blue colored coating. |
| 4 | 1.0 Cobalt[2] | Hard/Soft areas on coating. Coating almost fully cured. |
| 5 | 0.5 Manganese[3] | Resin was fluid. No cure indicated. |
| 7 | 0.12 Cobalt[2], 1.0 Methylethyl ketone peroxide | Resin had cured to a hard, shiny coating containing particulates and with some surface wrinkles. |
| 8 | 0.12 Cobalt[2], 0.50 Dimethylaniline | Resin had cured to form a hard and shiny coating. |

TABLE 8-continued

Appearance of coating upon additional curing at 50° C. for 24 hours

| Coating Formulation Number | Coating Formulation Composition (weight %) | Observations |
|---|---|---|
| 9 | 1.0 Cobalt[2], 0.5 Dimethylaniline | Hard/Soft areas on coating. Coating almost full cured. |
| 10 | 0.12 Cobalt[2], 0.30 2,2'-Bipyridine | Resin had cured to form a hard and shiny coating. |
| 13 | 0.02 Vanadium[4], 1.0 Dicumylperoxide | Coating had a thin skin with uncured resin underneath. Resin was not fully cured. |
| 15 | 0.05 Cobalt[2], 0.6 Aluminum[6] | Coating hardness increased but coating could be scratched with a fingernail. |
| 16 | 0.063 Cobalt[2], 0.6 Aluminum[6] | Coating hardness increased but coating could be scratched with a fingernail. |
| 17 | 0.25 Cobalt[2], 0.5 Aluminum[6] | Coating hardness increased but coating could be scratched with a fingernail. |
| 18 | 0.5 Cobalt[2], 0.5 Aluminum[6] | Coating hardness increased but coating could be scratched with a fingernail. |
| 19 | 0.063 Cobalt[1], 0.6 Aluminum[6], 0.225 Zinc[7] | Coating hardness increased but coating could be scratched with a fingernail. |
| 20 | 0.25 Cobalt[2], 0.5 Aluminum[6], 0.1 Zinc[7] | Coating hardness increased but coating could be scratched with a fingernail. |
| 21 | 0.25 Cobalt[1], 0.5 Aluminum[6], 0.3 Zinc[7] | Coating hardness increased but coating could be scratched with a fingernail. |
| 22 | 0.5 Cobalt[2], 0.5 Aluminum[6], 0.3 Zinc[7] | Coating hardness increased but coating could be scratched with a fingernail. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 9

Appearance of coating upon additional curing at 100° C. for 24 hours

| Coating Formulation Number | Coating Formulation Composition (weight %) | Observations |
|---|---|---|
| Control | — | Coating was fully cured. |
| 1 | 0.024 Cobalt[1] | Coating was fully cured. |
| 2 | 0.048 Cobalt[2] | Coating was fully cured. |
| 3 | 0.12 Cobalt[2] | Coating appeared to be hard and shiny, resembling a gloss urethane. Some surface wrinkles can be observed and coating also appears to have contaminants present. |
| 4 | 1.0 Cobalt[2] | Coating was fully cured. |
| 5 | 0.5 Manganese[3] | Coating was fully cured. |
| 7 | 0.12 Cobalt[2], 1.0 Methylethyl ketone peroxide | Coating appeared to be hard and shiny, resembling a semi-gloss urethane. Coating appears to contain contaminates. |
| 8 | 0.12 Cobalt[2], 0.50 Dimethylaniline | Coating was uniform, hard, and shiny. Coating resembled a gloss urethane. |
| 9 | 1.0 Cobalt[2], 0.5 Dimethylaniline | Coating was fully cured. |
| 10 | 0.12 Cobalt[2], 0.30 2,2'-Bipyridine | Resin cured to form a hard and very glossy coating. Coating contained some wrinkles and was yellow in color. |
| 13 | 0.02 Vanadium[4], 1.0 Dicumylperoxide | Resin cured to form a hard surface with a varied surface finish. |
| 15 | 0.05 Cobalt[2], 0.6 Aluminum[6] | Coating hardness increased but still could be scratched with a fingernail. Some coating discoloration observed. |
| 16 | 0.063 Cobalt[2], 0.6 Aluminum[6] | Coating hardness increased but still could be scratched with a fingernail. Some coating discoloration observed. |
| 17 | 0.25 Cobalt[2], 0.5 Aluminum[6] | Coating hardness increased but still could be scratched with a fingernail. Some coating discoloration observed. |
| 18 | 0.5 Cobalt[2], 0.5 Aluminum[6] | Coating hardness increased but still could be scratched with a fingernail. Some coating discoloration observed. |
| 19 | 0.063 Cobalt[1], 0.6 Aluminum[6], 0.225 Zinc[7] | Coating hardness increased but still could be scratched with a fingernail. Some coating discoloration observed. |
| 20 | 0.25 Cobalt[2], 0.5 Aluminum[6], 0.1 Zinc[7] | Coating hardness increased but still could be scratched with a fingernail. Some coating discoloration observed. |
| 21 | 0.25 Cobalt[1], 0.5 Aluminum[6], 0.3 Zinc[7] | Coating hardness increased but still could be scratched with a fingernail. Some coating discoloration observed. |
| 22 | 0.5 Cobalt[2], 0.5 Aluminum[6], 0.3 Zinc[7] | Coating hardness increased but still could be scratched with a fingernail. Some coating discoloration observed. |

[1]Cobalt metal as cobalt naphthenate
[2]Cobalt metal as cobalt octoate
[3]Manganese metal as manganese mixed carboxylates
[4]Vanadium metal as vanadium octoate
[5]Cerium metal as cerium octoate
[6]Aluminum metal as aluminum organic complex
[7]Zinc metal as zinc octoate

TABLE 10

RAIR spectra changes upon coating curing at 50° C.

| Unheated | Formulations | | | |
|---|---|---|---|---|
| Resin with No Catalyst (cm⁻¹) | No. 3 (cm⁻¹) | Spectral Observations (Changes Upon Comparing B to A) | No. 13 (cm⁻¹) | Spectral Observations (Changes Upon Comparing B to A) |
| | 1830 | Appeared | | |
| 1743 | 1755 | Significantly less | 1747 | Similar |
| | | | 1700 | Appeared |
| | 1630 | Appeared | 1635 | Appeared |
| 1440 | 1463 | Slightly less intense | 1458 | Slightly less intense |
| 1381 | 1402 | Slightly less intense | 1404 | Slightly less intense |
| 1325 | 1330 | Slightly less intense | 1327 | Slightly less intense |
| 1282 | 1282 | Similar | 1278 | Slightly more intense |
| 1252 | | Absent | 1256 | Similar |
| 1183 | 1209 | Significantly less | 1205 | Similar |
| 1106 | 1103 | Less intense | 1110 | Similar |
| 1047 and 1040 | 1047 | Similar | 1063 | Similar |

Figure 13:
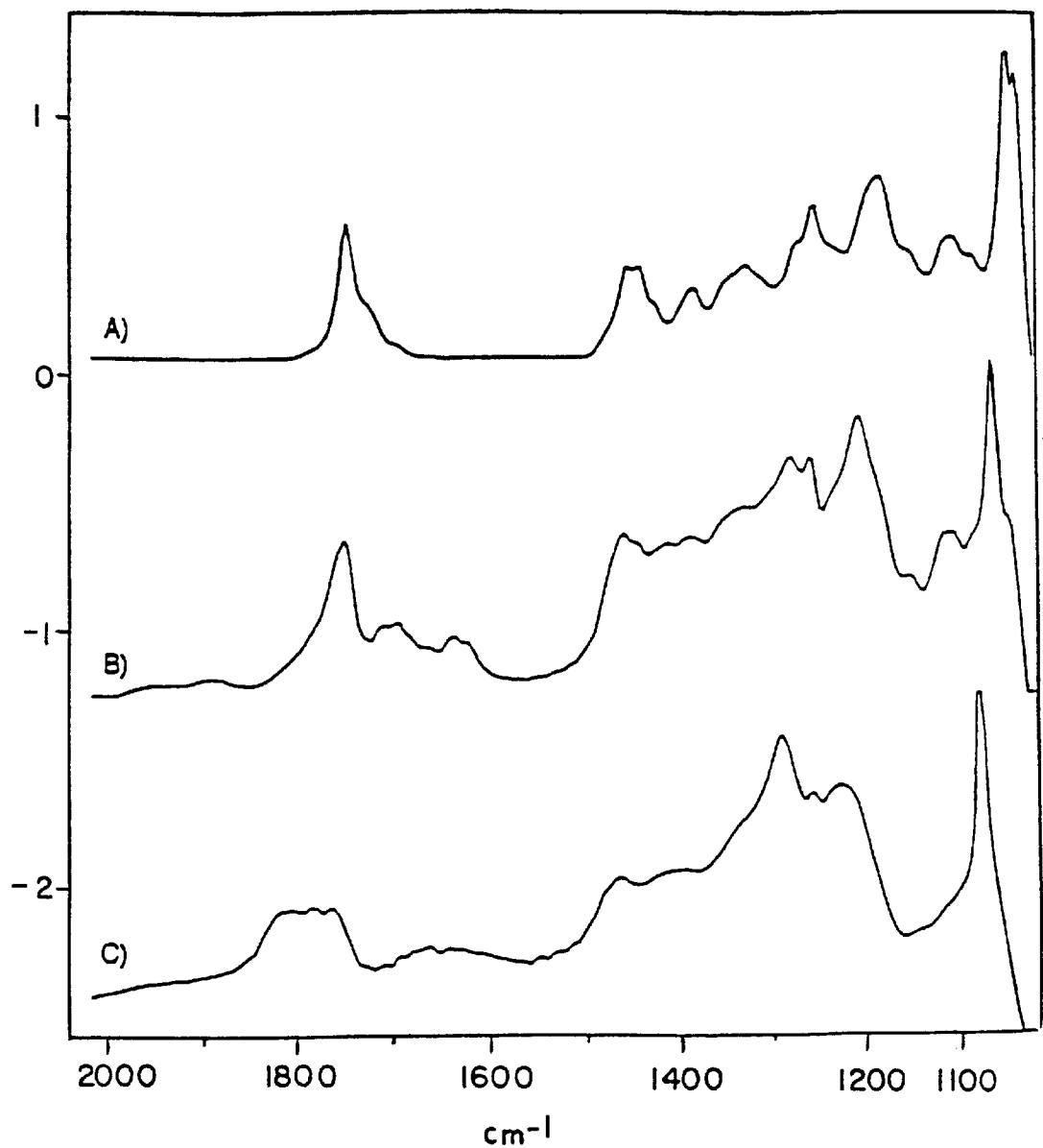
FIG. 13 shows the RAIR spectra of the prepolymer (a) and formulation No. 13 upon heating at 50° C. (b) and 100° C.
Figure 14:
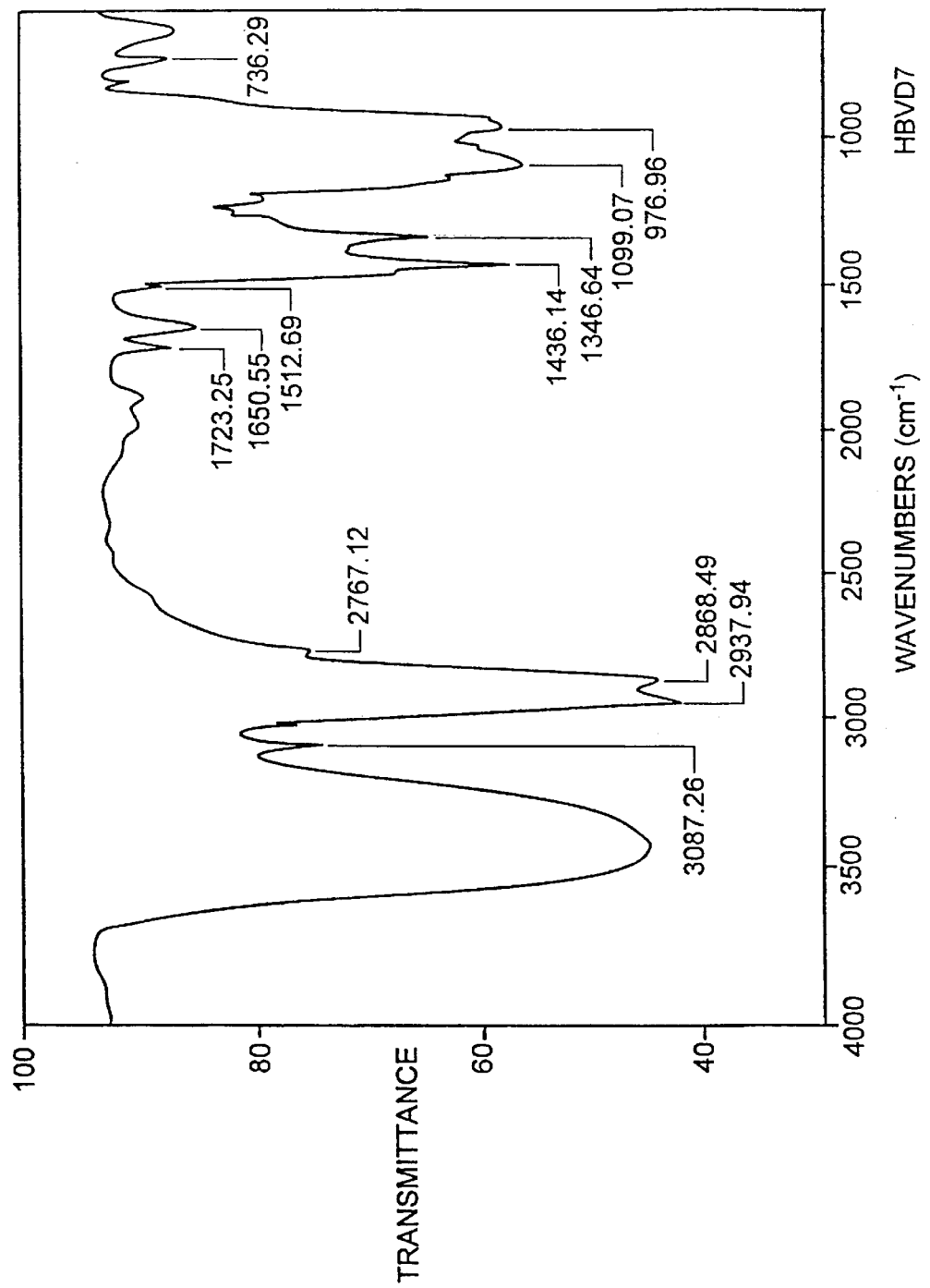
FIG. 14 shows the IR spectra of 2-vinyl-4-hydroxybutyl-1,3-dioxolane.
Figure 15:
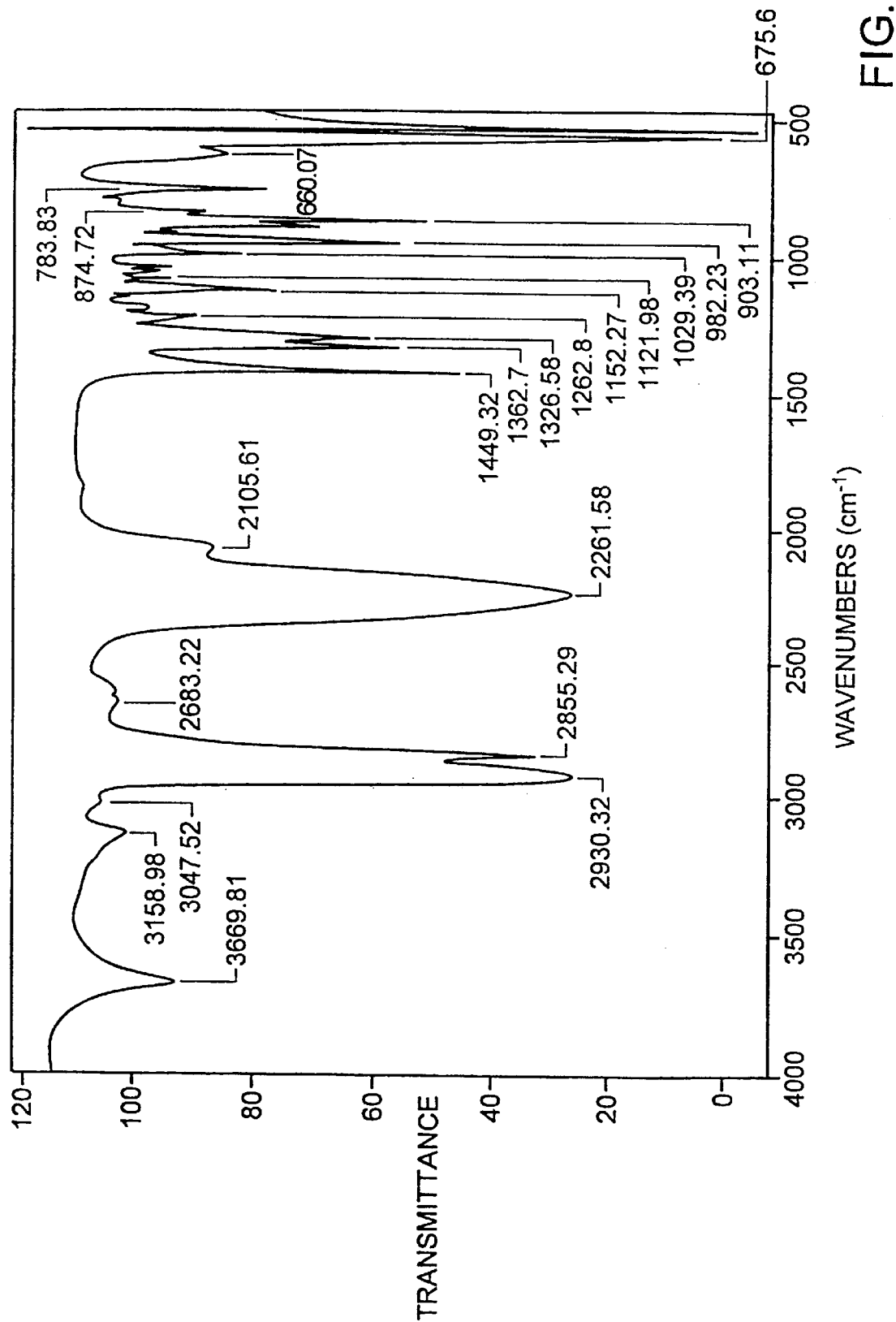
FIG. 15 shows the IR spectra of the bis(4-isocyanatocyclohexyl)methane DESMODUR W.
Figure 16:
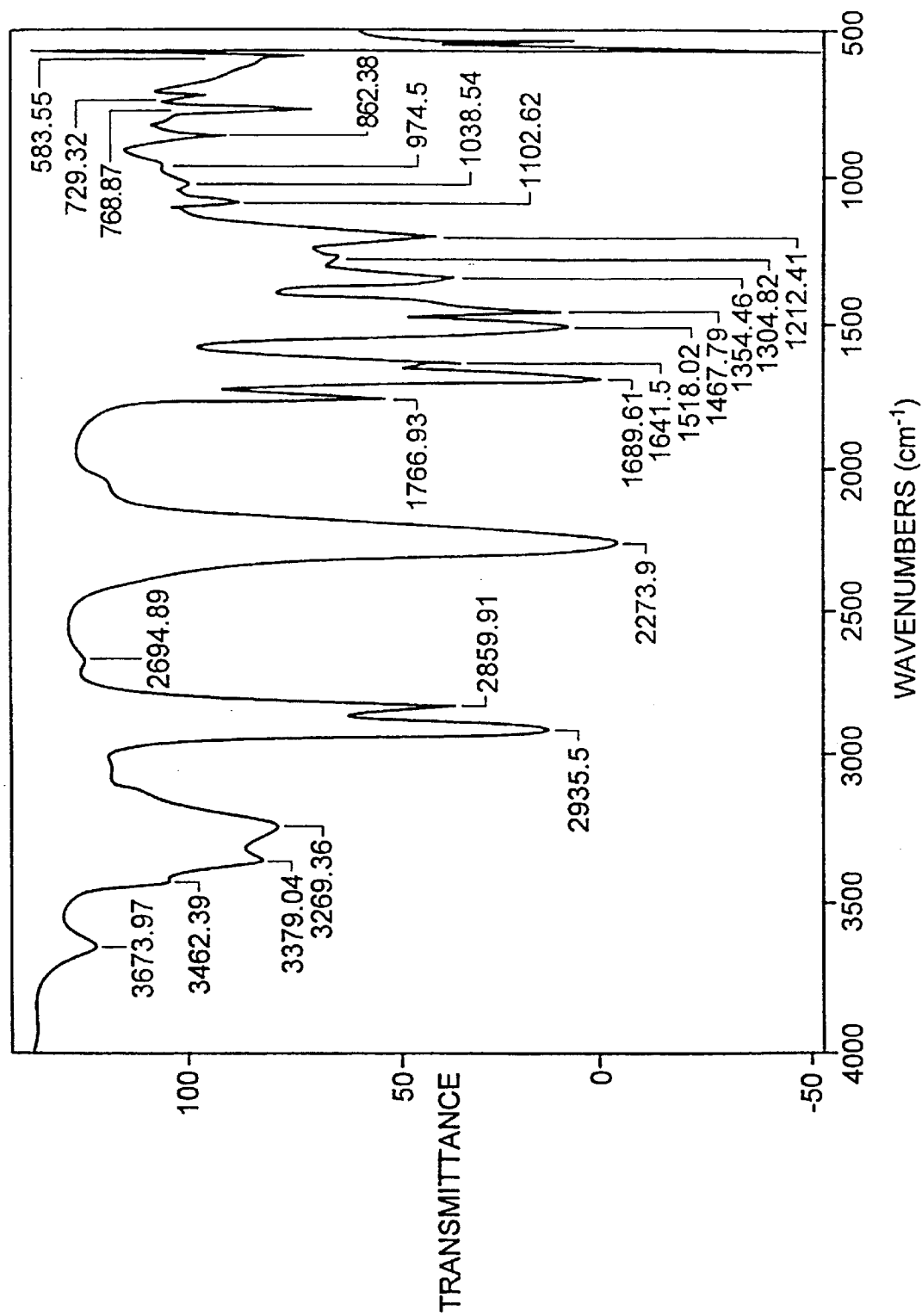
FIG. 16 shows the IR spectra of the 1,6-hexamethylene diisocyanate based polyisocyanate DESMODUR N100.
Figure 17:
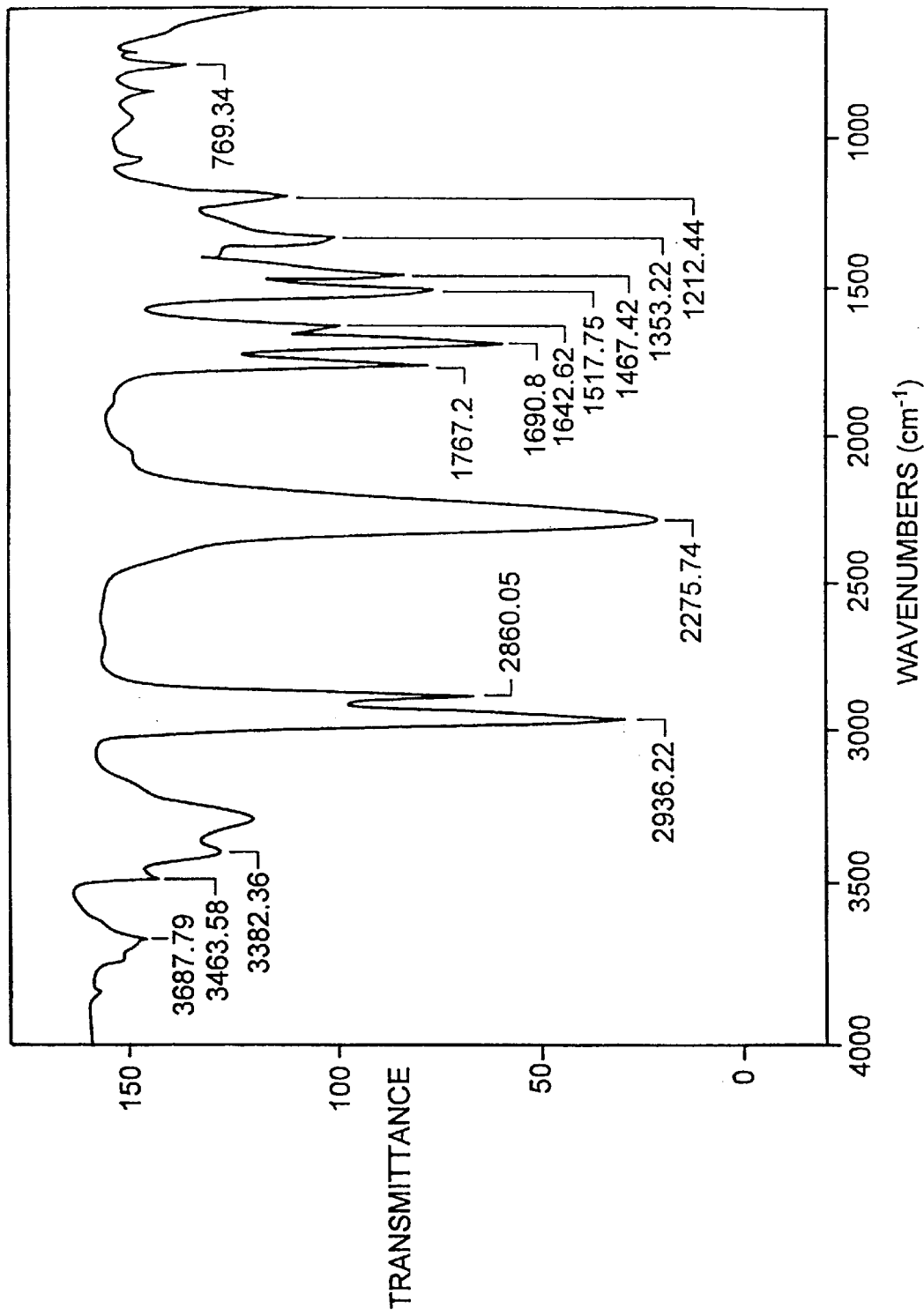
FIG. 17 shows the IR spectra of the 1,6-hexamethylene diisocyanate based polyisocyanate DESMODUR N3200.
Figure 18:
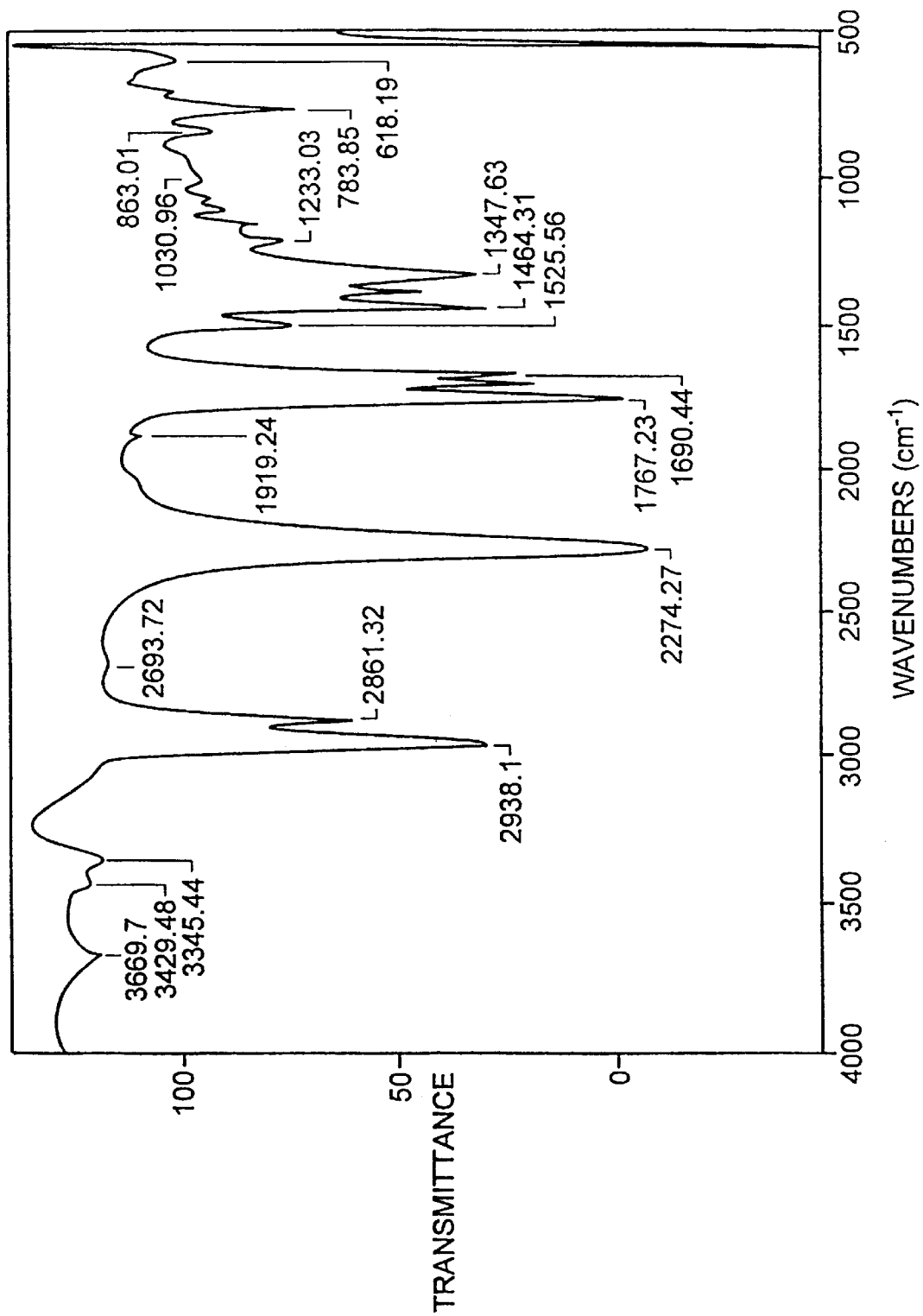
FIG. 18 shows the IR spectra of the 1,6-hexamethylene diisocyanate based polyisocyanate DESMODUR N3400.
Figure 19A:
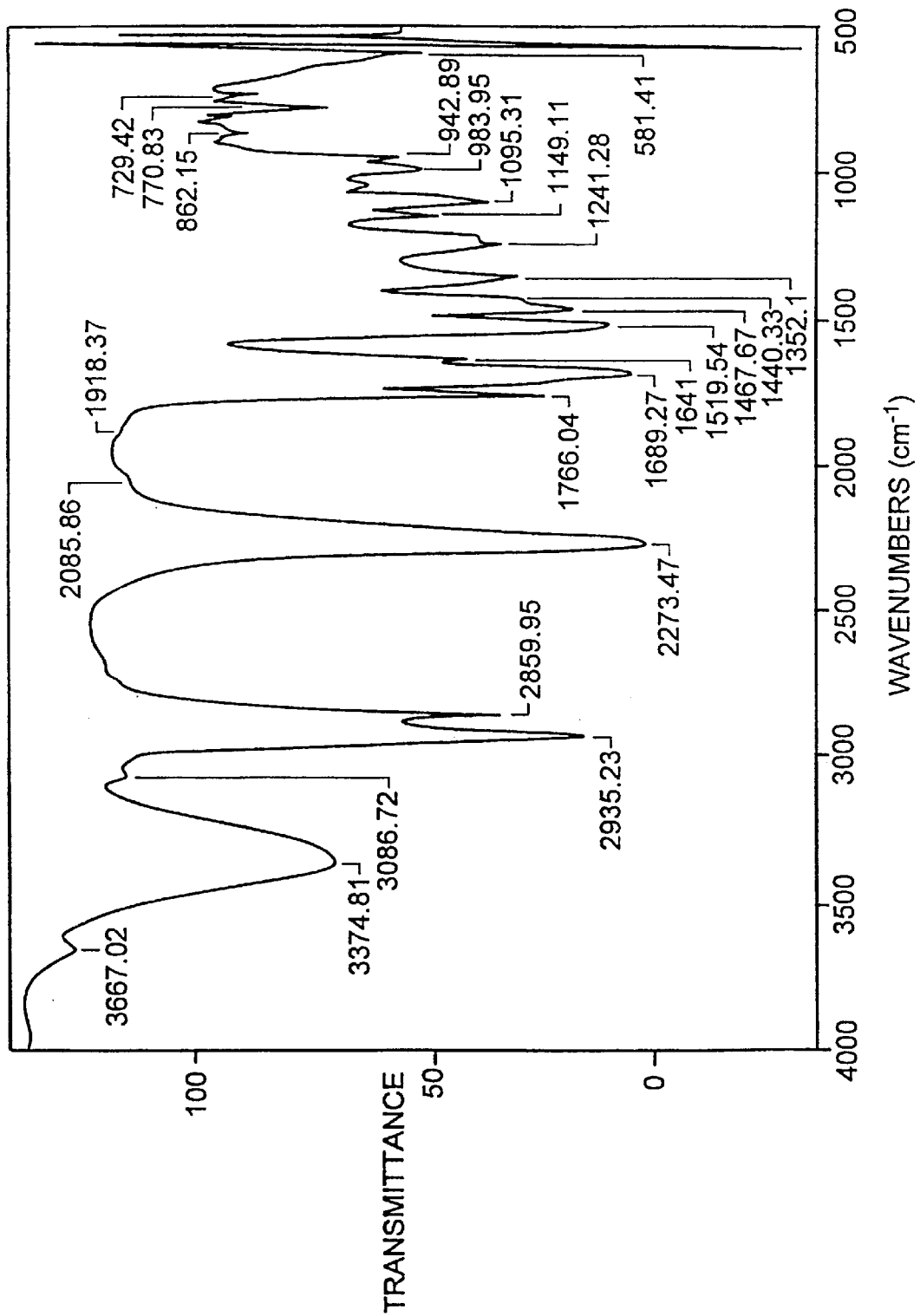
FIG. 19 shows the IR spectra of a reaction mixture for preparing a vinyl dioxolane end-capped polyurethane oligomers for use in the present invention, the mixture comprising 2-vinyl-4-hydroxymethyl-1,3-dioxolane and DESMODUR N3200 in the presence of 0.1% DABCO catalyst at 70° C. (a) At start of experiment, (b) After 2.75 hours.
Figure 19B:
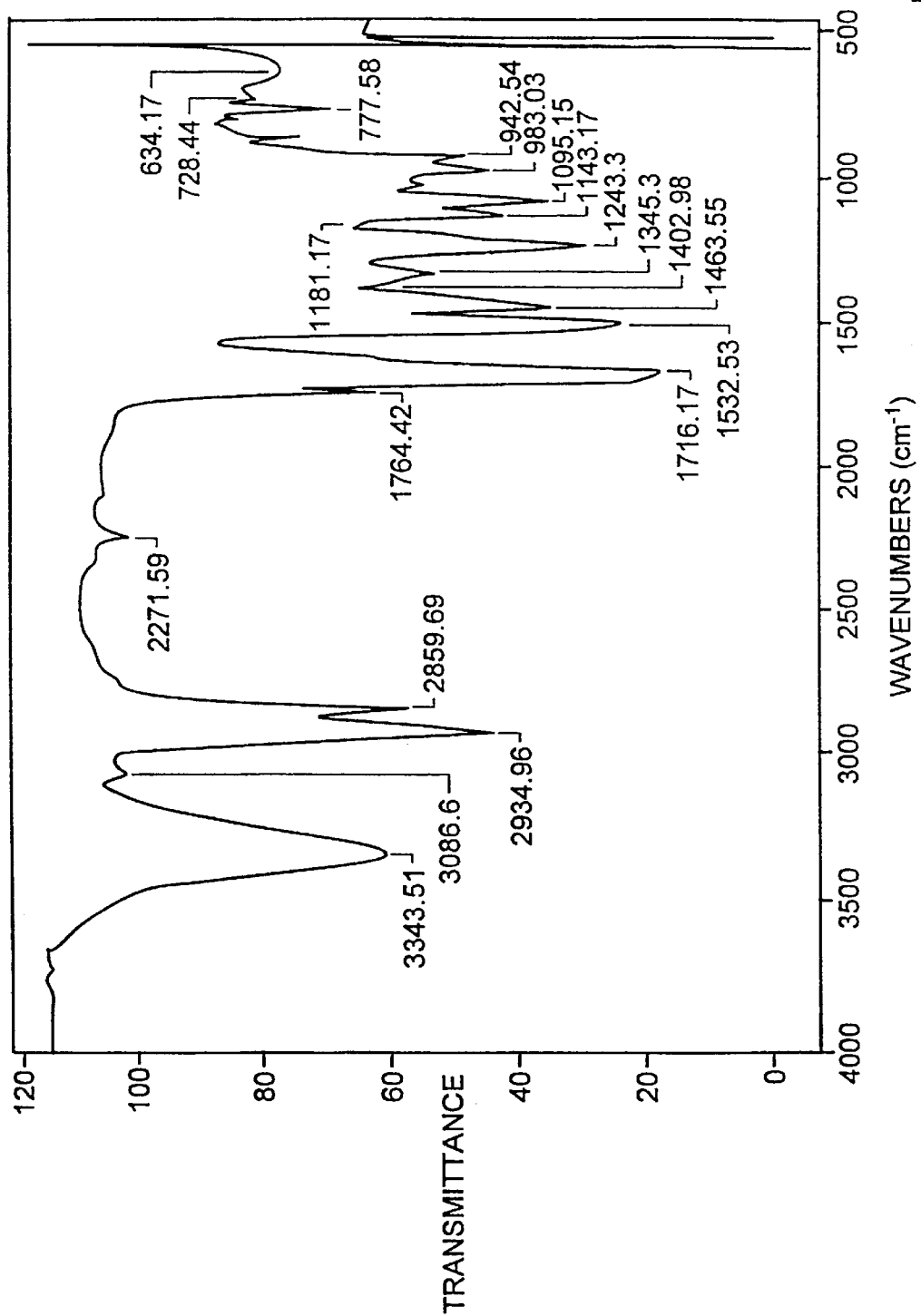
Figure 20A:
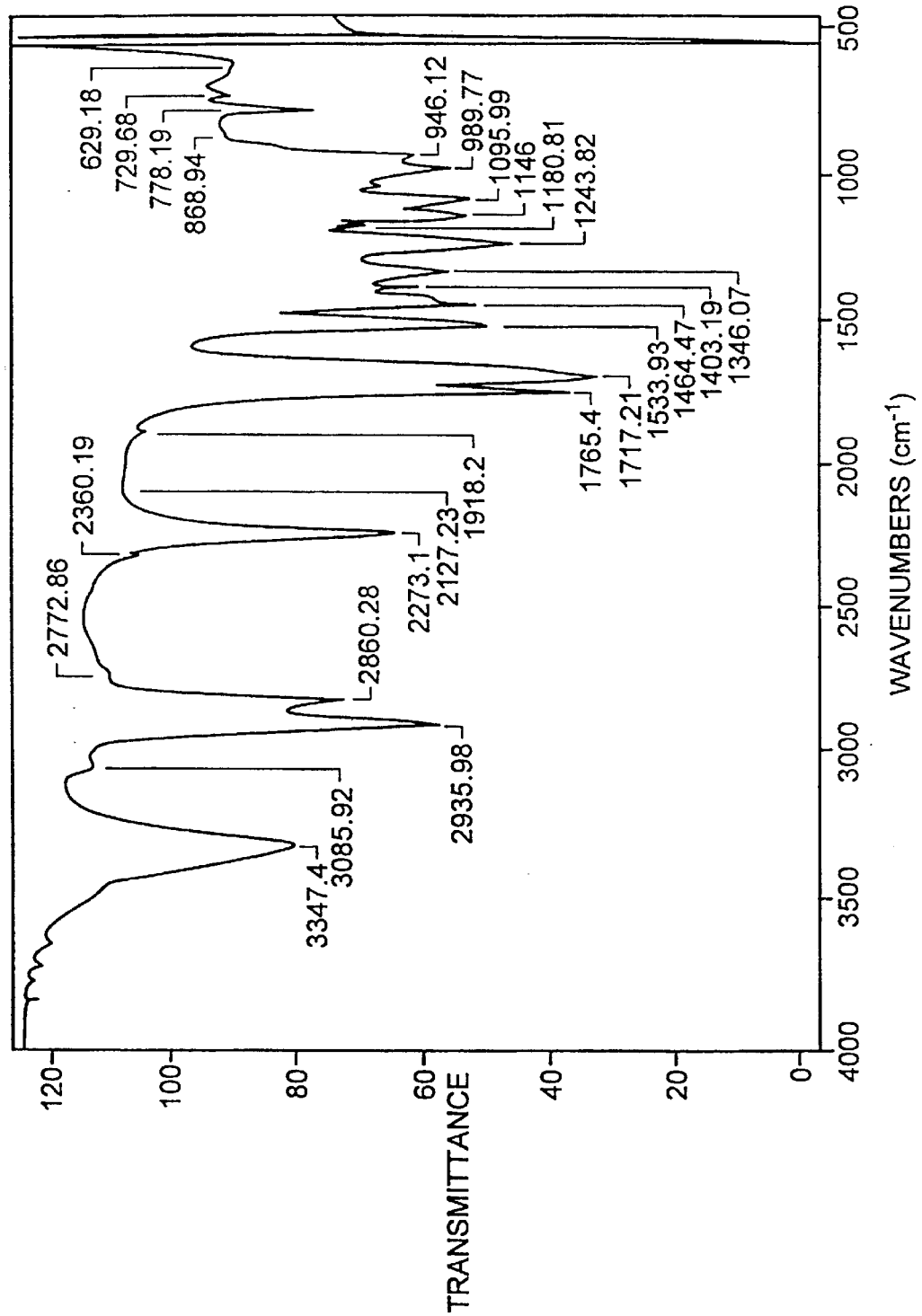
FIG. 20 shows the IR spectra of a reaction mixture for preparing a vinyl dioxolane end-capped polyurethane oligomers for use in the present invention, the mixture comprising 2-vinyl-4-hydroxymethyl- 1,3-dioxolane and DESMODUR N3400 in the presence of 0.1% DABCO catalyst at 70° C. (a) At start of experiment, (b) After 5.5 hours.
Figure 20B:
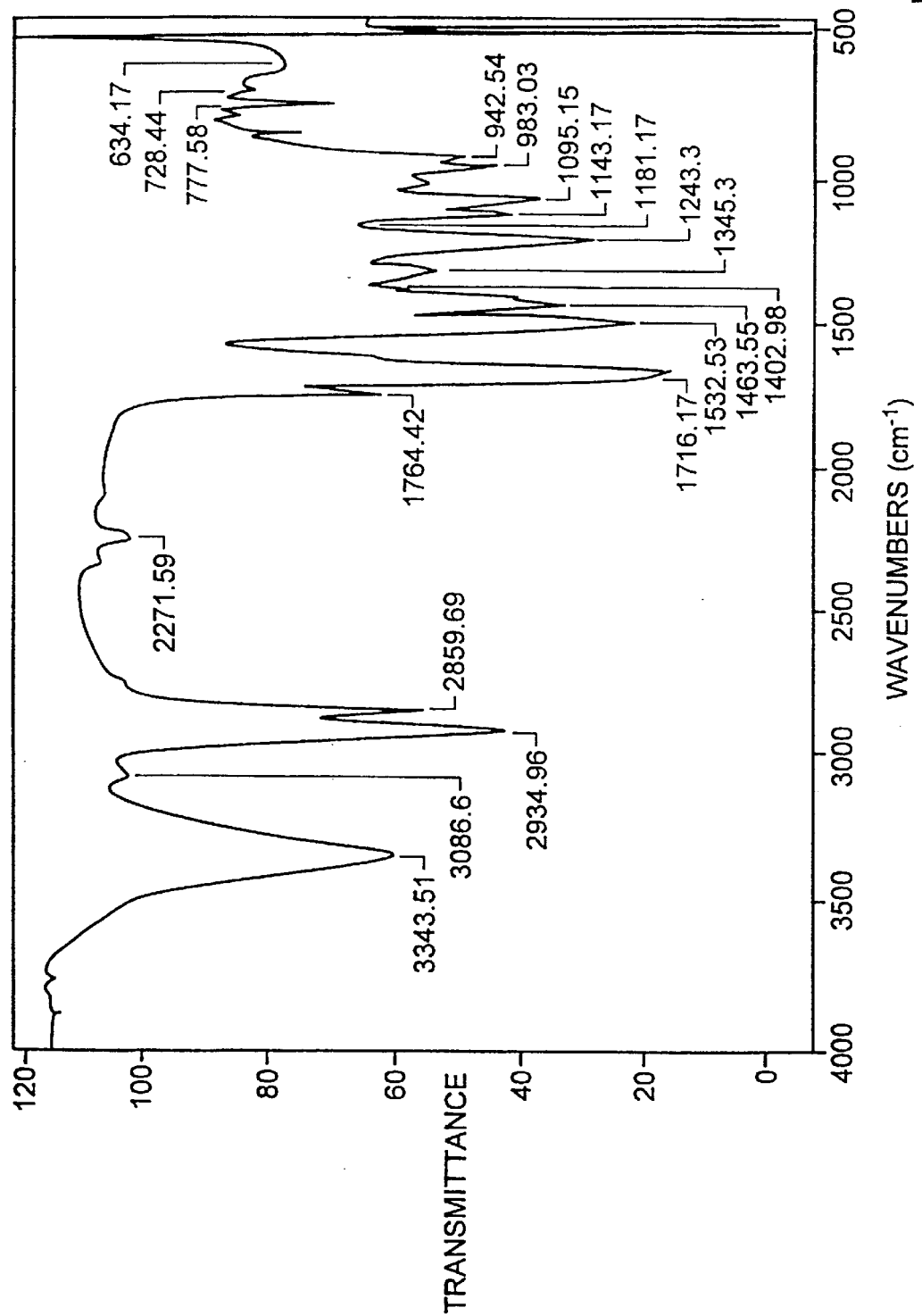
Figure 21A:
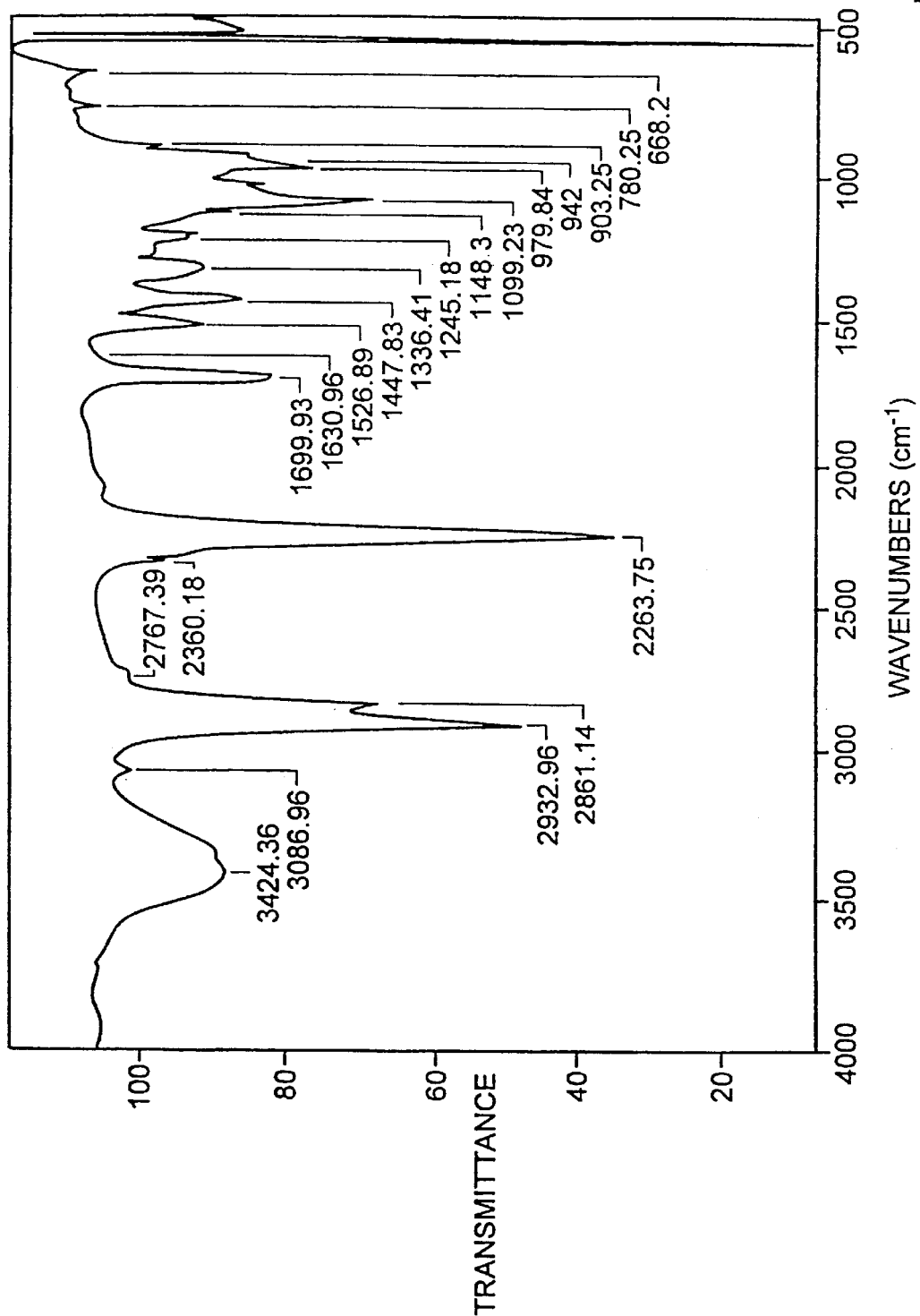
FIG. 21 shows the IR spectra of a reaction mixture for preparing a vinyl dioxolane end-capped polyurethane oligomers for use in the present invention, the mixture comprising 2-vinyl-4-hydroxybutyl-1,3-dioxolane and DESMODUR W in the presence of 0.1% DABCO catalyst at 80° C. (a) At start of experiment, (b) After 8.75 hours.
Figure 2I:
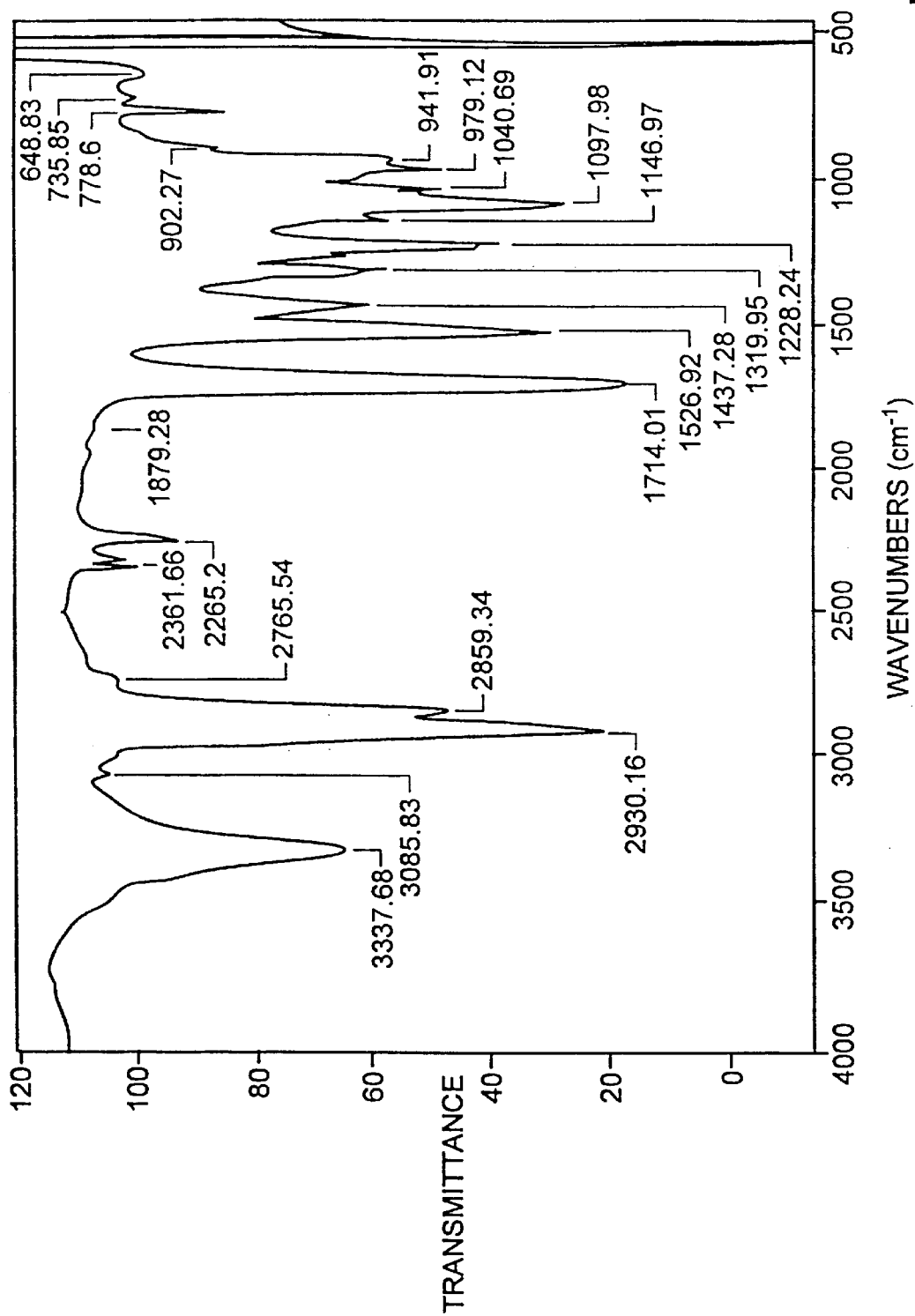
Figure 22A:
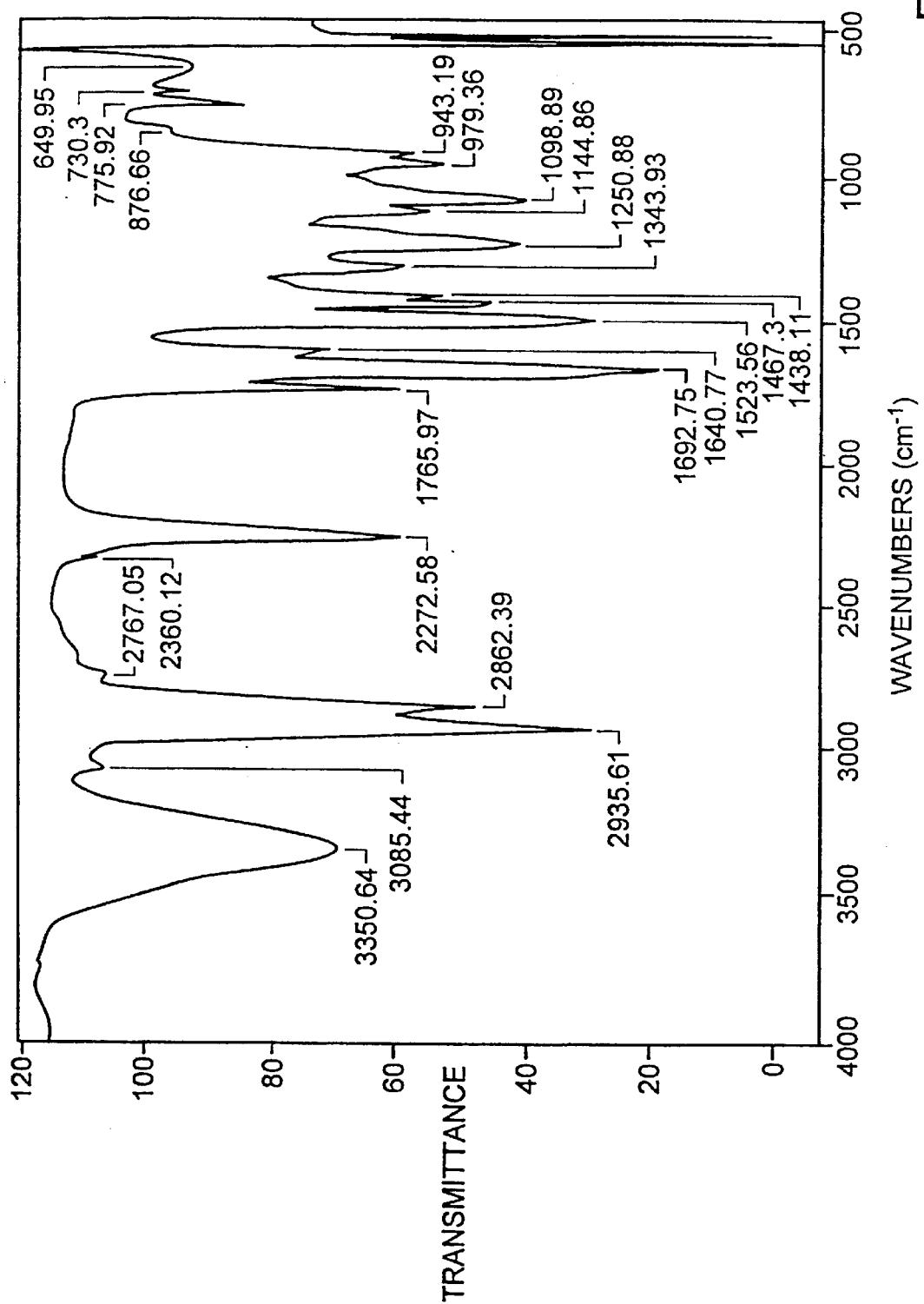
FIG. 22 shows the IR spectra of a reaction mixture for preparing a vinyl dioxolane end-capped polyurethane oligomers for use in the present invention, the mixture comprising 2-vinyl-4-hydroxybutyl-1,3-dioxolane and DESMODUR N3200 in the presence of 0.1% DABCO catalyst at 80° C. (a) At start of experiment, (b) After 3.5 hours.
Figure 22B:
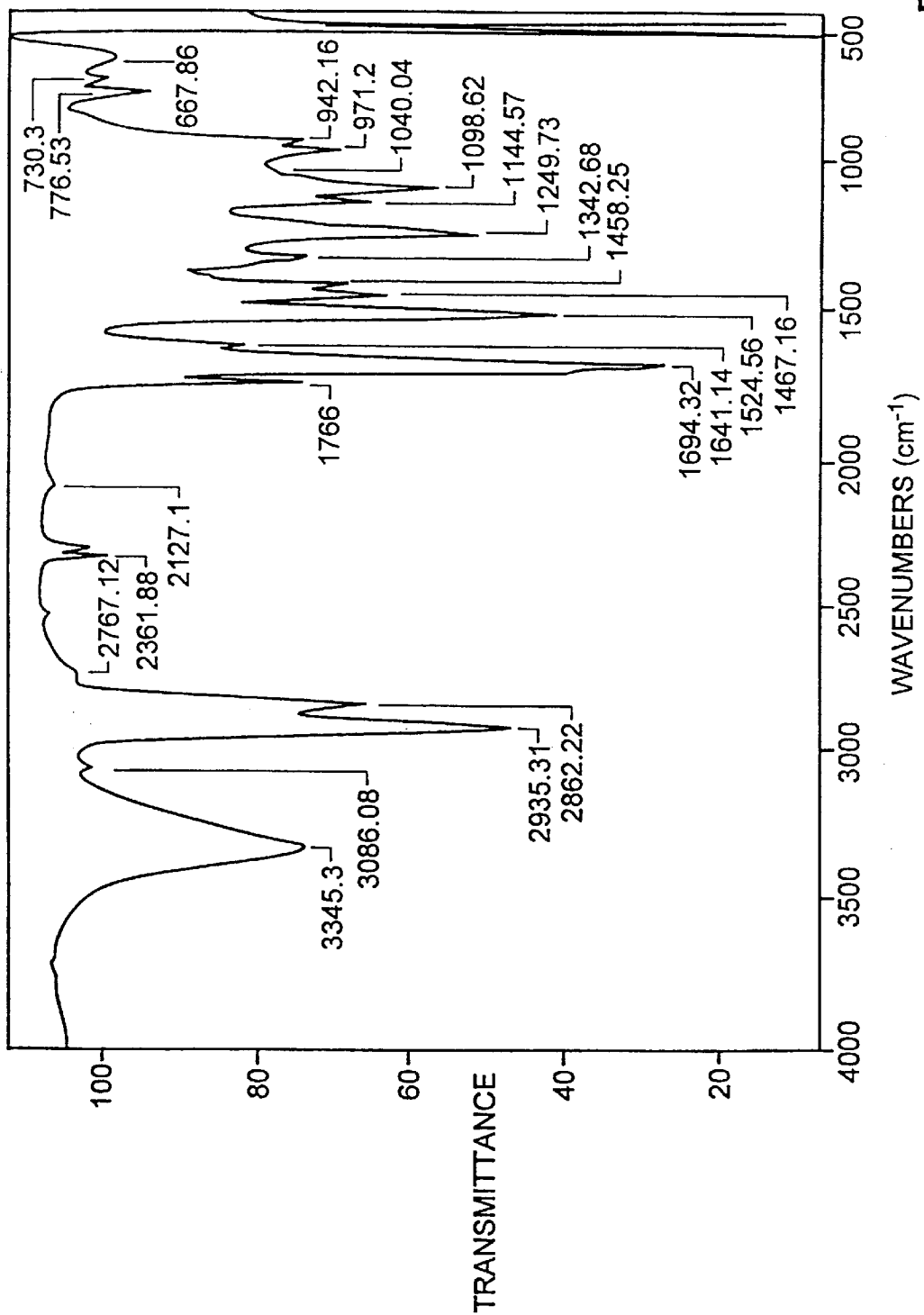
Figure 23A:
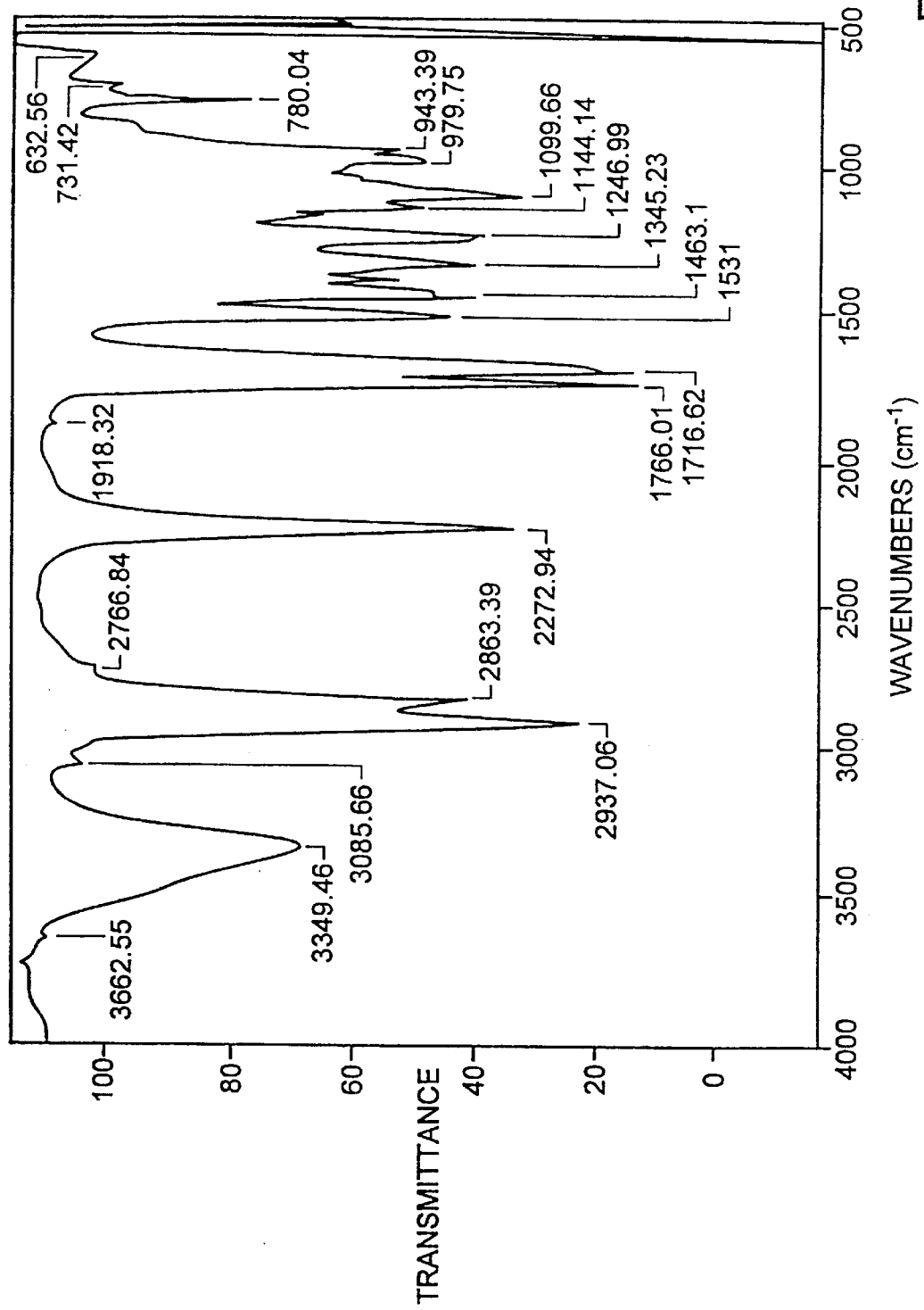
FIG. 23 shows the IR spectra of a reaction mixture for preparing a vinyl dioxolane end-capped polyurethane oligomer for use in the present invention, the mixture comprising 2-vinyl-4-hydroxybutyl-1,3-dioxolane with DESMODUR N3400 in the presence of 0.1% DABCO catalyst at 80° C. (a) At start of experiment, (b) After 3.75 hours.
Figure 23B:
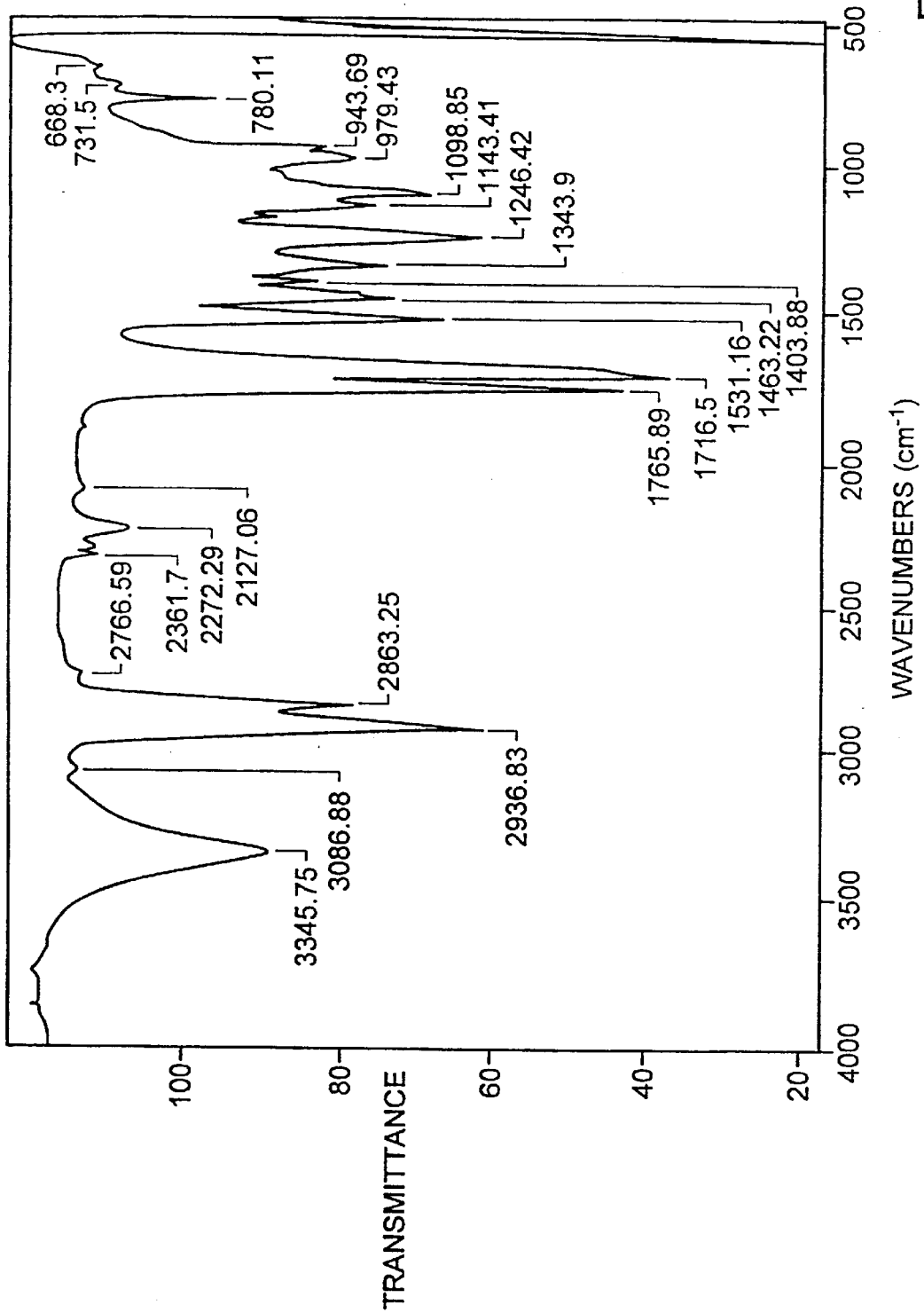
Figure 24A:
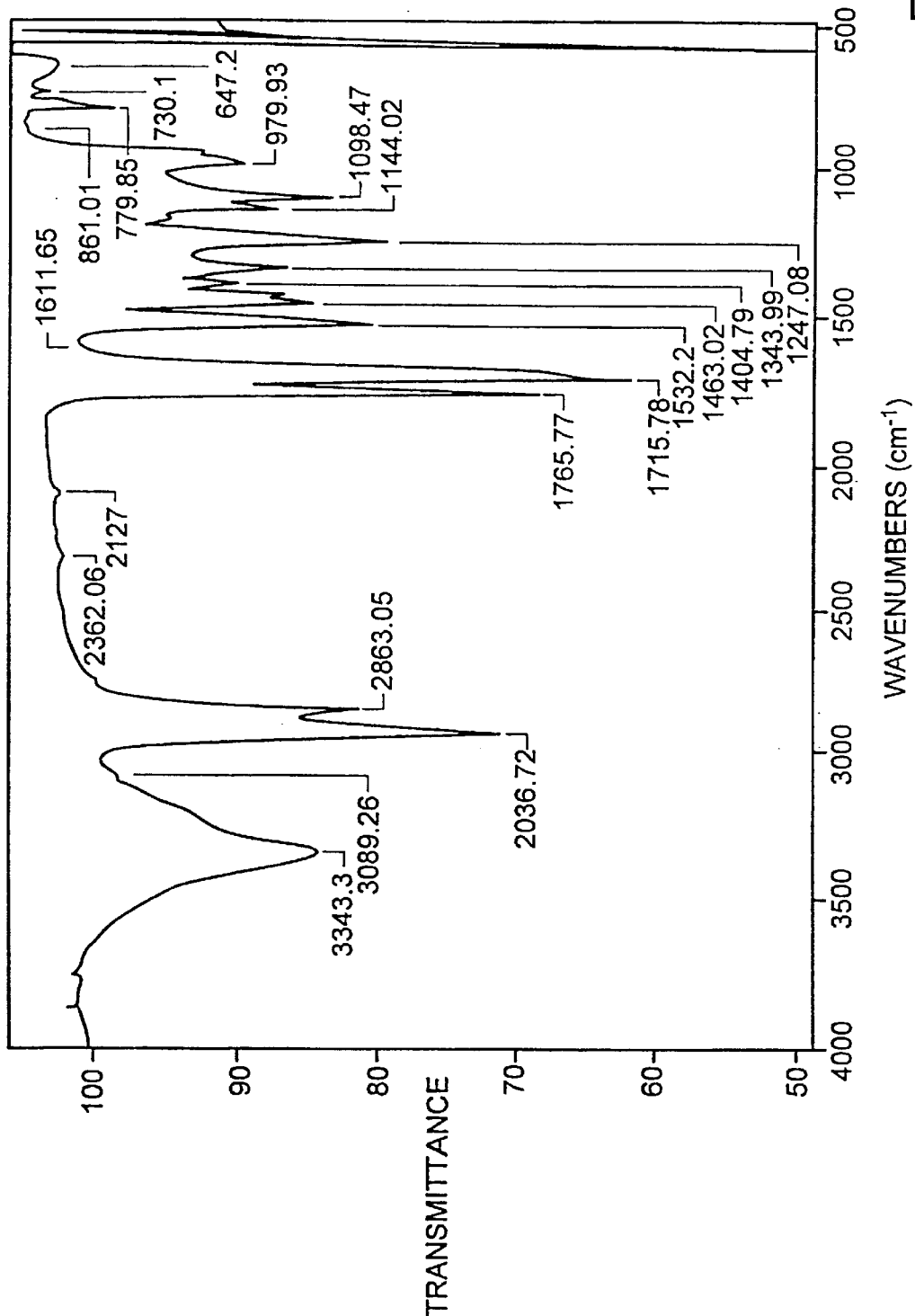
FIG. 24 shows the IR of a coating composition of the present invention comprising the HBVD/DESMODUR N3400 oligomer of FIG. 11 with 0.5% Cobalt Octoate added (a) Taken immediately after mixing, (b) Taken after 12 hours at 50° C.
Figure 24B:
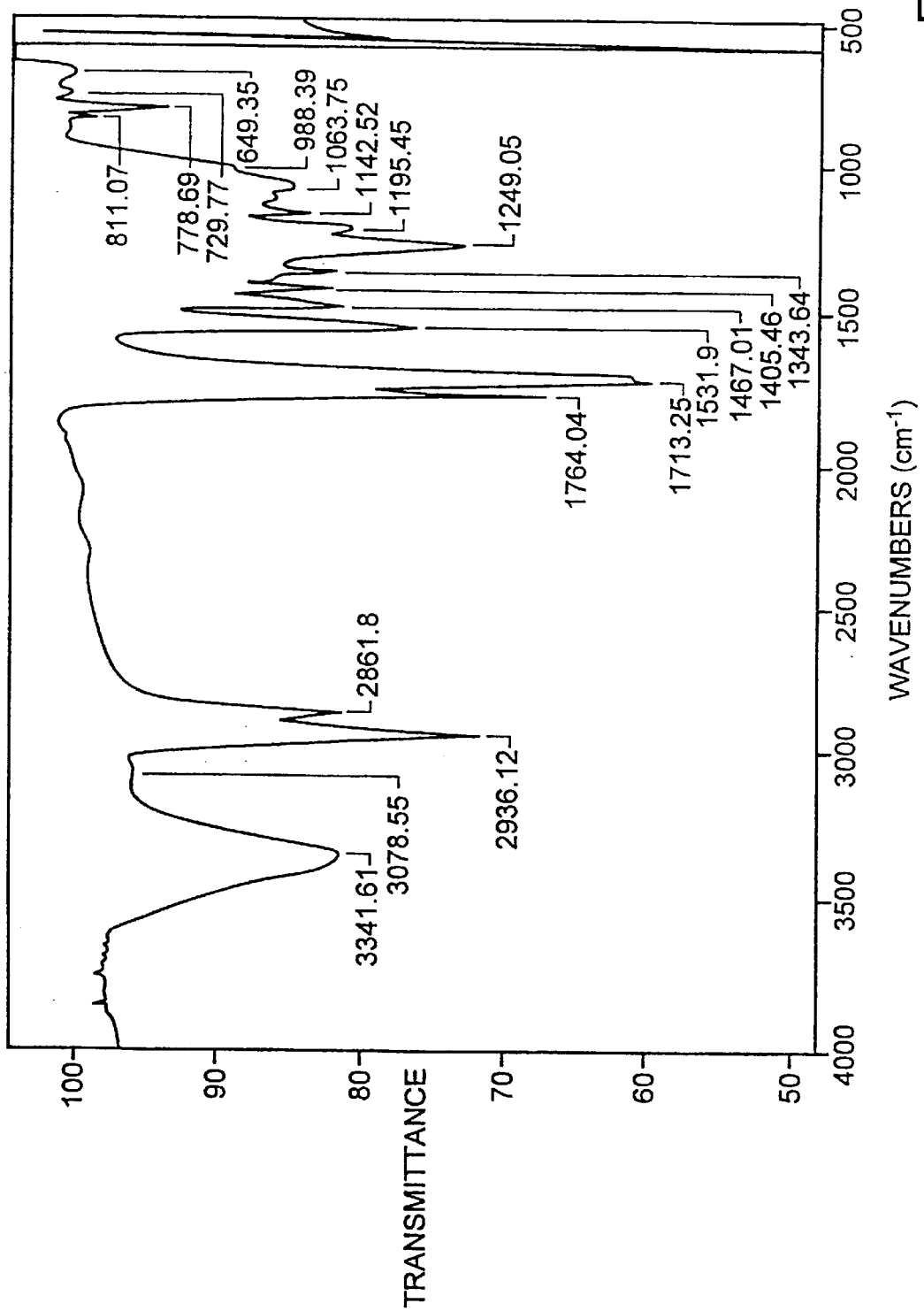

Additional changes were observed upon heating these coatings to 100° C. for 24 hours (Table 10, FIG. 12, Spectrum C and 13, Spectrum C). Coating No. 13 had now cured to a hard surface; with its IR spectrum exhibiting significant changes at 1830, 1750, 1660, 1289, 1226, and 1110 cm$^{-1}$. Absorptions disappeared at 1110 cm$^{-1}$, became significantly less intense at 1750 and 1226 cm$^{-1}$, and appeared at 1830 and 1289 cm$^{-1}$. The spectrum of coating No. 3 was very similar to its previous 50° C. cured one, except for the large decrease in intensity for the absorption at 1063 cm$^{-1}$, located in the spectral region normally associated with the —C—O stretch of esters (1330 to 1050 cm$^{-1}$). The similarity of spectrum C except for the one change suggests one type of curing process may be operating at 50° C. and another becomes active at higher temperatures for the cobalt/PEVD system. Also, the 50° C. curing process may not be cobalt dependent due to similarity in spectral changes upon comparing spectra in FIG. 12 (Spectra B) with FIG. 13 (Spectra B and Spectra C). The cure mechanism(s) operating at various temperatures with different catalyst systems is not fully understood.

In conclusion, PEVD curing can be monitored using RAIR spectroscopy by monitoring changes in absorption intensity at 1830 (increase), 1760 (decrease) 1230 (decrease), 1110 (decrease), and 1060 (decrease) cm$^{-1}$. Assignment of chemical changes in PEVD to these absorptions was not necessary.

TABLE 11

RAIR spectra changes upon coating curing at 100° C.

| Unheated | Formulations | | | |
|---|---|---|---|---|
| Resin with No Catalyst (cm$^{-1}$) | No. 3 (cm$^{-1}$) | Spectral Observations (Changes Upon Comparing B to A) | No. 13 (cm$^{-1}$) | Spectral Observations (Changes Upon Comparing B to A) |
| | 1830 | Similar | 1830 | Appeared |
| 1743 | 1760 | Similar | 1750 | Significantly less intense |
| | | | 1660 | Less intense |
| | 1640 | Similar | 1635 | Appeared |
| 1440 | 1464 | Similar | 1463 | Similar |
| 1381 | 1407 | Similar | 1400 | Similar |
| 1325 | 1330 | Similar | 1330 | Similar |
| 1252 | 1290 | Similar | 1289 | Significantly more intense |
| | | | 1257 | Similar |
| 1183 | 1212 | Slightly less intense | 1226 | Significantly less intense |
| 1106 | 1098 | Similar | 1110 | Absent |
| 1047 and 1040 | 1063 | Significantly less intense | 1081 | Similar |
| | 1027 | Appeared | | |

A free-radical source (methyl ethyl ketone peroxide, No.7), accelerator (dimethylaniline, No. 8 and No.9) or chelating agent/accelerator (2,2'-bipyridine, No. 10 were added to PEVD) prepolymer containing cobalt octoate to improve coating curing at near ambient temperatures (Table 5). However, addition of the peroxide or dimethylaniline resulted in extensive particle formation in the resin. 2,2'-bipyridyl addition (OMG's DRi-Rx™) yielded a dark tan colored solution containing a small amount of precipitate which produced coatings exhibiting a viscosity increase and good appearance after 24 hours at ambient temperatures (Table 6), a hard surface after 24 hours at 50° C. (Table 7), but a yellowish and wrinkled surface after 24 hours at 100° C. (Table 8). It is reported (OMG) to form chelated complexes with transition metals such as cobalt, many of which are highly colored. Since 2,2'-bipyridine produced a color it will not be used in the coatings of the present invention which are to be used in topcoat (clear coat in particular) applications requiring smooth and essentially colorless coatings.

Coating formulations (No. 15 through No. 18, Tables 6 to 8, above) containing cobalt and aluminum yielded solutions exhibiting no or minimal particle formation with cobalt concentrations of 0.05 to 0.25 weight %, but substantial particles formed with a cobalt concentration of 0.5. Formulations No. 15 and No. 16, Tables 6 to 8 above, yielded smooth and shiny coatings that were tacky to the touch after 24 hours at ambient temperatures. However, similar coatings containing only cobalt were fluid in appearance (No. 2, Tables 6 to 8 above), indicating aluminum has a pronounced effect of coating cure. Coatings from No. 17, Tables 6 to 8 above, under the same conditions were smooth and shiny in addition to being tack-free, suggesting additional curing had occurred. Too rapid a surface curing occurred at ambient temperatures with coating No. 18, Tables 6 to 8 above, as evidenced by the formation of a wrinkled thick skin over a gelatinous inner layer. Additional heating of all these coatings at elevated temperatures resulting in addition curing of the coatings to hard surfaces. Thus, the addition of a through drier, particularly an aluminum-based through drier, to the PEVD coating compositions of the present invention is beneficial due to the increased extent of coating cure at near ambient temperatures.

Cobalt induced particle formation and coating skinning was reduced in the coating compositions of the present invention by the use of a cobalt activity mediators.

Particle formation occurred in resins containing cobalt at a weight % concentration of 1.0, but the resulting coatings exhibited substantial cure at ambient temperatures, forming a thick skin over a liquid resin layer (formulation No. 4, Tables 6 to 8 above). These coatings were almost fully cured after heating at 50° C. for 24 hours and were totally cured after 24 hours at 100° C.

Various combinations of zinc-based cobalt activity mediators with cobalt and an aluminum-based through drier were investigated for their combined effect on particle formation and near ambient temperature coating cure (formulations No. 19 through No. 22, Tables 6 to 8 above). The zinc-based cobalt activity mediator was used at weight % concentrations of 0.1 to 0.3. Substantially higher zinc concentrations were not tested due to the possibility of reducing cobalt activity to the point of preventing coating cure.

Zinc addition reduced the extent of particle formation in the resin. This was seen by comparing formulations No. 18 with No. 22 and No. 17 with No. 20 and No. 21 of Table 5. Coatings No. 21 and No. 22 had a satin finish, were tacky to the touch and opaque as well as discolored after curing at ambient temperatures for 24 hr; indicating zinc at a concentration of 0.3 weight % resulted in deterioration of coating appearance. Both coatings No. 19 and No. 20 were smooth, shiny and tacky to the touch under similar conditions, with coating No. 20 exhibiting slightly harder properties. All of these coatings underwent additional curing at elevated temperatures to a hard surface. MEK wipe and pencil hardness tests indicated coating No. 20 was the most fully cured of the coatings examined. Based on these results and those of Tables 5 through 8, coating formulation No. 20 was evaluated to produce the best quality coatings at ambient or elevated temperatures and was selected for large scale test evaluations.

TABLE 12

Coating composition of formulation No. 20

| Coating Formulation No. 20 | Weight % Concentration |
|---|---|
| Cobal Metal | 0.25 |
| Aluminum Metal | 0.50 |
| Zinc Metal | 0.10 |
| Combined Catalyst Organic Components | 8.51 |
| PEVD Prepolymer | 90.64 |

TABLE 13

Calculated versus actual catalyst concentration in coatings produced from formulation No. 20

| Catalysts in Coating Formulation No. 20 | Calculated Weight % Concentration in Formulation | Actual Weight % Concentration in Coating |
|---|---|---|
| Cobalt metal | 0.25 | 0.26 |
| Aluminum metal | 0.50 | 0.46 |
| Zinc metal | 0.10 | 0.12 |

Analysis for cobalt/aluminum/zinc in a filtered sample of coating formulation No. 20 was performed to confirm catalyst concentrations in the coating actually applied to the substrate (Table 12). This sample had undergone curing for 24 hours each at ambient temperatures, 50 and 100° C. Results indicate the concentration of metals in the coating formulation is the same as that of the coating thus no metals were removed by the filtration process.

Example 4

PEVD Hand-Coating Experiments

HMVD/cyclohexanedicarboxylate PEVD prepolymer (800 g) was synthesized and purified according to procedures discussed above and in Examples 1 and 2 below and used in coating formulation 20 was formed as follows. The appropriate amount of aluminum (AOC 1020X) was added to the purified PEVD prepolymer under an inert atmosphere such that a concentration of 0.50 weight % aluminum metal was obtained and the mixture stirred until a solution resulted. Zinc (Zinc Hex-Chem, OMG) was then added in similar manner at a concentration of 0.10 weight % zinc metal, followed by Catalyst 510 at 0.25 weight % cobalt metal. The resulting purple colored solution was static degassed (bubbles allowed to rise to the surface and break) and filtered through a 5 µm A/E glass fiber mat to remove a small amount of precipitate just prior to coating application.

Two separate coating experiments were carried out using coating formulation No. 20 applied to steel panels and steel panels which had undergone zinc phosphate, electrocoat (BSASF Electrocoat ED214), and priming (red primer, U28 series) processes at an automotive manufacturing facility.

Coating formulations were applied to either "yellow chromated" 2024-T3 aluminum alloy or SAE 1010 steel panels, with the majority of the coatings being evaluated on steel panels. The panel surface to be coated was cleaned and dried prior to coating application as listed in Table 13.

Kapton tape (2 to 3 mils thick) was adhered to the clean/dried panel surface so as to create a rectangular container into which the coating formulation was poured. A Teflon coated doctor blade was then moved over the resin filled container to remove any excess coating solution and the coated panel was placed on a leveled surface inside a low humidity chamber, with relative humidities generally ≦15 percent, located in a clean room for 24 hours before post-curing at elevated temperatures.

TABLE 14

Substrate cleaning procedures prior to coating application

| Substrate Type | Cleaning Procedure |
|---|---|
| "Yellow Chromated" 2024-T3 Aluminum Alloy | 1. Acetone wiped and dried for an hour at 100° C. |
| Low Carbon, Cold-Rolled SAE 1010 Steel | 1. Acetone wiped and dried for an hour at 80° to 100° C.<br>2. Acetone wiped, degreased using Oakite Low Heat Cleaner 3 at 80° C. for 10 min, rinsed with water, and either dried for an hour at 100° C. or deoxidized using Oakite 31 at ambient temperatures for 5 min followed by rinsing and drying. |

Use of the low humidity chamber allowed the very small amount of residual solvents from the catalyst solutions to slowly evaporate and the coatings partially cure to a firm but slightly tacky surface without absorption of moisture from the surrounding air. Moisture absorption by the coating prior to curing is believed to be fairly low due to the nature of the HMVD/cyclohexanedicarboxylate PEVD and thus not present any problems to coating curing, but steps were taken to minimize moisture exposure. Allowing any residual solvent to evaporate and the coatings to partially cure before exposure to elevated temperatures should assure consolidation of the coating solution into a good quality coating.

Coated panels were further cured on leveled shelves in a forced-air oven, with panels removed from the elevated temperature curing schedule as specified in Table 15 below. A total of 75 coated steel panels and 24 coated steel/zinc phosphated/electrocoated/primed panels were produced during the Phase I 20 program and the coatings evaluated according to methods listed in Table 14.

TABLE 15

Coating evaluation tests

| Test Method | Description of Test | Test Location |
|---|---|---|
| Extent of coating cure by IR and RAIR spectroscopy | Monitor changes in IR spectrum with time at temperature | Foster-Miller |
| Pencil hardness | ASTM D3363: resistance of coating to penetration by pencil points of varying hardness | Foster-Miller<br>NAWC<br>Deft, Inc. |
| Coating smoothness and uniformity | Appearance of coating surface, uniformity of coverage and evidence of particle formation | Foster-Miller |
| Color | Appearance of color in the coating or changes in color upon exposure to elevated temperatures | Foster-Miller<br>Deft, Inc. |
| Gloss | Type of coating finish: glossy, dull or matted | Foster-Miller<br>Deft, Inc. |
| Dry tape cross-hatch adhesion | ASTM D3359: resistance of coating to delamination | Foster-Miller<br>NAWC<br>Deft, Inc. |
| Wet tape cross-hatch adhesion | Resistance of coating to delamination after exposure to water at ambient temperatures for 24 hr | NAWC<br>Deft, Inc. |

TABLE 15-continued

Coating evaluation tests

| Test Method | Description of Test | Test Location |
|---|---|---|
| Scrape adhesion | ASTM D2197: resistance of coating to penetration by a probe with a fixed applied force | NAWC Deft, Inc. |
| MEK wipe resistance | ASTM D5402: resistance of coating to 25 "double rubs" of a cloth saturated with MEK | Foster-Miller NAWC Deft, Inc. |
| Water resistance | ASTM D870: resistance of a coating to softening, blistering or other upon immersion in water at ambient temperatures for 24 hr | Foster-Miller NAWC Deft, Inc. |

Example 5

PEVD Coating Evaluation

HMVD/cyclohexanedicarboxylate PEVD coatings prepared in Example 6 and cured under the various conditions listed in Table 15 were evaluated for MEK resistance, pencil hardness, cross-hatch dry tape adhesion, water resistance, gloss and color at Foster-Miller. Coated steel panels were originally produced for evaluation of coating physical properties such as hardness, gloss, color, etc. and not for adhesion testing. Adhesive properties of the HMVD/cyclohexanedicarboxylate PEVD coating to the substrate was evaluated only using primed panels because this surface will be similar to those encountered in actual use as a topcoat or clearcoat. Both types of coated specimens were also sent to Mr. Dan Bernard of Deft, Inc. and Mr. Anthony Eng of the Naval Air Warfare Center (NAWC) for independent evaluation.

The solvent resistance of coatings No. 20 applied to primed panels were measured upon exposure to methyl ethyl ketone (MEK) as specified in ASTM D5402. Changes in coating appearance and thickness were measured after 25 double rubs (Table 16). Initial PEVD coating thicknesses were measured to be 3 mils using profilometry techniquest and no detectable changes in thickness occurred upon MEK exposure. Coatings cured to 100° C. were not affected at all by MEK and passed the test. The 75° C. cured coatings showed a very slight tendency to be affected and marginally passed the test. However, coatings cured to 50° C. were degraded upon MEK exposure and were deemed to fail the test.

TABLE 16

Curing schedule for coated steel panels

| Panel Type | No of Panels Cured 24 hr at Ambient Temps | No of Panels Cured 24 hr each at Ambient and 50° C. | No of Panels Cured 24 hr each at Ambient, 50 and 75° C. | No of Panels Cured 24 hr each at Ambient, 50, 75 and 100° C. | No of Panels Cured 24 hr each at Ambient, 50 and 100° C. |
|---|---|---|---|---|---|
| Steel | 25 | 25 | — | — | 25 |
| Steel with combined zinc phosphated, electrocoated | — | 8 | 8 | 8 | — |
| and primed surface | | | | | |

TABLE 17

MEK resistance of coatings No. 20 on primed steel panels

Observations after 25 Double Rubs

| | |
|---|---|
| Coatings cured to 50° C. | Coating became very cloudy and degraded slightly. Coating thickness remained constant. |
| Coatings cured to 75° C. | Coating became slightly cloudy in some areas, but did not degrade. Coating thickness remained constant. |
| Coatings cured to 100° C. | Coating had a slight hint of cloudiness in some areas, but there were no signs of degradation. Coating thickness remained constant. |

Both the gouge and scratch hardness of coatings from formulation No. 20 applied to primed panels were measured according to ASTM D3359. Pencils of decreasing hardness were held at a 45 degree angle to the coated panel, were firmly pressed against the coating, and then smoothly moved away from the operator with any coating damage being noted (Table 17). All three coatings exhibited a gouge hardness of 3H. However, differences in coating curing were observed upon comparison of scratch hardness data, with values lying midpoint in this method's hardness scale. Coatings cured to 75° C. resisted scratching better than 100° C. cured coatings, which were more scratch resistant than the 50° C. cured coatings.

The adhesion of coatings from formulation No. 20 to primed surfaces was measured according to ASTM D3359. A square grid was cut through the coatings down to the metal substrate. The grid was cleaned using a soft brush, tape was then applied to the grid center, the tape pressed firmly against the surface with the eraser end of a pencil to ensure good contact, and the tape smoothly removed within 90 sec of application. The grid area was inspected for coating removal and classification of the test results was done as recommended in the ASTM method. Two adhesion tests were performed on each panel with the results listed in Table 18. Both the 75 and 100° C. cured coatings exhibited excellent adhesion to the red primer (U28 series), passing the test. However, the 50° C. cured coating failed the test due to extensive coating removal.

Water immersion testing of coatings applied to primed panels was carried out by immersing the coated panels in stirred deionized water at ambient temperatures for up to seven days (ASTM D 870). Panels were briefly removed from the water each day, examined and the coating appearance graded according to the system used in "Methodology for Evaluating the Total Performance of Coatings and Coating Systems" (Simaskaki, M. and Hegedus, C. R., "A Methodology for Evaluating the Total Performance of Coatings and Coating Systems", *J. Coatings Technology* 1993, 51–58). Test results (Table 19) show all coatings developed in cloudy appearance after 24 hours immersion, with the 50°

C. cured coating surprisingly exhibiting a less pronounced effect. Coatings cured at temperatures ≧75° C. adhered strongly to the substrate while the 50° C. cured coatings could easily be removed from the substrate.

TABLE 18

Pencil hardness of coatings No. 20 on primed steel panels

| Pencil Hardness in Decreasing Order | Coatings Cured to 50° C. | Coatings Cured to 75° C. | Coatings Cured to 100° C. |
|---|---|---|---|
| 6H (hardest) | Film was gouged | Film was gouged | Film was gouged |
| 5H | Film was gouged | Film was gouged | Film was gouged |
| 4H | Film was gouged | Film was gouged | Film was gouged |
| 3H | Film was not gouged | Film was not gouged | Film was not gouged |
| 2H | Film was scratched | Film was scratched | Film was scratched |
| H | Film was scratched | Film was scratched | Film was scratched |
| F | Film was scratched | No scratches | Film was scratched |
| HB | Film was scratched | | No scratches |
| B (softest) | No scratches | | |
| Coating Hardness Results | | | |
| Gouge | 3H | 3H | 3H |
| Scratch | B | F | HB |

TABLE 19

Adhesion tape test results for coating No. 20 on primed steel panels

| | Results |
|---|---|
| Coatings cured to 50° C. | OB, OB: Greater than 65% of grid area showed flaking or coating detachment. |
| Coatings cured to 75° C. | 5B, 5B: The edges of the cuts are completely smooth and none of the lattice squares in the grid area is detached. |
| Coatings cured to 100° C. | 5B, 5B: The edges of the cuts are completely smooth and none of the lattice squares in the grid area is detached. |

Coating appearance as a function of ultimate cure temperature was also investigated. All three coatings exhibited a similar visual level of gloss. However, a slight yellow tint in the 100° C. cured coating was observed, suggesting the cure temperature and/or time should be reduced since coatings should be clear and colorless to be used in clearcoat applications.

TABLE 20

Water immersion testing of coatings No. 20 on primed steel panels

| | Coating Appearance After | | | | | | |
|---|---|---|---|---|---|---|---|
| | 1 Day Immersion | 2 Day Immersion | 3 Day Immersion | 4 Day Immersion | 5 Day Immersion | 6 Day Immersion | 7 Day Immersion |
| Coatings Cured to 50° C. | Coating became cloudy (bp[1]) | Coating appears the same, no change (bp) | Coating appears the same, no change (bp) | Coating appears the same and has softened (bf[2]) | No change in coating appearance (bf) | Coating has become opaque (bf) | Coating has become opaque (bf) |
| Coatings Cured to 75° C. | Coating became cloudy (bp) | Coating appears the same, no change (bp) | Coating appears the same, no change (bp) | Coating appears the same and has softened (bf) | No change in coating appearance (bf) | No change in coating appearance (bf) | No change in coating appearance (bf) |
| Coatings Cured to 100° C. | Coating became cloudy (bp) | Coating appears the same, no change (bp) | Coating appears the same, no change (bp) | Coating appears the same and has softened (bf) | No change in coating appearance (bf) | No change in coating appearance (bf) | No change in coating appearance (bf) |

[1]Designation bp signifies borderline pass due to coating exhibiting slight softening and/or color change
[2]Designation bf signifies borderline fail due to coating exhibiting irreversible softening and/or significant color change Based on the test results, coating cure temperatures ≧75° C. provided fully cured PEVD coatings from formulation No. 20. Water immersion, gloss, adhesion tape test and gouge hardness results indicate the 75 and 100° C. cured coatings performed in a similar manner. The 100° C. cured coating exhibited slightly better MEK resistance, but was slightly less scratch resistant than coatings cured to 75° C. However, development of a slight yellow color was observed on heating coatings at 100° C. These results indicate that coatings from formulation No. 20 cured at 75° C. for 24 hours or at ≦100° C. for <24 hours results in improved appearance and performance.

Example 6

Methods For PUVD Formation

The apparatus used to prepare PVD coating material from reaction of hydroxy-substituted vinyl dioxolane with aliphatic diisocyanate is conventional laboratory apparatus. A typical experimental procedure used for the preparation of PVD coating material described in the following examples:

Worling in a glovebag under nitrogen, the appropriate amount of vinyl dioxolane end-capped polyurethane oligomers and polymerization catalyst are weighted out into a three-neck flask equipped with a nitrogen inlet and mechanical stirrer. The appropriate amount of aliphatic or cycloaliphatic isocyanate or polyisocyanate or isocyanate-endcapped aliphatic prepolymer is weighed out into a slow-drip funnel.

After assembling the reaction vessel inside the glovebag, it is removed and set up inside a laminar flow hood and purged with nitrogen. The slow-drip funnel is removed from the glovebag and attached to the reaction vessel.

The reaction vessel is lowered into an oil bath which has been preheated to the selected reaction temperature. The drip funnel is opened and the aliphatic or cycloaliphatic isocyanate or polyisocyanate or isocyanate-endcapped aliphatic prepolymer is slowly added to the reaction vessel over a period of 1 hour. The reaction mixture is stirred under a positive nitrogen atmosphere and is monitored closely for changes in viscosity or appearance.

Using a sealed IR cell, an IR spectra of the reaction mixture is obtained as soon as all of the aliphatic or cycloaliphatic isocyanate or polyisocyanate or isocyanate-endcapped aliphatic prepolymer has been added. Thereafter, IR spectra of the reaction mixture is obtained every hour or whenever a significant viscosity or appearance change occurs.

The progress of the reaction is monitored by the disappearance of the —N=C=C isocyanate stretch at 2270 $cm^{-1}$ and the appearance of the urethane —C=O and =N—H stretches at 1690 $cm^{-1}$ and 3330 $cm^{-1}$, respectively.

The reaction is complete when the —N=C=O stretch has completely disappeared, coinciding with sharp —C=O and =N—H peaks.

At this point, all of the reaction mixture is transferred to a container and stored for use in preparing the coating compositions of the present invention.

Coating Procedures

Both bare and chromated aluminum test-panels (6 in.×3 in.×0.032 in.) were used as indicated in the following examples. A typical procedure for preparation of the hand-coated PVD coating test panels follows:

Wipe clean all panels using acetone and place cleaned panels in an oven at 100° C. for 1 hour.

Remove panels from oven and place Scotch Tape around the perimeter of each panel to act as a shim to set the coating thickness. Take care to avoid trapping air bubbles when placing the tape down as this will lead to nonuniform coating thicknesses.

Mix the appropriate amount of cobalt catalyst with the vinyl dioxolane end-capped polyurethane oligomers of the present invention and stir for at least 1 minute to ensure uniform mixing of the thus obtained coating composition.

Place an appropriate amount of the coating compositions on the panel to be coated and use a glass slide to spread the coating compositions across the panel.

Let the coated panel stand at room temperature. After 24 hours, observe and record the appearance and the degree of cure of the coated panel.

Place the panel in an oven at 50° C. and remove after 24 hours to evaluate the effects of post cure.

The apparatus used to prepare spray-coated samples of coating compositions of the present invention on aluminum test panels is a conventional spray apparatus which is capable of heating the coating composition if desired. Both bare and chromated aluminum test panels (6 in.×3 in.×0.032 in.) were used in these experiments. A typical procedure for preparation of the test panels spray-coated with coating compositions of the present invention follows:

Wipe clean all panels using acetone and place cleaned panels in an oven at 100° C. for 1 hour.

Mix the appropriate amount of cobalt catalyst to a composition comprising at least one vinyl dioxolane end-capped polyurethane oligomers of the present invention and stir for at least 1 minute to ensure uniform mixing.

Place the thus formed coating composition into a beaker and place the beaker inside a spray canister. Oil may be placed inside the canister to fill around the outside of the beaker and may be heated to a selected temperature by means of heater bands wrapped around the outside of the spray canister. In some cases it is desirable to heat the coating compositions of the present invention to lower the viscosity of the coating composition to facilitate the spraying.

Attach an air line to the canister, ensuring that the air line has an oil and moisture trap.

Coating compositions of the present invention were sprayed under different temperature and pressure conditions as described below.

DESMODUR is sometimes abbreviated "DES" in the following Examples.

The ratio of vinyl dioxolane to isocyanate during synthesis of vinyl dioxolane end-capped polyurethane oligomers of the present invention is determined by the free-NCO content of the isocyanate. Unless otherwise specified, one free-NCO is reacted with each hydroxy methyl substituent on the reactive vinyl dioxolane. The percent of catalyst is based on the combined weight of the vinyl dioxolane and isocyanate components.

Example 7

Reaction of 2-vinyl-4-hydroxymethyl-1,3-dioxolane (HMVD) with DESMODUR W

The Conditions: Reactants were weighed and added to reaction vessel in a glove-bag under nitrogen. The reaction vessel has nitrogen inlet.

| Experiment No. | Components (in grams) | Observations |
|---|---|---|
| 3a | HMVD (52.19) + | Components were mixed at room temperature. Initial viscosity was water-like. Let |

-continued

| Experiment No. | Components (in grams) | Observations |
|---|---|---|
| | DES W (47.54) | Stir for 12 hours. Solution remained clear with no significant viscosity changes. Heated at 50° C. Viscosity increased with time. IR taken after 6 hours and 30 hours of heating showed no significant change from that taken at beginning of experiment. |
| 3b | HMVD (52.19) + DES W (47.54) + 0.03% Tin (.03) | Components were mixed at room temperature. Initial viscosity was water-like but soon after addition of the tin catalyst the solution became viscous (honey-like) and turned white. Let stir at room temperature. After 1 hour, mixture became too viscous to stir. |
| 3c | HMVD (52.19) + DES W (47.54) + 0.1% Tin (.10) | Components were mixed at room temperature. Initial viscosity was water-like but soon after addition of the tin catalyst the solution became viscous (honey-like) and turned yellow. Let stir at room temperature. After 1 hour, mixture became too viscous to stir. |
| 3d | HMVD (11.57) + DES W (8.43) + 0.01% Tin (.002) | Components were mixed at room temperature. Initial viscosity was water-like and mixture was clear. IR taken after 20 minutes showed a large —N=C=O peak. After 70 minutes an IR showed the —N=C=O stretch was decreasing and the =N—H and —C=O stretches re beginning to appear. The solution became viscous (honey-like) and turned clear yellow. IR after 3.5 hours showed only change to be the growth of the =N—H stretch and narrowing of the —N=C=O peak. After 4 hours the viscosity increased to that of a liquid rubber cement, with yellowish white coloration. The —C—O—C stretch of the dioxolane ring was unchanged throughout this experiment. |
| 3e | HMVD (52.19) + DES W (47.54) + 0.03% DABCO (.03) | Components were mixed at room temperature. Initial viscosity was water-like and mixture was clear yellow. IR taken after 1 hour showed a large —N=C=O peak. After 5 hours —N=C=O peak had narrowed considerably but has not decreased. —C=O peak began to appear. Mixture was stirred at room temperature overnight. IR showed —C=O stretch increasing. Began to heat mixture at 50° C. Shortly after heat was applied the reaction mixture turned white and viscosity increased. IR after 1, 3 and 5 hours of heating progressively showed the =N—H shoulder beginning to appear, as well as the —N=C=O peak sharpening and the —C=O peak growing. After 5 hours of heating, the viscosity was that of liquid rubber. The —C—O—C stretch of the dioxolane ring was unchanged throughout this experiment. |

Example 8

Reaction of 2-vinyl-4-hydroxymethyl-1,3-dioxolane (HMVD) with DESMODUR N100

Conditions: The reactants were weighed and added to the reaction vessel in a glove-bag under nitrogen. Reaction vessel has nitrogen inlet.

| Experiment No. | Components | Observations |
|---|---|---|
| 4 | HMVD + DES N100 | Components were mixed at room temperature. Initial viscosity is syrup-like. Let stir for 12 hours. Solution turns yellow but shows no significant increase in viscosity. Heated to 50° C. Viscosity increases with time and bubbles starts to form. IR taken after 6 hours and 30 hours of heating shows marked decrease in —N=C=O intensity. After 72 hours solution has almost solidified. IR shows marked decrease in —N=C=O intensity. |

Example 9

Reaction of 2-vinyl-4-hydroxymethyl-1,3-dioxolane (HMVD) with DESMODUR N3200

Conditions: In Experiment No. 5a, the reactants were weighed and added to the reaction vessel in glove-bag under nitrogen. Reaction vessel had a nitrogen inlet. In Experiments 5b and 5c, HMVD and DABCO were weighed and added to the reaction vessel and DES N3200 was added to a drop funnel, in glove-bag under nitrogen. Reaction vessel had a nitrogen inlet. DES N3200 was slowly added, over 1 hour, to the reaction vessel via the drop funnel.

| Experiment No. | Components (in grams) | Observations |
|---|---|---|
| 5a | HMVD (8.62) + DES N3200 (11.30) | Components were mixed at room temperature. Initial viscosity was syrup-like. Let stir for 12 hours. Solution turned yellow but showed no significant increase in viscosity. Heated to 50° C. Viscosity increased with time and bubbles started to form. IR taken after 6 hours and 30 hours of heating showed marked decrease in —N=C=O intensity. After 72 hours solution had almost solidified. IR shows marked decrease in —N=C=O intensity. |
| 5b | HMVD (8.62) + DES N3200 (11.30) + 0.05% DABCO (.01) | HMVD and DABCO were stirred at 50° C. while DES N3200 was added slowly via a drop funnel over a period of 1 hour. Initial viscosity was syrup-like. Mixture turned yellow 5 minutes after addition was completed. An IR taken 0.5 hours after completion of the addition of DES N3200 showed all of the important peaks showing no sign of reaction. After 1 hour the mixture had gelled considerably and so the heat was removed. An IR 1.5 hours later showed the —N=C=O stretch getting sharper but no other significant changes. 18 hours after the heat was removed, an IR showed the —N=C=O stretch decreasing with several peaks appearing in that region. The =N—H peak had begun to form. At end of experiment the viscosity was paste-like, with an orange coloration. The —C—O—C stretch of the dioxolane ring was unchanged throughout this experiment. |
| 5c | HMVD (43.08) + DES N3200 (56.50) + 0.1% DABCO (.10) | HMVD and DABCO were stirred at 70° C. while DES N3200 was added slowly via a drop funnel over a period of 1 hour. Initial viscosity was syrup-like. Mixture turned yellow 15 minutes after addition began. An IR taken upon complete addition of DES N3200 showed the —N=C=O stretch decreased significantly and sharp =N—H and —C=O peaks being formed. The mixture had a reddish color at this point. The reaction was topped 2.5 hours after complete addition with the mixture having an |

Example 10

Reaction of 2-vinyl-4hydroxymethyl-1,3-dioxolane (HMVD) with DESMODUR N3400

Conditions: HMVD and DABCO were weighed and added to reaction vessel and DES N3400 was added to drop funnel, in glove-bag under nitrogen. Reaction vessel has nitrogen inlet. DES N3400 was slowly added, over 1 hour, to the reaction vessel via the drop funnel.

| Experiment No. | Components (in grams) | Observations |
|---|---|---|
| 6a | HMVD (58.06) + DES N3400 (41.21) + 0.1% DABCO (.10) | HMVD and DABCO were stirred at 80° C. while DES N3400 was added slowly via a drop funnel over a period of 1 hour. Initial viscosity was syrup-like. Mixture turned yellow 15 minutes after addition began. An IR taken upon complete addition of DES N3400 showed the —N=C=O stretch decreased significantly and sharp =N—H and —C=O peaks being formed. The mixture had a reddish color at this point. The reaction was stopped 2.5 hours after complete addition with the mixture having an orange color and paste-like viscosity. IR showed the —N=C=O peak had almost completely disappeared and also showed sharp =N—H and —C=O peaks. The —C—O—C— stretch of the dioxolane ring was unchanged throughout this experiment. |
| 6b | HMVD (41.21) + DES N3400 (58.06) + 0.1% DABCO (.10) | HMVD and DABCO were stirred at 70° C. while DES N3400 was added slowly via a drop funnel over a period of 1 hour. Initial viscosity was syrup-like. Mixture turned yellow 15 minutes after addition began. An IR taken upon complete addition of DES N3400 showed the —N=C=O stretch decreased significantly and sharp =N—H and —C=O peaks being formed. The mixture had a reddish color at this point IRs taken after 2, 2.75 and 5.5 hours showed the reaction going to completion where the =N—H and the —C=O peaks become more defined and the —N=C=O peak almost completely disappears. Viscosity at this point was honey-like with an orange coloration. The —C—O—C— stretch of the dioxolane ring was unchanged throughout this experiment. |

Example 11

Reaction of 2-vinyl-4hydroxybutyl-1,3-dioxolane (HBVD) with DESMODUR W

Conditions: HBVD and Tin catalyst were weighed and added to reaction vessel and DES W was added to drop funnel, in a glove-bag under nitrogen. Reaction vessel had nitrogen inlet. DES W was slowly added, over 1 hour, to the reaction vessel via the drop funnel.

| Experiment No. | Components (in grams) | Observations |
|---|---|---|
| 7a | HBVD (11.57) + DES W (8.43) + 0.01% Tin (.002) | HBVD and tin were stirred at room temperature while DES W was added slowly via a drop funnel over a period of 1 hour. Initial Viscosity was water-like. An IR taken after complete addition showed the =N—H shoulder and the —C=O stretch appearing and also shows a sharp —N=C=O stretch. At this point the mixture has become milky and viscosity had increased. An IR taken 1 hour after addition showed stronger and sharper —C=O and =N—H peaks and a decreased —N=C=O peak. IRs taken at 2.5 and 5 hours follow this trend. After 5 hours, the mixture was milky white and had the viscosity of tar. The —C—O—C— stretch of the dioxolane ring was unchanged throughout this experiment. |
| 7b | HBVD (11.57) + DES W (8.43) + 0.03% DABCO (.006) | HBVD and DABCO were stirred at 60° C. while DES W was added slowly via a drop funnel over a period of 1 hour. Initial viscosity was water-like. An IR taken after complete addition showed the =N—H shoulder and the —C=O stretch appearing and also showed a sharp —N=C=O stretch. At this point the mixture was clear and viscosity had not increased. IRs taken at 1 and 2.5 hours showed the reaction continuing very slowly so the temperature was increased to 70° C. after 4 hours. IRs taken at 1 and 4.5 hours at 70° C. again showed the reaction progressing slowly, with the =N—H and the —C=) peaks becoming more defined and the —N=C=O peak decreasing with time. Viscosity was tar-like at end of experiment. The —C—O—C— stretch of the dioxolane ring was unchanged throughout this experiment. |
| 7c | HBVD (11.57) + DES W (8.43) + 0.1% DABCO (.02) | HBVD and DABCO were stirred at 80° C. while DES W was added slowly via a drop funnel over a period of 1 hour. Initial viscosity was water-like. An IR taken after complete addition showed the =N—H shoulder and the —C=O stretch appearing and also showed a sharp —N=C=O stretch. At this point the mixture was clear and viscosity had not increased. IRs taken after 2.5, 5, 7, 8 and 8.75 hours showed the reaction going to completion where the =N—H and the —C=O peaks become more defined and the —N=C=O peak almost completely disappears. Mixture had gotten cloudy and more viscous as the reaction progresses. Viscosity is tar-like at end of experiment. The —C—O—C stretch of the dioxolane ring was unchanged throughout this experiment. |

Example 12

Reaction of 2-vinyl-4-hydroxybutyl-1,3-dioxolane (HBVD) with DESMODUR N3200

Conditions: HBVD and DABCO were weighed and added to reaction vessel and DES N3200 was added to drop funnel, in glove-bag under nitrogen. Reaction vessel had nitrogen inlet. DES N3200 was slowly added, over 1 hour, to the reaction vessel via the drop funnel.

| Experi-No. | Components (in grams) | Observations |
|---|---|---|
| 8a | HBVD (10.50) + DES N3200 (10.23) + 0.05% DABCO (.01) | HBVD and DABCO were stirred at 50° C. while DES N3200 was added slowly via a drop funnel over a period of 1 hour. Initial viscosity was syrup-like. An IR taken after complete addition showed the =N—H shoulder and the —C=O stretch appearing and also showed a sharp —N=C=O stretch. At this point the mixture was clear and viscosity had not increased. After 2 hours, the mixture had gelled and the heat was removed. IRs taken after 2.5, 18, 22 and 88 hours (over weekend) showed the reaction going to completion where the =N—H and the —C=O peaks become more defined and the —N=C=O peak almost completely disappears. Mixture got cloudy and more viscous as the reaction progressed. Viscosity was tar-like at end of experiment. The —C—O—C stretch of the dioxolane ring was unchanged throughout this experiment. |
| 8b | HBVD (10.50) + DES N3200 (10.23) + 0.05% DABCO (.01) | HBVD and DABCO were stirred at 70° C. while DES N3200 was added slowly via a drop funnel over a period for 1 hour. Initial viscosity was syrup-like. An IR taken after complete addition showed the =N—H shoulder and the —C=O stretch appearing and also showed a sharp —N=C=O stretch. At this point the mixture was clear and viscosity had not increased. After 2.5 hours, the viscosity had not changed. IRs taken after 2.5 and 3.5 hours show the reaction going to completion where the =N—H and the —C=O peaks become more defined and the —N=C=O peak almost completely disappears. Viscosity was tar-like at end of experiment. The —C—O—C— stretch of the dioxolane ring was unchanged throughout this experiment. |
| 8c | HBVD (10.50) + DES N3200 (10.23) + 0.1% DABCO (.02) | HBVD and DABCO were stirred at 80° C. while DES N3200 was added slowly via a drop funnel over a period of 1 hour. Initial viscosity is syrup-like. An IR was taken after complete addition showed the =N—H shoulder and the —C=O stretch appearing and also showed a sharp —N=C=O stretch. At this point the mixture was clear and viscosity had not increased. After 2.5 hours, the viscosity had not changed. IRs taken after 2.5 and 3.5 hours showed the reaction going to completion where the =N—H and the —C=O peaks become more defined and the —C=C=O peak almost completely disappeared. Viscosity was tar-like at the end of experiment. The —C—O—C— stretch of the dioxolane ring was unchanged throughout this experiment. |

Example 13

Reaction of 2-vinyl-4hydroxybutyl-1,3-dioxolane (HBVD) with DESMODUR N3400

Conditions: HBVD and DABCO were weighed and added to reaction vessel and DESMODUR N3400 was added to drop funnel, in glove-bag under nitrogen. Reaction vessel had nitrogen inlet. DESMODUR N3400 was slowly added, over 1 hour, to the reaction vessel via the drop funnel.

| Experi-No. | Components (in grams) | Observations |
|---|---|---|
| 9a & 9b | HBVD (14.35) + DES N3400 (15.28) + 0.1% DABCO (.030) | HBVD and DABCO were stirred at 80° C. while DES N3400 was added slowly via a drop funnel over a period of 1 hour. Initial viscosity was almost water-like. An IR taken after complete addition showed the =N—H shoulder and the —C=O stretch appearing and also showed a sharp —N=C=O stretch. At this point the mixture was clear and viscosity is low. After 2.5 hours, the viscosity had not changed. IRs taken after 1, 2, 2.75 and 3.75 hours showed the reaction going to completion where the =N—H and the —C=O peaks become more defined and the —N=C=O peak almost completely disappears. Viscosity was less than that of honey at end of experiment. The —C—O—C— stretch of the dioxolane ring was unchanged throughout this experiment. |

Example 14

PVD hand-coating Experiments

| PVD System | Percent Cobalt Octoate | Viscosity | Observation | Coating Ranking |
|---|---|---|---|---|
| HMVD + DES N3200 | 0.5 | V. High (Paste) | Very difficult to apply coating. Helped if panel was heated. Cured to tough, tacky film overnight at room temperature. Post-cured for 24 hour at 50° C. to form tough, hard, clear glossy coating. | 4 |
| HMVD + DES N3400 | 0.5 | Medium (Honey) | Relatively easy to apply coating. Got good wet-out of surface. Cured to tough, tacky film overnight. Post-cured for 24 hour at 50° C. to form tough, hard, clear glossy coating. | 2 |
| HBVD + DES W | 0.5 | High (Tar) | Difficult to apply coating. Helped if panel was heated. Cured to tough, tacky film overnight at room temperature. Post-cured for 24 hour at 50° C. to form tough, hard, coating. | 5 |
| HBVD + DES N3200 | 0.5 | High (Tar) | Relatively easy to apply coating. Got good wet-out of surface. Cured to tough, tacky film overnight at room temperature. Post-cured for 24 hour at 50° C. to form tough, hard, coating. | 3 |
| HBVD + DES N3400 | 0.5 | Low (Syrup) | East to apply coating. Got good wet-out of surface. Cured to tough, tacky, cloudy film overnight at room temperature. Post-cured for 24 hour at 50° C. to form tough, hard, clear coating. | 1 |

Coating Ranking 1 is the highest ranking.

Example 15

Spray Coating Experiments

Spraying was performed using a SnapOn spray gun, with the reaction mixture kept at 80° C. inside the spay vessel by using heater bands wrapped around the spray unit.

| Experiment No. | PVD System | Spray Pressure | Observations |
|---|---|---|---|
| 1 | HBVD/DES N3400 | 20 | Achieved spraying, but did not get a very good coating. |
| 2 | HBVD/DES N3400 | 40 | Achieved spraying, but did not get a very good coating, although better than Experiment No. 1. |
| 3 | HBVD/DES N3400 | 80 | Achieved spraying and got reasonable coating. |
| 4 | 50% (HBVD/DES N3400) + 50% HMVD | 80 | Got excellent spray-stream and wet-out of substrate. Pressure appeared to be too great for smooth coatings. |
| 5 | 50% (HBVD/DES N3400) + 50% HMVD | 60 | Got excellent spray-stream and wet-out of substrate. Coating looked better than Experiment No. 4, but again, pressure appeared too great to achieve smooth coating. |
| 6 | 50% (HBVD/DES N3400) + 50% HMVD | 20 | Got excellent spray-stream and wet-out of substrate. Coating looked very smooth. |

Example 16

Coating Test Panels

Testing of the no VOC coatings was carried out. The Table below illustrates the coating compositions tested. The coating compositions used were prepared in accordance with the previous examples.

| Panel No. | Aluminum Type | Coating Type |
|---|---|---|
| 1 a–d | Bare | HMVD/DES N3200/0.1% DABCO/0.5% cobalt octoate |
| 2 a–d | Chromated | HMVD/DES N3200/0.1% DABCO/0.5% cobalt octoate |
| 3 a–d | Bare | HMVD/DES N3400/0.1% DABCO/0.5% cobalt octoate |
| 4 a–d | Chromated | HMVD/DES N3400/0.1% DABCO/0.5% cobalt octoate |
| 5 a–d | Bare | HBVD/DES N3200/0.1% DABCO/0.5% cobalt octoate |
| 6 a–d | Chromated | HBVD/DES N3200/0.1% DABCO/0.5% cobalt octoate |
| 7 a–d | Bare | HBVD/DES N3400/0.1% DABCO/0.5% cobalt octoate |
| 8 a–d | Chromated | HBVD/DES N3400/0.1% DABCO/0.5% cobalt octoate |

Example 17

Cross-Hatch Adhesion Testing

Cross-hatch adhesion testing was performed in accordance with ASTM D3359-95 (Appendix A.1). Highland 6200 semi-transparent tape (¾ in. wide with a peel strength of 24 ox/in.) was used.

This test method is intended to assess the adhesion of coating films to metallic substrates by applying and removing pressure-sensitive tape over cuts made in the film. A lattice pattern with 11 cuts in each direction is made in the coating to substrate, pressure-sensitive tape is applied over the lattice and then removed, and adhesion is evaluated by comparison with descriptions and illustrations. The results of testing are presented below.

| PANEL NO. | TEST OBSERVATIONS | RATING (ASTM D3359) |
|---|---|---|
| 1 a–d | Peeling off tape did not affect the coating. | 5B |
| 2 a–d | Peeling off tape did not affect the coating. | 5B |
| 3 a–d | Peeling off tape did not affect the coating. | 5B |
| 4 a–d | Peeling off tape did not affect the coating. | 5B |
| 5 a–d | Peeling off tape did not affect the coating. | 5B |
| 6 a–d | Peeling off tape did not affect the coating. | 5B |
| 7 a–d | Peeling off tape did not affect the coating. | 5B |
| 8 a–d | Peeling off tape did not affect the coating. | 5B |

All of the coated panels passed this test when using this particular tape.

Example 18

Pencil Hardness Testing

Pencil hardness and scratch hardness were determined for each of the selected coatings in accordance with ASTM D3362-92a.

This test method covers a procedure for rapid, inexpensive determination of the film hardness of an organic coating on a substrate in terms of drawing leads or pencil leads of known hardness. The coated panel is placed firmly on a firm horizontal surface. The pencil is held firmly against the film at a 45° angle (point away from the operator) and pushed away from the operator in a ¼ in. (6.5 mm) stroke. the process is started with the hardest pencil and continued down the scale of hardness to either of two end points: one, the pencil that will not cut into or gouge the film (pencil hardness), or two, the pencil that will not scratch the film (scratch hardness). The results of testing are presented below.

| PANEL NO. | a | b | c | d | TEST |
|---|---|---|---|---|---|
| 1 | <4B | <4B | <4B | <4B | Pencil Hardness |
|   | <4B | <4B | <4B | <4B | Scratch Hardness |
| 2 | <4B | <4B | <4B | <4B | Pencil Hardness |
|   | <4B | <4B | <4B | <4B | Scratch Hardness |
| 3 | <4B | <4B | <4B | <4B | Pencil Hardness |
|   | <4B | <4B | <4B | <4B | Scratch Hardness |
| 4 | <4B | <4B | <4B | <4B | Pencil Hardness |
|   | <4B | <4B | <4B | <4B | Scratch Hardness |
| 5 | 5H | 5H | 4H | 5H | Pencil Hardness |
|   | 2B | 4B | 2B | 4B | Scratch Hardness |
| 6 | 5H | 5H | 5H | 5H | Pencil Hardness |
|   | 2B | 2B | 2B | 2B | Scratch Hardness |
| 7 | 5H | 5H | 5H | 5H | Pencil Hardness |
|   | 4B | 4B | 4B | 4B | Scratch Hardness |
| 8 | 5H | 5H | 5H | 5H | Pencil Hardness |
|   | 4B | 4B | 2B | 2B | Scratch Hardness |

The results show that the HBVD-based coating samples are a much harder coating than the HMVD-based coatings, with an average 5B pencil hardness which is at the higher end of the hardness scale.

Example 19

Fluid-Resistance Testing

The resistance of different coated test-panels coated in accordance with the present invention to water, MEK, hydraulic fluid and cleaning solution (Forest-Kleen, Atlantic Cleaning Products) was tested by immersion in the fluid for 72 hours. Pencil hardness testing before and after immersion as well as physical observations were used to quantify the resistance of a coating to a particular fluid. The resistance of our coatings to these respective fluids is presented in Tables 13-1 though 13-4.

TABLE 13-1

Results of coatings immersed in water for 72 hours

| Panel No. | Observations (Removed after 72 hr) | Observations (12 hr after removal) | Residual Pencil Hardness | Residual Scratch Hardness |
|---|---|---|---|---|
| 1a | Some blistering on coating surface, possibly due to delamination. Film is clouds | Film is cloudy but has a hard finish. | 5H | HB |
| 2a | Film has become cloudy, but no surface defects observed. | Same as 1a. | 5H | HB |
| 3a | Same as 2a. | Same as 1a. | 5 | B |
| 4a | Same as 2a. | Same as 1a. | HB | 2B |
| 5a | Same as 2a. | Film is slightly cloudy but has a slight gloss. A hard finish is observed. | 3H | HB |
| 6a | Same as 2a. | Same as 5a. | 3H | HB |
| 7a | Same as 2a. | Film is slightly cloudy and matty. A hard finish is observed. | 4H | HB |
| 8a | Same as 2a. | Same as 7a. | 4H | HB |

TABLE 13-2

Results of coatings immersed in MEK for 72 hours

| Panel No. | Observations (Removed after 72 hr) | Observations (12 hr after removal) | Residual Pencil Hardness | Residual Scratch Hardness |
|---|---|---|---|---|
| 1b | Film cloudy, matty and tacky but shows no sign of delamination. | Surface is 80% smooth and clear with 20% being matty and opaque. | 5H | HB |
| 2b | Same as 1b. | Film surface is cloudy and matty. | 3H | 4B |
| 3b | Same as 1b. | Same as 2b. | 3H | 2B |
| 4b | Same as 1b. | Same as 2b. | 3H | 2B |
| 5b | Film is cloudy, tacky with approximately 25% delamination. | Edges of film is glossy and clear and center of film is cloudy yet glossy. | 3H | 2B |
| 6b | Same as 5b. | Same as 5b. | 3H | 2B |
| 7b | Same as 5b. | Film is cloudy and matty in appearance. | 3H | 2B |
| 8b | Same as 5b. | Same as 7b. | 3H | 2B |

TABLE 13-3

Results of coatings immersed in cleaning solution for 72 hours

| Panel No. | Observation (Removed after 72 hr) | Observations (12 hr after removal) | Residual Pencil Hardness | Residual Scratch Hardness |
|---|---|---|---|---|
| 1c | Center portion of film is degraded by cleaner. Remaining film is cloudy and brittle. | Remaining film is hard and opaque. | 3H | 4B |
| 2c | Film adhered to substrate with no delamination. Film is cloudy and brittle. | Same as 1c. | 3H | 4B |
| 3c | Same as 1c. | Same as 1c. | 3H | 3H |
| 4c | Same as 2c. | Same as 1c. | 2B | 2B |
| 5c | 70% of film is degraded and delaminated from substrate and is cloudy and brittle. | Remaining film is glossy, cloudy and hard. | 3H | |
| 6c | 10% of film is degraded and delaminated and is cloudy and brittle. | Same as 5c. | 2B | |
| 7c | Same as 5c. | Same as 5c. | 3H | |
| 8c | Same as 6c. | Same as 5c. | 2B | |

TABLE 13-4

Results of coatings immersed in hydraulic fluid for 72 hrs.

| Panel No. | Observations (Removed after 72 hr) | Observations (12 hr after removal) | Residual Pencil Hardness | Residual Scratch Hardness |
|---|---|---|---|---|
| 1d | No sign of defects or discoloration of film. | No sign of defects or discoloration of film. | 3H | 4B |
| 2d | Same as 1d. | Same as 1d. | 3H | 4B |
| 3d | Same as 1d. | Same as 1d. | 3H | 2B |
| 4d | Same as 1d. | Same as 1d. | 2B | 4B |
| 5d | Same as 1d. | Same as 1d. | 3H | 2B |
| 6d | Same as 1d. | Same as 1d. | 3H | 2B |
| 7d | Same as 1d. | Same as 1d. | 3H | 2B |
| 8d | Same as 1d. | Same as 1d. | 3H | 2B |

Example 20

MEK Resistance And Impact Elongation Testing

Panel No. 7 was provided with a HBVD/DESMODUR N3400 coating on a bare aluminum panel while panel No. 8 was provided with the same coating system applied over a chromated aluminum panel.

Panel No. 7:

Average Film Thickness: 0.8 mils.

MEK Resistance: 25 double MEK rubs.

IMPACT Elongation: 60%

1 week in water: Slight softening, but the adhesion to bare aluminum was too weak to test for pencil hardness.

Panel No. 8:

Average Film Thickness: 0.9 mils.

MEK Resistance: 25 double MEK rubs.

IMPACT Elongation: 60%

1 week in Hy Jet IV: The surface appears to be hard, but the adhesion is too poor to run pencil hardness. Some softening was noted but not measured.

Example 21

Coating: HBVD/DES N3400/Cobalt Octoate

The following tests were conducted by the Navy on the coating from a hand coated sample of HBVD/DES N3400/ cobalt. The tests were conducted to Military Specifications.

|  | Required Range |  |
|---|---|---|
| ADHESION: |  |  |
| Dry Scrape | 0.5–10 + kg | <1 |
| Wet Scrape (24 hr/RT) | 0.5–10 + kg |  |
| Wet Scrape (7 day/150° F.) | 0.5–10 + kg |  |
| Dry Tape "A" Method | 0–5 (A) | 5A |
| Wet Tape (24 hr/RT) | 0–5 (A) | 5A |
| Wet Tape (4 day/120° F.) | 0–5 (A) |  |
| West Tape (7 day/150° F.) | 0–5 (A) |  |
| CORROSION RESISTANCE: |  |  |
| Salt Spray Bare (336 hr) | P, +, −, F |  |
| Salt Spray Ep/Gr (1000 hr) | P, +, −, F |  |
| Salt Spray (2000 hr) | P, +, −, F |  |
| Salt Spray (D1654) Scribed | % Area |  |
| Salt Spray (D1654) Unscribed) | 0–10 |  |
| SO2 Spray (500 hr) | P, +, −, F |  |
| SO2 Spray (D1654) Scribed | % Area |  |
| SO2 Spray (D1654) Unscribed | 0–10 |  |
| Filiform Corrosion | P, +, −, F |  |
| ELS | N/A |  |
| FLUID/WEATHER RESISTANCE: |  |  |
| H2O Resistance (24 hr/RT) | P, +, −, F |  |
| H2O Resistance (4 day/120° F.) | P, +, −, F |  |
| H2O Resistance (7 day/150° F.) | P, +, −, F |  |
| Humidity Resistance | P, +, −, F | PASS 14 days at 120° F./100% RH |
| 23699 Oil (24 hr/250° F.) | P, +, −, F | PASS |
| 83282 Hydraulic (24 hr/150° F.) | P, +, −, F | PASS |
| Hydrocarbon JP-5 (7 day/RT) | P, +, −, F | PASS |
| Skydrol (7 day/RT) | P, +, −, F |  |
| Skydrol (30 day/RT) | P, +, −, F |  |
| Solvent Resistance (100 MEK rubs) | P, +, −, F | SL SOFTENING (easily scraped by fingernail |
| Heat Resistance (1 hr/250° F.) | P, +, −, F | SL YELLOWING (visual to naked eye) |
| Heat Resistance (4 hr/250° F.) | P, +, −, F |  |
| Weatherometer (500 hr) | P, +, −, F |  |
| QUV (500 hr) | P, +, −, F |  |
| FLEXIBILITY: |  |  |
| GE Impact test | 0.5%–60% | 60 |
| Gardner Impact (direct/reverse) | in-lb |  |
| Mandrel Bend (RT) | 0.125" . . . C.75" |  |
| Mandrel Bend (−60° F.) | 0.125" . . . C.75" |  |
| MISCELLANEOUS: |  |  |
| Thickness | mils | 55 to 95 |
| Viscosity (admix. Ford #4 cup) | seconds |  |
| Pot life (viscosity after 2 hr) | seconds |  |
| Pot life (viscosity after 4 hr) | seconds |  |
| Set to touch | minutes |  |
| Tack free | hours |  |
| Dry hard | hours |  |
| Color | L.a.b. |  |
| Gloss (20°) | % reflectarce |  |
| Gloss (60°) | % reflectarce | 27 |
| Gloss (85°) | % reflectarce |  |
| Strippability | % removed | 100 |
| Cleanability | % cleaned |  |
| Comments |  | SOFT, WAXY FEEL |

Example 22

HMVD/Dimethyl 1,4-Cyclohexaedicarboxylate Prepolymer Synthesis

Components Used:
4-(Hydroxymethyl)-2-vinyl-1,3-dioxolane (HMVD)
Molecular formula $C_6H_{10}O_3$
Formula weight 130.143 grams
Purity 98.40%
Dimethyl 1,4-cyclohexanedicarboxylate (DMCDC)
Aldrich #20,643-1
FR-IR Aldrich 1(1), 630B
FT-NMR Aldrich 1(1), 960° C.
Mixture of cis and trans isomers
Molecular formula $C_{10}H_{16})_4$
Formula weight 200.23 grams
Boiling point 131°–133° C./11 mm
Density 1.111 grams/cc
97% Purity
Sodium methoxide
Aldrich #16,499-2
Molecular formula $CH_3ONa$
Formula weight 54.02 grams
FT-IR Aldrich 1(2), 1139A
Purity 95%
Polyester Prepolymer
Aldrich #D4,840
2,6-Di-tert-butylphenol
Molecular weight 396.432
Toluene (anhydrous)
Aldrich #24,451-1
Aldrich # 17,912-4
Acetone
Density 0.865 grams/cc
Dichloromethane (methylene chloride)
Aldrich #D6,510-0
Aldrich #19,997-4
Activated aluminum oxide (neutral)
Mesh size approximately 150

To prevent moisture absorption, the HMVD, DMCDC, sodium methoxide and anhydrous toluene were measured out in an inert atmosphere glovebag.

A 3.9 molar ratio of HMVD to dimethyl cyclohexanedicarboxylate was used.

Reagent amounts are for a 545 gram reaction scale, normally yielding about 250 grams of purified prepolymer.

Method:

1. Take into the glovebag the following items using standard glovebag procedures: a balance, DMCDC, HMVD, anhydrous toluene, 2,6-di-tert-butylphenol and sodium methoxide, 250 mL graduated cylinder and small sealable container, pipettes, pipette bulbs, spatulas, powder funnel, beakers, etc. required for weighing/transferring reagents, 1000 mL 4-necked round bottom flask, two nitrogen inlet equipped with a Teflon stopcock, thermometer adapter and thermometer, glass stirring shaft/Teflon blade and Teflon shaft bearing, 4 Fluo-Kem Teflon sleeves of the appropriate ground glass joint size
2. Weigh out 154.82 grams (0.7500 moles) DMCDC, 390.43 grams (2.95 moles) HMVD, and 0.039 grams of 2,6-di-tert-butylphenol into the 1000 mL 4-necked round bottom flask. Weigh out 2.317 grams of sodium methoxide and store in a sealed container until used in step #8. Make sure the DMCDC is a liquid prior to removing any material. Failure to do this may result in one isomer being added in preference to the other due to melting point differences of the isomers.
3. Rinse any residual DMCDC and HMVD into the flask using 220 mL anhydrous toluene.
4. Assemble the partial reaction apparatus, seal it and remove it from the glovebag.
5. Attach the nitrogen line to the front-center stopcock and place a positive nitrogen atmosphere over the reaction solution. Remove the other nitrogen inlet, transfer this inlet to the Dean-Stark trap(with sidearm)/condenser, attach the Dean-Stark trap(with sidearm)/condenser/ stopcock inlet to the vacant joint, purge the atmosphere inside the reaction apparatus with nitrogen for approximately 10 minutes, and then seal the reaction apparatus. Transfer the nitrogen line to the stopcock inlet at the top of the condenser and re establish a positive nitrogen atmosphere over the reaction solution. The reaction apparatus should now appear as shown in FIG. 2.

6. Stir the reaction solution for a while to ensure thorough mixing and then heat the solution to 120°–135° C. (thermometer) and collect any residual water and some toluene in the Dean-Stark trap. This will ensure anhydrous conditions are established in the reaction apparatus.

The water/toluene azeotrope will start to distill at a solution temperature of about 120° C. Distill sufficient liquid to fill the trap and note whether any water is present: as indicated by a cloudy appearance to the distillate or separation of distillate into layers. If no water has been found, drain the trap, and then proceed to step #7. If water is present, continue distillation until no additional water has been collected in the trap, drain the trap, distill another entire trap full of liquid to ensure all water has been removed, and then proceed to step #7. Replace the anhydrous toluene as needed to obtain good distillation of liquid into the trap.

7. Cool the colorless solution to ambient temperatures.

8. THE NEXT DAY, add 2.317 grams (0.0408 moles) sodium methoxide via a powder funnel to the rapidly stirring reaction solution using the stopcock inlet joint on the flask. Wash any residual powder into the solution using 40 mL anhydrous toluene and then reseal the flask. The color of the reaction mixture should now be orangish.

9. Slowly heat the orangish reaction mixture until liquid begins to distill into the trap, record this as T=0, and continue heating. As azeotrope distills the temperature of the reaction mixture rises. Remove a sample of the reaction mixture every 3 hours in order to monitor the progress of the reaction as specified in step #10. The time between samples will be increased in subsequent experiments as experience is gained. Continue heating the reaction mixture at a temperature range of 125° C.–155° C. in 12 hour increments or until most of the prepolymer is completely formed.

Heating should begin early in the day to allow monitoring of the reaction progress during normal work hours. We will initially allow the reaction mixture to cool to ambient temperatures overnight and restart the heating process the next morning. Additional DMCDC should be added to the reaction mixture should its presence in the distillate be detected. Continue the heating/cooling cycle until the reaction has gone to completion. The time the reactants and PEVD prepolymer are at temperatures $\geq 140°$ C. should be minimized in order to avoid undesirable side-reactions that generate color and cross-links which result in gelation.

10. Analyze the progress of the reaction as follows:
    a. Thin layer chromatography (TLC) can be used to detect the appearance of the prepolymer and the disappearance of the dioxolane and dimethyl cyclohexanedicarboxylate. Solubility and TLC experiments were previously carried out and the results used to select a 9.25/0.75 volume mixture of $CH_2Cl_2$/acetone as the elutent. Solutions containing the material(s) of interest were "spotted" approximately 0.5 inch from the bottom of a silica TLC plate, the "spots" allowed to air dry, the "spotted" plate was then placed into a sealed glass jar such that the plate bottom was immersed in the elutent and the elutent permitted to migrate up the plate to within 0.5 to 1 inch from the top of the plate. As the elutent travels up the TLC plate, it first dissolves the materials forming a solution, the compound(s) adsorb/ desorb on the aluminum oxide as the solution migration continues, with the individual compound migration rate being determined by the strength of this adsorption/ desorption, and the migration allowed to continue until the elutent reaches the plate top. An appropriate elutent would allow all compounds to migrate from their initial "spot", with one of the materials migrating to near the top of the plate, and sufficient separation in distance between the other compound "spots" to allow good resolution. Visualization of the compound(s) migration was accomplished by using iodine vapor staining procedure. Individual solutions containing each of the reactants were eluted along with the reaction solution for comparison purposes. In this manner, the appearance of a new spot (prepolymer) and the disappearance of reactant spots can be monitored with time.
    b. Place several drops of the dispersion on a sodium chloride IR disk and allow the dispersion to evaporate to dryness. Analyze the IR spectrum of the dispersion for the absence of hydroxyl groups (the —OH stretch of HMVD appears at 3490 $cm^{-1}$) and retention of ester (the —C=O stretch of aliphatic esters appear at 1750 to 1730 $cm^{-1}$), vinyl (the =CH2 $d_{ip}$ appears at 1438 $cm^{-1}$) and dioxolane (—C—O—C— ring stretch appear at 984 and 943 $cm^{-1}$) groups (FIGS. 5 and 6). IR spectroscopy can also be used to not only monitor the reaction progress but also confirm the presence of desired functional groups in the material upon exposure to reactive environments.

11. Cool the dark orangish colored dispersion to ambient temperatures after prepolymer formation was determined to be complete.

12. The reaction mixture is purified by adding an equal volume of $CH_2Cl_2$ and filtering the orangish colored mixture through a short/wide alumina column to remove the sodium methoxide catalyst and any gels that had formed. Form this column by filling a large diameter buchner fritted (medium or finer) funnel with approximately 3 inches of aluminum, place a fine stainless steel screen on the alumina, followed by several sheets of coarse filter paper. In this manner, the top filter paper can be removed should it become clogged without disturbing the overall filtration process. Slowly pour the reaction mixture on the filter papers so as to not disturb the alumina below. After the filtration is complete, the alumina plug should be repeatedly washed with approximately 100 mL portions of dichloromethane in order remove any residual prepolymer. If the crude prepolymer appears to be cloudy after filtering, then the above procedure should be repeated until a clear solution is obtained.

13. Remove excess toluene, $CH_2Cl_2$ and starting materials from the crude prepolymer using the rotary evaporator and water aspirator at 50° to 100° C. en most of the toluene and $CH_2Cl_2$ has been removed from the crude prepolymer, then it is evaporated under full dynamic vacuum (mechanical pump 29 in Hg) for an hour at 130° C., another hour at 140° C., and lastly an hour at 150° C. Use TLC to check for the presence of residual HMVD. Continue heating at 150° C. until HMVD is absent from the prepolymer or the team decides to stop the process.

14. Repeat steps #12 and 13 should the prepolymer be colored or contain particulates or gels.

15. The purified prepolymer should be clear, yellow in color and exhibit a syrup-like viscosity. Typical yields of the purified PEVD prepolymer will range from 89 to 77 weight percent.
16. Store the prepolymer in a sealed container under nitrogen until needed.
17. Characterize the prepolymer as follows:

Infrared spectroscopy to determine the absence of hydroxy groups and presence of ester, vinyl and dioxolane groups.

TLC to determine reactants are absent from the prepolymer

Brookfield viscosity as a crude measure of molecular weight and extent of cross-linking as well as to determine prepolymer suitability for spray application purposes.

Inherent viscosity as a measure of molecular weight and extent of cross-linking.

Vapor pressure as a function of temperature to determine if any "VOCs" are present.

$^1$H- and $^{13}$CNMR spectroscopy to determine whether all methoxy groups have been replaced by vinyldioxolanes. Prepolymer is soluble in deuterated chloroform.

The following conclusions are based on comparison of $^1$H spectra for HMVD-98-1 and HMVD-97-1 polyester prepolymers assuming:

Internal Hs of vinyl group ($H_b$) resonate at 6.0 to 5.7 ppm

Terminal Hs of vinyl group ($H_a$) resonate at 5.6 to 5.3 ppm

Hs on the carbon between the Os of the dioxolane ring ($H_c$) resonate at 5.3 to 5.2 ppm $H_f$ of methylene ($CH_2$) group adjacent to ester linkage resonates at about 4 ppm Methyl ($CH_3$) group of ester resonates at 3.68 ppm $H_i$s of the methylene groups of the cyclohexane ring system resonate at 2.7 to 1.3 ppm Methyl groups of an ester are present due to the $^{13}$CNMR absorption at 51.7 ppm If it is assumed that one H has an intensity of 9 in this particular $^1$HNMR spectrum:

$H_{a,b,c}$s will appear at 6.0 to 5.2 ppm with a total intensity of 36 for 1 HMVD group Hs of the methyl ester group should have a total intensity of 27 for 1 methoxy group $H_i$ s of the cyclohexane ring will have a total intensity of 90 for one diester segment $^1$HNMR spectrum of HMVD-97-1 exhibited a $H_{a,b,c}$/ $HOCH_3/H_i$ ratio of 36/13/71, giving a HMVD/methoxy/cyclohexane ratio of 1.3/0.6/ 1.0 after normalization to one cyclohexane ring system.

The actual $^1$HNMR spectrum of HMVD-98-1 exhibits the following:

Assume each H has an intensity of 9

Absorptions at 6.0 to 5.2 ppm, intensity of 39, 1.08 group

Methoxy absorptions at 3.68 ppm, intensity of 8–9, 0.33 group

Absorptions at 2.7 to 1.3 ppm, intensity of 64, 0.71 ring segment

This data after normalization to one cyclohexane ring system gives a MVD/methoxy/cyclohexane ratio of 1.5/0.5/ 1.0.

Example 23

PEVD/PUVD Preparation and Coating Tests

The following experiments were carried out in small laboratory scale quantities so that a maximum number of coating trials could be done using a minimum quantity of chemicals. The procedure followed is summarized below:

1. PEVD was blended with PUVD, reactive diluents and catalysts depending on the experiment.
2. 3"×5" roughened low carbon steel panels were used for the coatings. Most of the experiments were carried out with these panels due to lower cost, primed panels were used as needed for property evaluations, especially in adhesion tests. The intended thickness of the coating was 2 mils. Kapton tape was used to adjust the coating thickness and panels were coated using a glass slide similar to a doctor blade.
3. Panels were then placed in an air oven. Initially the temperature was set at 50° C. and 100° C. and the time required for cure was monitored. As the work progressed, actual cure cycles used in automotive industry were adapted in the experiments, as set out in Table 4. These were:

Cycle 1. 18 minutes at 124° C.

Cycle 2. 38 minutes at 124° C.

Cycle 3. 18 minutes at 135° C.

Cycle 4. 38 minutes at 135° C.

4. The following properties were observed during the experiments:

Time required for a hard cure.

Surface appearance.

These formulations were coated using a HVLP spray gun in a paint boot to demonstrate sprayability, an the properties of the coatings were evaluated based on the following specifications:

Adhesion—ASTMD3359-78.

Hardness—Pencil Test, ASTM D-3363-92a.

Solvent Resistance—MEK Resistance: 25 double rubs

Fluid Resistance—24 hours exposure to water, gasoline and 30w motor oil.

The results obtained with some blends are shown in Table 4.

TABLE 14

Properties of coating using blends

| Resin Cure Cycle Used | Pencil Hardness Results | MEK Wipe Test Results | Resistance To Water | Resistance To Motor Oil | Resistance To Power Steering Fluid | Resistance To Gasoline | Tape Adhesion Test Results |
|---|---|---|---|---|---|---|---|
| Test Results 25% DEGDA/75% HBVD/TMXDI-98-6 | | | | | | | |
| 25% DEGDA/75% HBVD/TMXDI-98-6 (Cycle #1) | GH 2H SH HB | Some of the Glossy Surface was removed | Does not affect the coating | Does not affect the coating. | Does not affect the coating | Does not affect the coating | 0.0 |
| 25% DEGDA/75% HBVD/TMXDI-98-6 (Cycle #2) | GH 2H SH HB | Some of the Glossy Surface was removed | Does not affect the coating | Does not affect the coating. | Does not affect the coating | Does not affect the coating | 0.0 |
| 25% DEGDA/75% HBVD/TMXDI-98-6 (Cycle #3) | GH F SH HB | Some of the Glossy Surface was removed | Does not affect the coating | Does not affect the coating. | Does not affect the coating | Does not affect the coating | 1.5 |
| 25% DEGDA/75% HBVD/TMXDI-98-6 (Cycle #4) | GH 5H SH HB | Some of the Glossy Surface was removed | Does not affect the coating | Does not affect the coating. | Does not affect the coating | Does not affect the coating | 4.0 |
| Test Results 80% HMVDE-97-1/20% HBVD/Desmodur N3400-98-2 | | | | | | | |
| 80% HMVDE-97-1/ 20% HBVD/Desmodur N3400-98-2 (Cycle #1) | GH 5H} SH HB | Coating is not affected by MEK | Does not affect the cosmetics, but it does soften the coating. | Does not affect the coating. | Does not affect the coating | Does not affect the coating | 4.5 |
| 80% HMVDE-97-1/ 20% HBVD/Desmodur N3400-98-2 (Cycle #2) | GH 5H SH HB | Coating is not affected by MEK | Does not affect the cosmetics, but it does soften the coating. | Does not affect the coating. | Does not affect the coating | Does not affect the coating | 5.0 |
| 80% HMVDE-97-1/ 20% HBVD/Desmodur N3400-98-2 (Cycle #3) | GH 3H SH F | Coating is not affected by MEK | Does not affect cosmetics, but it does soften the coating. | Does not affect the coating. | Does not affect the coating | Does not affect the coating | 5.0 |
| 80% HMVDE-97-1/ 20% HBVD/Desmodur N3400-98-2 (Cycle #4) | GH 3H SH F | Coating is not affected by MEK | Does not affect cosmetics, but it does soften the coating. | Does not affect the coating. | Does not affect the coating | Does not affect the coating | 5.0 |
| Test Results 80% HMVDE-98-2/20% HBVD/Desmodur N3400-98-2 | | | | | | | |
| 80% HMVDE-98-2/ 20% HBVD/Desmodur N3400-98-2 (Cycle #1) | GH 5H SH H | Coating is not affected by MEK | Does not affect cosmetics, but it does soften the coating. | Does not affect the coating. | Does not affect the coating | Does not affect the coating | 4.0 |
| 80% HMVDE-98-2/ 20% HBVD/Desmodur N3400-98-2 (Cycle #2) | GH 5H SH 2H | Coating is not affected by MEK | Does not affect cosmetics, but it does soften the coating. | Does not affect the coating. | Does not affect the coating | Does not affect the coating | 2.0 |
| 80% HMVDE-98-2/ 20% HBVD/Desmodur N3400-98-2 (Cycle #3) | GH 5H SH F | Coating is not affected by MEK | Does not affect cosmetics, but it does soften the coating. | Does not affect the coating. | Does not affect the coating | does not affect the coating | 5.0 |
| 80% HMVDE-98-2/ 20% HBVD/Desmodur N3400-98-2 | GH 5H SH F | Coating is not affected by MEK | Does not affect cosmetics, but it does | Does not affect the coating. | Does not affect the coating | Does not affect the coating | 5.0 |

TABLE 14-continued

Properties of coating using blends

| Resin Cure Cycle Used | Pencil Hardness Results | MEK Wipe Test Results | Resistance To Water | Resistance To Motor Oil | Resistance To Power Steering Fluid | Resistance To Gasoline | Tape Adhesion Test Results |
|---|---|---|---|---|---|---|---|
| (Cycle #4) | | | soften the coating. | | | | |

The results obtained utilizing a catalyst blend comprising cobalt and aluminum, a tert-butyl peroxy benxoate (TBPB) peroxide initiator and a dimethyl analine (DMA) solubility enhancer are summarized below:

Adhesion—Excellent. Class 5 with ASTMD3359-78.

Hardness—Pencil Test: F, ASTM D-3363-92a.

Solvent resistance—MEK Resistance: 25 double rubs. No marring, no material removal, surface in excellent condition after 25 double rubs.

Fluid Resistance—Coatings in excellent condition after 18 hours exposure to 5606 hydraulic fluid, water and unleaded gasoline.

Example 25

PEVD/PUVD Blend Preparation and Coating Tests

In this experiment, blends of polyesters, urethanes and acrylates were evaluated to determine whether a cured resin could be produced possessing the properties necessary to withstand automotive industry testing requirements.

Reactants

HMVDE-98-2 (polyester prepolymer)

HMVDE-97-1 (polyester prepolymer)

HBVD/TMXDI-98-6 (urethane prepolymer)

HBVD/Desmodur N3400-98-2 (urethane prepolymer)

Diethylene glycol diacrylate (DEGDA) Sartomer SR 230 (reactive diluent)

Catalyst 510 (12% Cobalt Octoate)

AOC 1020X (8% Aluminum Metal Complex)

Tert-butyl peroxy benzoate (TBPB)

Dimethyl analine (DMA)

Blend Matrix

25% DEGDA polyester prepolymer)/ 75% HBVD/ TMXDI-98-6(urethane prepolymer)

80% HMVDE-98-2 (polyester prepolymer)/20% HBVD/ Desmodur N3400-98-2 (urethane prepolymer)

80% HMVDE-97-1 (polyester prepolymer) / 20% HBVD/Desmodur N3400-98-2 (urethane prepolymer)

Resin Blending Procedure

A 25% DEGDA and 75% HBVD/TMXDI-98-6 solution was made by combining 5.0 grams of DEGDA and 15.0 grams of HBVD/TMXDI-98-6. The mixture was gently heated while stirring until a solution formed.

Two 80% HMVDE / 20% HBVD/Desmodur N3400-98-2 solutions were made (using each of the HMVDE materials) by combining 2.0 grams of HBVD/Desmodur N3400-98-2 with 8.0 grams of the appropriate HMVDE prepolymer. Each of these mixtures were gently heated while stirring until solutions formed.

Heating Cycles Tested

1.) 124° C. for 20 min

2.) 124° C. for 40 min

3.) 135° C. for 20 min

4.) 135° C. for 40 min

Test Solvents

Methyl ethyl ketone (MEK)

Deionized water

10/W30 motor oil

Power steering fluid

Gasoline

Procedures for Formulating Casting and Testing Resins

In three separate 35 mL sample vials the following reactants were combined: 4.616 grams of the blended prepolymers and 0.313 grams of the 8% aluminum complex. These mixtures were stirred until a homogeneous solution formed. To the resins containing the aluminum, the following reactants were added: 0.021 grams of cobalt and 0.001 grams of DMA. The above mixtures were stirred until an even solution was achieved. To this solution 0.050 grams of TBPB was added. The peroxide containing resin was stirred until a homogeneous solution was achieved. The above formulated resins were permitted to stand for about half an hour in order to degas them.

The resins were heated to about 50° C. and were coated on cold rolled steel panels. Coatings were prepared at a thickness of 2 mm using clear tape as a shim and a glass slide as a doctor blade.

These freshly coated panels (one from each of the formulated resin blends) were heated using the first heating cycle described above. The above procedure was repeated until all of the heating cycles had been evaluated.

After the heating cycles were completed, the condition and appearance of the coatings were observed.

Each of the cured (formulated) resin blends were tested for adhesion (ASTM D3359-93), pencil hardness (ASTM D3363-92a), resistance to water, resistance to motor oil, resistance to power steering fluid, resistance to MEK (ASTM D5402-93), and resistance to gasoline. Where no ASTM method was given, the sample was tested by exposing a region of the coated surface with the desired solvent for a period of 24 hours and then making observations.

Results and Observations

All of the panels were cured without any blemishes and were clear and glossy.

The present invention has been described in detail, including the preferred embodiments thereof. However, it will be appreciated that those skilled in the art, upon consideration of the present disclosure, may make modifications and/or improvements on this invention still within the scope and spirit of this invention as set forth in the following claims.

What is claimed:

1. A polyester/polyurethane coating composition containing essentially no volatile organic components, the composition comprising:

(a) at least one polyester prepolymer which comprises the reaction product of
   (i) at least one substituted vinyl dioxolane monomer having the formula

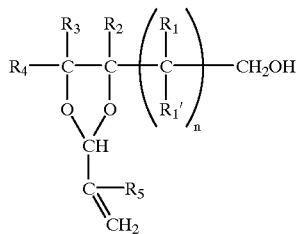

wherein $R_1$ and $R_1'$ are independently hydrogen or an alkyl group having from 1 to 10 carbon atoms, n is a number from 0 to about 10, and $R_2$, $R_3$, $R_4$, and $R_5$ are independently hydrogen or an alkyl group having from 1 to about 10 carbon atoms; and
   (ii) at least one ester of a polycarboxylic acid; and (b) at least one polyurethane prepolymer which comprises the reaction product of
   (i) at least one substituted vinyl dioxolane monomer having the formula

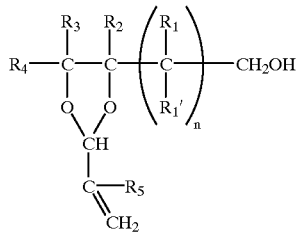

wherein $R_1$, $R_1'$, $R_2$, $R_3$, $R_4$, $R_5$ and n are as defined above; and
   (ii) at least one isocyanate or polyisocyanate having the formula

wherein $R_6$ is an aliphatic or cycloaliphatic alkyl group having from 1 to about 10 carbon atoms or an aromatic group and p is at least 1, or
   at least one isocyanate-endcapped aliphatic urethane prepolymer having the formula

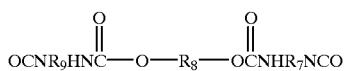

wherein $R_7$, $R_8$ and $R_9$ are independently an aliphatic or cycloaliphatic alkyl group having from 1 to about 10 carbons; and (c) at least one catalyst to initiate polymerization of the polyester and polyurethane prepolymers to form a coating.

2. A coating composition according to claim 1, wherein the at least one catalyst comprises at least one of cobalt, aluminum, zinc or peroxide initiator.

3. A coating composition according to claim 1, wherein the at least one catalyst comprises cobalt and aluminum and excludes zinc.

4. A coating composition according to claim 3, wherein the at least one catalyst further comprises at least one peroxide initiator.

5. A coating composition according to claim 2, wherein the peroxide initiator comprises benzoyl peroxide, dibenzoyl peroxide, 2-butano peroxide (MEEP), methyl ethyl ketone peroxide, hexane t-butyl peroxy benzoate (TBPB), or 2,5-dimethyl 2,5 di(t-butylperoxy).

6. A coating composition according to claim 1, further comprising a solubility enhancer.

7. A coating composition according to claim 6, wherein the solubility enhancer comprises dimethyl aniline.

8. A coating composition according to claim 3, wherein the at least one catalyst comprises cobalt at up to about 1.0% by weight and aluminum at up to about 0.6% by weight.

9. A coating composition according to claim 3, wherein cobalt is present at from about 0.01 to about 0.5% weight % an aluminum is present at from about 0.01 to about 0.6 weight %.

10. A coating composition according to claim 1, wherein the at least one catalyst comprises no more than about 1.5 % by weight.

11. A coating composition according to claim 2, wherein the peroxide initiator is present from about 0.1 to about 5.0 weight %.

12. A coating composition according to claim 6, wherein the solubility enhancer is present at from about 0.1 to about 1.0 weight %.

13. A coating composition according to claim 1, wherein in the polyester prepolymer the substituted vinyl dioxolane monomer is 2-vinyl-4-hydroxymethyl-1,3-dioxolane (HMVD) or 2-vinyl-4-hydroxybutyl-1,3-dioxolane (HBVD) or a blend thereof.

14. A coating composition according to claim 1, wherein in the polyester prepolymer the substituted vinyl dioxolane monomer is HBVD or HMVD and the ester is dimethyl adipate or dimethyl 1,4-cyclohexanedicarboxalate.

15. A coating composition according to claim 1, wherein the coating composition is sprayable.

16. A coating composition according to claim 1, further comprising at least one reactive diluent.

17. A coating composition according to claim 16, wherein the reactive diluent comprises a vinyl group containing composition.

18. A coating composition according to claim 17, wherein the reactive diluent comprises trimethyl propane triacylate ethylene glycol diacrylate (DGD or DEGDA).

19. A coating composition according to claim 16, wherein the reactive diluent comprises at least one substituted vinyl dioxolane monomer having the formula:

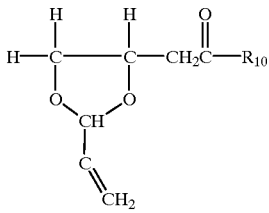

wherein R$_{10}$ is a branched or unbranched, saturated or unsaturated alkyl or alkoxy aliphatic group having from 1 to about 10 carbon atoms.

20. A coating composition according to claim 19, wherein R$_{10}$ further comprises at least one urethane, ester, or amide linkage.

21. A coating composition according to claim 19, wherein the reactive diluent is HMVD or HBVD or a blend thereof.

22. A coating composition according to claim 16, wherein the reactive diluent comprises an ester.

23. The polyester coating composition of claim 1, wherein in the polyester prepolymer the ester of the polycarboxylic acid comprises, at least one ester of a polycarboxylic acid having the formula:

wherein R$_6$ is a branched or unbranched, saturated or unsaturated, alkyl or alkoxy group having from 1 to about 20 carbon atoms or a cyclic alkyl group having from 1 to about 20 carbon atoms; and R$_7$ and R$_8$ are the same or independently selected from —CH$_3$ or an alkyl group having up to about 10 carbon atoms; and R$_9$ is —H or is a branched or unbranched alkyl or alkoxy group having from 1 to about 20 carbon atoms or a cyclic alkyl group having from 1 to about 10 carbon atoms.

24. A coating composition according to claim 23, wherein R$_6$ comprises at least one amide linkage.

25. A coating composition according to claim 6, wherein the solubility enhancer comprises at least one of tert-butyl peroxy benzoate or dimethyl aniline.

26. The coating composition of claim 1, wherein in the polyurethane prepolymer the polyisocyanate is at least one of hexamethylene diisocyanate, 4,4-bis(cyclohexyl)methane diisocyanate, bis(4-isocyanatocyclohexyl)methane, isophorone diisocyanate, 1-methylcyclohexane-2,4-diisocyanate, 4,4',4"-tricyclohexylmethane triisocyanate, toluene diisocyanate (TDI), methylene-bis-diphenylisocyanate (MDI), nathalene diisocyanate and isophorme diisocyanate.

27. A coating composition according to claim 1, wherein in the polyurethane prepolymer the polyisocyanate is at least one of 1,6-hexamethylene diisocyanate based polyisocyanate or tetra methyl xylene diisocyanate.

28. A coating composition according to claim 27, wherein the 1,6-hexamethylene diisocyanate based polyisocyanate has a viscosity at 23° C. of from about 90 to about 250 mPa·s.

29. A coating composition according to claim 27, wherein the 1,6-hexamethylene diisocyanate based polyisocyanate is DESMODUR N3400 or DESMODUR N3200.

30. A coating composition according to claim 27, herein the 1,6-hexamethylene diisocyanate based polyisocyanate has a viscosity at 25° C. of from about 1,300 to about 2,200 mPa·s.

31. A coating composition according to claim 1, wherein in the polyurethane prepolymer the isocyanate end-capped aliphatic urethane prepolymer is a prepolymer prepared from at least one hexamethylene diisocyanate aliphatic polyester polyol or polyether polyol.

32. A coating composition according to claim 27, wherein the 1,6-hexamethylene diisocyanate based polyisocyanate has a viscosity at 25° C. of 1300–2200 mPa·s or at 25°°C. of from about 5,000 to about 10,000 mPa·s.

33. A coating composition according to claim 1, wherein in the polyurethane prepolymer the viscosity of the polyisocyanate at about 25° C. is in the range of from about 90 to about 10,000 mPa·s.

34. A coating composition according to claim 1, wherein in the polyurethane prepolymer p is at least two.

35. A coating composition according to claim 1, wherein in the polyurethane prepolymer n is a number from 1 to 4 and R$_2$, R$_3$, R$_4$ and R$_5$ are hydrogen.

36. A coating composition according to claim 1, wherein in the polyurethane prepolymer the substituted vinyl dioxolane monomer of is HBVD and the polyisocyanate is a 1,6-hexamethylene diisocyanate based polyisocyanate.

37. A coating composition according to claim 15, wherein the viscosity is from about 10 to about 150 mPa·s.

38. A coating composition according to claim 37, wherein the viscosity is from about 20 to about 150 mPa·s.

39. A coating composition according to claim 1, wherein in the polyurethane prepolymer the vinyl dioxolane is HBVD and the polyisocyanate is a 1,6-hexamethylene diisocyanate based polyisocyanate having a viscosity at 23° C. of from about 90 to about 250 mPa·as.

40. A coating composition according to claim 15, wherein the viscosity of the isocyanate or polyisocyanate at 23° C. is from about 90 to about 250 mPa·s.

41. A coating composition according to claim 16, wherein the reactive diluent is present at from about 1 to about 50% by weight.

42. A coating composition according to claim 41, wherein the reactive diluent is present at from about 5 to about 30% by weight.

43. A coating composition according to claim 42, wherein the reactive diluent is present at from about 5 to about 15% by weight.

44. A coating in accordance with claim 1, wherein the polymerization catalyst is cobalt octanoate, cobalt naphthenate, or a stannous composition.

45. A method to reduce the viscosity of ester/urethane based polymeric coating compositions in the absence of volatile organic components, the method comprising reacting at least one isocyanate-endcapped urethane prepolymer having the formula:

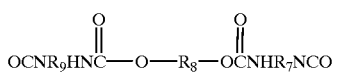

wherein $R_7$, $R_8$ and $R_9$ are independently an aliphatic or cycloaliphatic alkyl group having from 1 to about 10 carbons with at least one substituted vinyl dioxolane monomer, wherein the substituted vinyl dioxolane monomer has the formula:

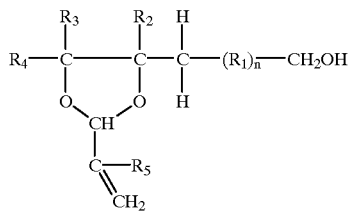

wherein $R_1$ is an alkyl group, n is a number from 0 to about 10, and $R_2$, $R_3$, $R_4$ and $R_5$ are independently hydrogen or an alkyl group having from 1 to about 10 carbon atoms to produce oligomers having a viscosity of from about 16 to about 150 mPa·s.

46. The method of claim 45, further comprising the step of adding a reactive diluent.

* * * * *